US012756841B2

(12) United States Patent
Choi et al.

(10) Patent No.: US 12,756,841 B2
(45) **Date of Patent: *Oct. 6, 2026**

(54) VIDEO DECODING METHOD AND APPARATUS, AND VIDEO ENCODING METHOD AND APPARATUS

(71) Applicant: SAMSUNG ELECTRONICS CO., LTD., Suwon-si (KR)

(72) Inventors: Narae Choi, Suwon-si (KR); Chanyul Kim, Suwon-si (KR); Minsoo Park, Suwon-si (KR); Minwoo Park, Suwon-si (KR); Seungsoo Jeong, Suwon-si (KR); Kiho Choi, Suwon-si (KR); Woongil Choi, Suwon-si (KR); Anish Tamse, Suwon-si (KR); Yinji Piao, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/902,138

(22) Filed: Sep. 30, 2024

(65) Prior Publication Data

US 2025/0030875 A1 Jan. 23, 2025

Related U.S. Application Data

(60) Continuation of application No. 17/835,553, filed on Jun. 8, 2022, now Pat. No. 12,132,914, which is a (Continued)

(51) Int. Cl.
*H04N 19/159* (2014.01)
*H04N 19/105* (2014.01)

(Continued)

(52) U.S. Cl.
CPC ......... *H04N 19/159* (2014.11); *H04N 19/105* (2014.11); *H04N 19/119* (2014.11);

(Continued)

(58) Field of Classification Search
CPC .. H04N 19/159; H04N 19/105; H04N 19/119; H04N 19/132; H04N 19/176; H04N 19/593; H04N 19/157; H04N 19/11
See application file for complete search history.

(56) References Cited

U.S. PATENT DOCUMENTS 9,609,360 B2 3/2017 Oh et al.
9,628,790 B1 4/2017 Xu et al.

(Continued)

FOREIGN PATENT DOCUMENTS

CN 103081473 A 5/2013
CN 103460700 A 12/2013

(Continued)

OTHER PUBLICATIONS

Communication dated Apr. 20, 2022, issued by the Korean Intellectual Property Office in Korean Patent Application No. 10-2020-7024550.

(Continued)

*Primary Examiner* — Francis Geroleo
(74) *Attorney, Agent, or Firm* — Sughrue Mion, PLLC

(57) ABSTRACT

Provided are a video encoding or decoding method and apparatus, which, during video encoding and decoding processes, determine whether an intra prediction mode of the current block is a DC mode, when the intra prediction mode of the current block is the DC mode, in a case where lengths of a height and a width of the current block are the same, determine an average of upper reference samples of the current block and left reference samples of the current block, as a DC value, and in a case where the lengths of the height (Continued)

and the width of the current block are different from each other, determine a weighted average value, which is determined by determining an average of the upper reference samples of the current block as an upper DC value, determine an average of the left reference samples of the current block as a left DC value, and combining the upper value and the left DC value with a predetermined weight, as a DC value, and perform intra prediction on the current block, based on the DC value.

3 Claims, 34 Drawing Sheets

Related U.S. Application Data division of application No. 17/051,999, filed as application No. PCT/KR2019/005679 on May 10, 2019, now abandoned.

(60) Provisional application No. 62/669,681, filed on May 10, 2018.

(51) Int. Cl.
*H04N 19/119* (2014.01)
*H04N 19/132* (2014.01)
*H04N 19/176* (2014.01)
*H04N 19/593* (2014.01)

(52) U.S. Cl.
CPC ......... *H04N 19/132* (2014.11); *H04N 19/176* (2014.11); *H04N 19/593* (2014.11)

(56) References Cited

U.S. PATENT DOCUMENTS 10,432,947 B2 10/2019 Choi et al.
10,659,812 B2 5/2020 Jin et al.
10,750,167 B2 8/2020 Son et al.
2012/0163457 A1 6/2012 Wahadaniah et al.
2015/0016537 A1* 1/2015 Karczewicz ......... H04N 19/176 375/240.18
2017/0374389 A1 12/2017 Kim et al.
2018/0131964 A1 5/2018 Min et al.
2018/0160113 A1 6/2018 Jeong et al.
2018/0199062 A1 7/2018 Zhang et al.
2019/0238841 A1 8/2019 Lee et al.
2020/0195955 A1* 6/2020 Drugeon .............. H04N 19/176
2020/0322601 A1 10/2020 Ko et al.
2022/0360822 A1 11/2022 Mizuguchi et al.

FOREIGN PATENT DOCUMENTS

CN 107852492 A 3/2018
KR 10-2013-0027400 A 3/2013
KR 10-2014-0004094 A 1/2014
KR 10-2015-0084408 A 7/2015
WO 2017069419 A1 4/2017
WO 2017090993 A1 6/2017

OTHER PUBLICATIONS

Communication dated Jul. 20, 2023 issued by the Chinese Patent Office in counterpart Chinese Application No. 201980041930.2.
Communication issued Dec. 10, 2021 by the Korean Intellectual Property Office in counterpart Korean Patent Application No. 10-2020-7024550.
Huo, Junyan et al., “Non-CE3: Simplification of DC Prediction”, Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0132v4. (4 pages total).
International Search Report and Written Opinion (PCT/ISA/210 and PCT/ISA/237), issued Aug. 13, 2019 by International Searching Authority in International Application No. PCT/KR2019/005679.
Leannec et al., Asmmetric Coding Units in QTBT, Oct. 2016, Joint Video Exploration Team of ITU-T SG 16 WP 3 and ISO/IEC JTC 1/SC 29/WG 11 4th Meeting: Chengdu, CN (Year: 2016).

* cited by examiner

VIDEO DECODING METHOD AND APPARATUS, AND VIDEO ENCODING METHOD AND APPARATUS

CROSS REFERENCE TO RELATED APPLICATIONS

This is a Continuation of U.S. application Ser. No. 17/835,553 filed Jun. 8, 2022, which is a Divisional of U.S. application Ser. No. 17/051,999 filed Oct. 30, 2020, which is a National Stage of PCT/KR2019/005679 filed May 10, 2019, which claims priority from Provisional Application No. 62/669,681 filed May 10, 2018, the contents of which are incorporated herein by reference in their entirety.

TECHNICAL FIELD

The disclosure relates to a video decoding method and a video decoding apparatus, and more particularly, to a video encoding method and apparatus and a video decoding method and apparatus, in which it is determined whether an intra prediction mode of a current block is a DC mode, in a case where it is determined that the intra prediction mode of the current block is the DC mode and lengths of a height and a width of the current block are the same, an average of upper reference samples of the current block, which are samples of an upper adjacent block located in the upper side of the current block, and left reference samples of the current block, which are samples of a left adjacent block located in the left side of the current block, is determined as a DC value, and in a case where it is determined that the intra prediction mode of the current block is the DC mode and the lengths of the height and the width of the current block are different from each other, a weighted average value, determined by determining an average of the upper reference samples of the current block as an upper DC value, determining an average of the left reference samples of the current block as a left DC value, and combining the upper DC value and the left DC value with a predetermined weight, is determined as a DC value, and intra prediction is performed on the current block, based on the DC value.

BACKGROUND ART

Image data is encoded by a codec according to a preset data compression standard, e.g., the Moving Picture Expert Group (MPEG) standard, and then stored in a recording medium or transmitted in the form of a bitstream through a communication channel.

With the development and spread of hardware capable of reproducing and storing high-resolution or high-definition image content, the need for a codec that effectively encodes or decodes high-resolution or high-definition image content has increased. Encoded image content may be decoded and then reproduced. Recently, methods of effectively compressing such high-resolution or high-definition image content are used. For example, a method of randomly splitting an image to be encoded or a procedure of manipulating data has been proposed to allow an image compression technique to be effectively implemented.

As one of data manipulation techniques, in intra prediction, intra prediction is generally performed based on reference samples equal to the sum of a width and a height of a current block.

DESCRIPTION OF EMBODIMENTS

Technical Problem

Provided are a method and an apparatus, which, during video encoding and decoding processes, determine whether an intra prediction mode of the current block is a DC mode, in a case where the intra prediction mode of the current block is the DC mode and lengths of a height and a width of the current block are the same, determine an average of upper reference samples of the current block, which are samples of an upper adjacent block located in the upper side of the current block, and left reference samples of the current block, which are samples of a left adjacent block located in the left side of the current block, as a DC value, and in a case where the intra prediction mode of the current block is the DC mode and the lengths of the height and the width of the current block are different from each other, determine a weighted average value, which is determined by determining an average of the upper reference samples of the current block as an upper DC value, determining an average of the left reference samples of the current block as a left DC value, and combining the upper DC value and the left DC value with a predetermined weight, as a DC value, and perform intra prediction on the current block, based on the DC value.

Solution to Problem

To solve the technical problem, a video decoding method according to the disclosure includes: determining whether an intra prediction mode of the current block is a DC mode, when the intra prediction mode of the current block is the DC mode, in a case where lengths of a height and a width of the current block are the same, determining an average of upper reference samples of the current block, which are samples of an upper adjacent block located in the upper side of the current block, and left reference samples of the current block, which are samples of a left adjacent block located in the left side of the current block, as a DC value, and in a case where the lengths of the height and the width of the current block are different from each other, determining a weighted average value, which is determined by determining an average of the upper reference samples of the current block as an upper DC value, determining an average of the left reference samples of the current block as a left DC value, and combining the upper DC value and the left DC value with a predetermined weight, as a DC value, and performing intra prediction on the current block, based on the DC value.

To solve the technical problem, a video decoding apparatus according to the disclosure includes: a memory; and at least one processor connected to the memory, wherein the at least one processor may be configured to determine whether an intra prediction mode of a current block is a DC mode, when the intra prediction mode of the current block is the DC mode, in a case where lengths of a height and a width of the current block are the same, determine an average of upper reference samples of the current block, which are samples of an upper adjacent block located in the upper side of the current block, and left reference samples of the current block, which are samples of a left adjacent block located in the left side of the current block, as a DC value, and in a case where the lengths of the height and the width of the current block are different from each other, determine a weighted average value, determined by determining an average of the upper reference samples of the current block as an upper DC value, determining an average of the left reference samples of the current block as a left DC value, and combining the upper DC value and the left DC value with a predetermined weight, as a DC value, and perform intra prediction on the current block, based on the DC value.

To solve the technical problem, a video encoding method according to the disclosure includes: determining whether an intra prediction mode of the current block is a DC mode, when the intra prediction mode of the current block is the DC mode, in a case where lengths of a height and a width of the current block are the same, determining an average of upper reference samples of the current block, which are samples of the upper adjacent block located in an upper side of the current block, and left reference samples of the current block, which are samples of a left adjacent block located in the left side of the current block, as a DC value, and in a case where the lengths of the height and the width of the current block are different from each other, determining a weighted average value, which is determined by determining an average of the upper reference samples of the current block as an upper DC value, determining an average of the left reference samples of the current block as a left DC value, and combining the upper DC value and the left DC value with a predetermined weight, as a DC value, and performing intra prediction on the current block, based on the DC value.

To solve the technical problem, a video encoding apparatus according to the disclosure includes at least one processor connected to the memory, wherein the at least one processor may be configured to determine whether an intra prediction mode of a current block is a DC mode, when the intra prediction mode of the current block is the DC mode, in a case where lengths of a height and a width of the current block are the same, determine an average of upper reference samples of the current block, which are samples of an upper adjacent block located in the upper side of the current block, and left reference samples of the current block, which are samples of a left adjacent block located in the left side of the current block, as a DC value, and in a case where the lengths of the height and the width of the current block are different from each other, determine a weighted average value, determined by determining an average of the upper reference samples of the current block as an upper DC value, determining an average of the left reference samples of the current block as a left DC value, and combining the upper DC value and the left DC value with a predetermined weight, as a DC value, and perform intra prediction on the current block, based on the DC value.

Advantageous Effects of Disclosure

During video encoding and decoding processes, whether an intra prediction mode of the current block is a DC mode is determined, when the intra prediction mode of the current block is the DC mode, in a case where lengths of a height and a width of the current block are the same, an average of upper reference samples of the current block, which are samples of an upper adjacent block located in the upper side of the current block, and left reference samples of the current block, which are samples of a left adjacent block located in the left side of the current block, is determined as a DC value, and in a case where the lengths of the height and the width of the current block are different from each other, a weighted average value, which is determined by determining an average of the upper reference samples of the current block as an upper DC value, determining an average of the left reference samples of the current block as a left DC value, and combining the upper DC value and the left DC value with a predetermined weight, is determined as a DC value, and intra prediction is performed on the current block, based on the DC value. Therefore, the coding efficiency may be improved by differently determining the DC value of the DC mode according to a shape of a block.

BEST MODE

Figure 1:
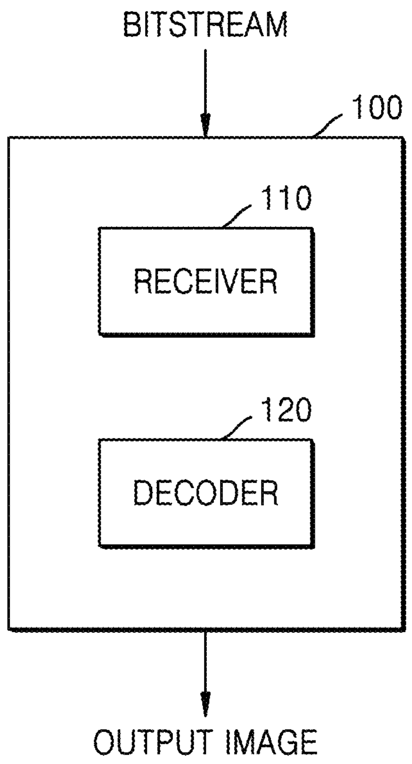
FIG. 1 illustrates a schematic block diagram of an image decoding apparatus according to an embodiment.

According to an embodiment of the disclosure, a video decoding method according to the disclosure includes: determining whether an intra prediction mode of the current block is a DC mode, when the intra prediction mode of the current block is the DC mode, in a case where lengths of a height and a width of the current block are the same, determining an average of upper reference samples of the current block, which are samples of an upper adjacent block located in the upper side of the current block, and left reference samples of the current block, which are samples of a left adjacent block located in the left side of the current block, as a DC value, and in a case where the lengths of the height and the width of the current block are different from each other, determining a weighted average value, which is determined by determining an average of the upper reference samples of the current block as an upper DC value, determining an average of the left reference samples of the current block as a left DC value, and combining the upper DC value and the left DC value with a predetermined weight, as a DC value, and performing intra prediction on the current block, based on the DC value.

According to an embodiment, in a case where the intra prediction mode of the current block is the DC mode and the lengths of the height and the width of the current block are different from each other, when the width is greater than the height, the average of the upper reference samples of the current block may be determined as a DC value, and when the height is greater than the width, the average of the left reference samples of the current block may be determined as a DC value.

According to an embodiment, in a case where a right adjacent block located in the right side of the current block is previously reconstructed, when the intra prediction mode of the current block is the DC mode and the lengths of the height and the width of the current block are the same, an average of the upper reference samples and right reference samples of the current block, which are samples of the right adjacent block located in the right side of the current block, may be determined as a DC value, and when the intra prediction mode of the current block is the DC mode and the lengths of the height and the width of the current block are different from each other, a weighted average value, which is determined by determining the average of the upper reference samples as an upper DC value, determining an average of the right reference samples as a right DC value, and combining the upper DC value and the right DC value with a predetermined weight, may be determined as a DC value. According to an embodiment, in a case where the intra prediction mode of the current block is the DC mode and the lengths of the height and the width of the current block are different from each other, when the width is greater than the height, the average of the upper reference samples may be determined as a DC value, and when the height is greater than the width, the average of the right reference samples may be determined as a DC value.

According to an embodiment, among reference samples of the current block, a sample value of a reference sample closest to reference samples having no sample value, among reference samples having a sample value, may be determined as a sample value of the reference samples having no sample value.

According to an embodiment, among the reference samples of the current block, an average value of the reference samples having a sample value may be determined as a sample value of the reference samples having no sample value.

According to an embodiment, among the reference samples of the current block, a predetermined default value may be determined as a sample value of the reference sample having no sample value.

According to an embodiment of the disclosure, a video encoding method according to the disclosure includes: determining whether an intra prediction mode of the current block is a DC mode, when the intra prediction mode of the current block is the DC mode, in a case where lengths of a height and a width of the current block are the same, determining an average of upper reference samples of the current block, which are samples of an upper adjacent block located in the upper side of the current block, and left reference samples of the current block, which are samples of a left adjacent block located in the left side of the current block, as a DC value, and in a case where the lengths of the height and the width of the current block are different from each other, determining a weighted average value, which is determined by determining an average of the upper reference samples of the current block as an upper DC value, determining an average of the left reference samples of the current block as a left DC value, and combining the upper DC value and the left DC value with a predetermined weight, as a DC value, and performing intra prediction on the current block, based on the DC value.

According to an embodiment of the disclosure, a video decoding apparatus includes: a memory; and at least one processor connected to the memory, wherein the at least one processor may be configured to determine whether an intra prediction mode of a current block is a DC mode, when the intra prediction mode of the current block is the DC mode, in a case where lengths of a height and a width of the current block are the same, determine an average of upper reference samples of the current block, which are samples of an upper adjacent block located in the upper side of the current block, and left reference samples of the current block, which are samples of a left adjacent block located in the left side of the current block, as a DC value, and in a case where the lengths of the height and the width of the current block are different from each other, determine a weighted average value, determined by determining an average of the upper reference samples of the current block as an upper DC value, determining an average of the left reference samples of the current block as a left DC value, and combining the upper DC value and the left DC value with a predetermined weight, as a DC value, and perform intra prediction on the current block, based on the DC value.

Mode of Disclosure

The advantages and features of the disclosure and methods of achieving the advantages and features will be described more fully with reference to the accompanying drawings, in which embodiments of the disclosure are shown. The disclosure may, however, be embodied in many different forms and should not be construed as being limited to the embodiments set forth herein; rather these embodiments are provided so that the disclosure will be thorough and complete, and will fully convey the concept of the disclosure to one of ordinary skill in the art.

The terms used herein will be briefly described, and disclosed embodiments will be described in detail.

The terms used herein are those general terms currently widely used in the art in consideration of functions in the disclosure, but the terms may vary according to the intention of one of ordinary skill in the art, precedents, or new technology in the art. Also, some of the terms used herein may be arbitrarily chosen by the present applicant, and in this case, these terms are defined in detail below. Accordingly, the specific terms used herein should be defined based on the unique meanings thereof and the whole context of the disclosure.

It is to be understood that the singular forms "a," "an," and "the" include plural referents unless the context clearly dictates otherwise.

It will be understood that when a certain part "includes" a certain component, the part does not exclude another component but may further include another component, unless the context clearly dictates otherwise.

Also, the term "~unit" used herein refers to a software component or a hardware component, which performs certain tasks. However, the term "~unit" is not limited to software or hardware. A "~unit" may be configured to be in an addressable storage medium or configured to operate one or more processors. Thus, a "~unit" may include, by way of example, components such as software components, object-oriented software components, class components, and task components, processes, functions, attributes, procedures, subroutines, segments of program code, drivers, firmware, microcode, circuitry, data, databases, data structures, tables, arrays, and variables. The functionality provided by the components and "~units" may be combined into fewer components and "~units" or further separated into additional components and "~units".

According to an embodiment of the disclosure, the "unit" may include a processor and a memory. The term "processor" should be interpreted broadly to include a general purpose processor, a central processing unit (CPU), a microprocessor, a digital signal processor (DSP), a controller, a microcontroller, a state machine, etc. In some circumstances, the "processor" may refer to an application specific semiconductor (ASIC), a programmable logic device (PLD), a field programmable gate array (FPGA), etc. The term "processor" may refer to a combination of processing devices such as, for example, a combination of a DSP and a microprocessor, a combination of a plurality of microprocessors, a combination of one or more microprocessors in conjunction with a DSP core, or a combination of any other such configuration.

The term "memory" should be interpreted broadly to include any electronic component capable of storing electronic information. The term "memory" may refer to various types of processor-readable media, such as a random access memory (RAM), a read-only memory (ROM), a non-volatile random access memory (NVRAM), a programmable read-only memory (PROM), an erase-programmable read-only memory (EPROM), an electrically erasable PROM (EEPROM), a flash memory, a magnetic or optical data storage device, a register, etc. When the processor can read information from a memory and/or write information to the memory, the memory is said to be in an electronic communication state with the processor. The memory integrated in the processor is in an electronic communication state with the processor.

Hereinafter, an "image" may indicate a still image of a video or may indicate a dynamic image such as a moving image, that is, the video itself.

Hereinafter, a "sample" denotes data assigned to a sampling location of an image, i.e., data to be processed. For example, pixel values of an image in a spatial domain and transform coefficients on a transform region may be samples. A unit including at least one such sample may be defined as a block.

Also, in the present specification, a "current block" may denote a block of a largest coding unit, a coding unit, a prediction unit, or a transform unit of a current image to be encoded or decoded.

The disclosure will now be described more fully with reference to the accompanying drawings for one of ordinary skill in the art to be able to perform the disclosure without any difficulty. Also, portions irrelevant to the descriptions of the disclosure will be omitted in the drawings for clear descriptions of the disclosure.

Hereinafter, an image encoding apparatus and an image decoding apparatus, and an image encoding method and an image decoding method according to embodiments will be described with reference to FIGS. 1 through 16. A method of determining a data unit of an image, according to an embodiment, will be described with reference to FIGS. 3 to 16. A video encoding method and a video decoding method according to an embodiment will be described below with reference to FIGS. 17 to 20, FIGS. 25A to 25C, 26 and 27, in which whether an intra prediction mode of a current block is a DC mode is determined, when the intra prediction mode of the current block is the DC mode, in a case where a height and a width of the current block are the same, an average of upper reference samples of the current block, which are samples of an upper adjacent block located in the upper side of the current block, and left reference samples of the current block, which are samples of a left adjacent block located in the left side of the current block, is determined as a DC value, and in a case where the height and the width of the current block are different from each other, a weighted average value, determined by determining an average of the upper reference samples of the current block as an upper DC value, determining an average of the left reference samples of the current block as a left DC value, and combining the upper DC value and the left DC value with a predetermined weight, is determined as a DC value, and intra prediction is performed on the current block, based on the DC value. An intra prediction method according to an encoding order and whether an adjacent block is reconstructed will be described below with reference to FIGS. 21 and 22, 67 intra prediction modes will be described below with reference to FIG. 23, a wide-angle directional mode applied to a rectangular block will be described below with reference to FIG. 24, and a line-based intra prediction method will be described below with reference to FIGS. 28 to 31.

Hereinafter, a method and apparatus for adaptively selecting a context model, based on various shapes of coding units, according to an embodiment of the disclosure, will be described with reference to FIGS. 1 and 2.

FIG. 1 illustrates a schematic block diagram of an image decoding apparatus according to an embodiment.

The image decoding apparatus 100 may include a receiver 110 and a decoder 120. The receiver 110 and the decoder 120 may include at least one processor. Also, the receiver 110 and the decoder 120 may include a memory storing instructions to be performed by the at least one processor.

The receiver 110 may receive a bitstream. The bitstream includes information of an image encoded by an image encoding apparatus 2200 described below. Also, the bitstream may be transmitted from the image encoding apparatus 2200. The image encoding apparatus 2200 and the image decoding apparatus 100 may be connected via wires or wirelessly, and the receiver 110 may receive the bitstream via wires or wirelessly. The receiver 110 may receive the bitstream from a storage medium, such as an optical medium or a hard disk. The decoder 120 may reconstruct an image based on information obtained from the received bitstream. The decoder 120 may obtain, from the bitstream, a syntax element for reconstructing the image. The decoder 120 may reconstruct the image based on the syntax element.

Operations of the image decoding apparatus 100 will be described in detail with reference to FIG. 2.

Figure 2:
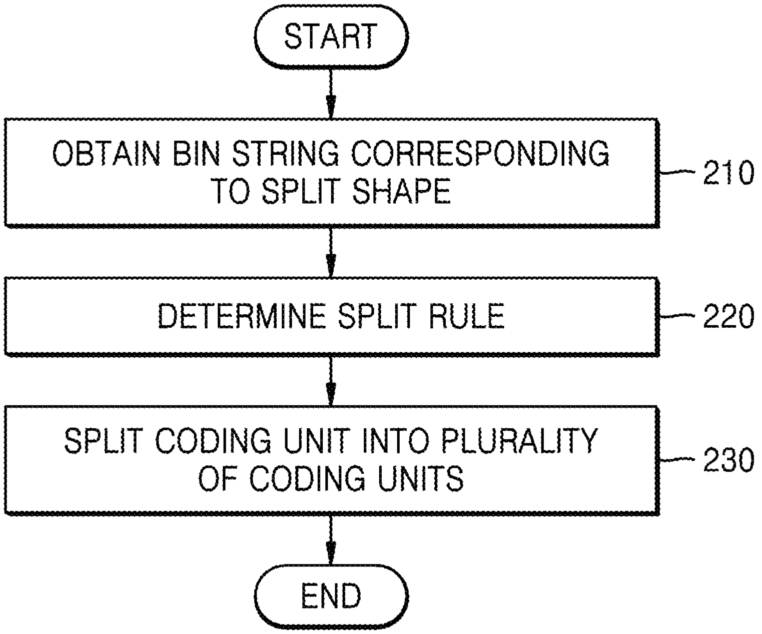
FIG. 2 illustrates a flowchart of an image decoding method according to an embodiment.

FIG. 2 illustrates a flowchart of an image decoding method according to an embodiment.

According to an embodiment of the disclosure, the receiver 110 receives a bitstream.

The image decoding apparatus 100 obtains, from a bitstream, a bin string corresponding to a split shape mode of a coding unit (operation 210). The image decoding apparatus 100 determines a split rule of coding units (operation 220). Also, the image decoding apparatus 100 splits the coding unit into a plurality of coding units, based on at least one of the bin string corresponding to the split shape mode and the split rule (operation 230). The image decoding apparatus 100 may determine an allowable first range of a size of the coding unit, according to a ratio of the width and the height of the coding unit, so as to determine the split rule. The image decoding apparatus 100 may determine an allowable second range of the size of the coding unit, according to the split shape mode of the coding unit, so as to determine the split rule.

Hereinafter, splitting of a coding unit will be described in detail according to an embodiment of the disclosure.

First, one picture may be split into one or more slices or one or more tiles. One slice or one tile may be a sequence of one or more largest coding units (coding tree units (CTUs)). There is a largest coding block (coding tree block (CTB)) conceptually compared to a largest coding unit (CTU).

The largest coding block (CTB) denotes an N×N block including N×N samples (where N is an integer). Each color component may be split into one or more largest coding blocks.

When a picture has three sample arrays (sample arrays for Y, Cr, and Cb components), a largest coding unit (CTU) includes a largest coding block of a luma sample, two corresponding largest coding blocks of chroma samples, and syntax structures used to encode the luma sample and the chroma samples. When a picture is a monochrome picture, a largest coding unit includes a largest coding block of a monochrome sample and syntax structures used to encode the monochrome samples. When a picture is a picture encoded in color planes separated according to color components, a largest coding unit includes syntax structures used to encode the picture and samples of the picture.

One largest coding block (CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of a monochrome sample and syntax structures used to encode the monochrome samples. When a picture is a picture encoded in color planes separated according to color components, a coding unit includes syntax structures used to encode the picture and samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax structure corresponding to the (largest) coding block. However, because it is understood by one of ordinary skill in the art that a (largest) coding unit or a (largest) coding block refers to a block of a preset size including a preset number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be a square shape of the same size. However, the embodiment is not limited thereto.

For example, information about a maximum size of a luma coding block may be obtained from a bitstream. For example, the maximum size of the luma coding block indicated by the information about the maximum size of the luma coding block may be one of 4×4, 8×8, 16×16, 32×32, 64×64, 128×128, and 256×256.

For example, information about a luma block size difference and a maximum size of a luma coding block that may be split into two may be obtained from a bitstream. The information about the luma block size difference may refer to a size difference between a luma largest coding unit and a largest luma coding block that may be split into two. Accordingly, when the information about the maximum size of the luma coding block that may be split into two and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information about a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, the maximum size of the luma coding block that is ternary splittable in an I-picture may be 32×32, and the maximum size of the luma coding block that is ternary splittable in a P-picture or a B-picture may be 64×64.

Also, a largest coding unit may be hierarchically split into coding units based on split shape mode information obtained from a bitstream. At least one of information indicating whether quad splitting is performed, information indicating whether multi-splitting is performed, split direction information, and split type information may be obtained as the split shape mode information from the bitstream.

For example, the information indicating whether quad splitting is performed may indicate whether a current coding unit is quad split (QUAD_SPLIT) or not.

When the current coding unit is not quad split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode (SPLIT_TT_VER).

The image decoding apparatus 100 may obtain, from the bitstream, the split shape mode information from one bin string. A form of the bitstream received by the image decoding apparatus 100 may include fixed length binary code, unary code, truncated unary code, predetermined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad split a coding unit, whether not to split a coding unit, a split direction, and a split type, based on one bin string.

The coding unit may be smaller than or the same as the largest coding unit. For example, because a largest coding unit is a coding unit having a maximum size, the largest coding unit is one of coding units. When split shape mode information about a largest coding unit indicates that splitting is not performed, a coding unit determined in the largest coding unit has the same size as that of the largest coding unit. When split shape mode information about a largest coding unit indicates that splitting is performed, the largest coding unit may be split into coding units. Also, when split shape mode information about a coding unit indicates that splitting is performed, the coding unit may be split into smaller coding units. However, the splitting of the image is not limited thereto, and the largest coding unit and the coding unit may not be distinguished. The splitting of the coding unit will be described in detail with reference to FIGS. 3 through 16.

Also, one or more prediction blocks for prediction may be determined from a coding unit. The prediction block may be the same as or smaller than the coding unit. Also, one or more transform blocks for transform may be determined from a coding unit. The transform block may be the same as or smaller than the coding unit.

The shapes and sizes of the transform block and prediction block may not be related to each other.

In another embodiment, prediction may be performed by using a coding unit as a prediction unit. Also, transformation may be performed by using a coding unit as a transform block.

The splitting of the coding unit will be described in detail with reference to FIGS. 3 through 16. A current block and an adjacent block of the disclosure may indicate one of the largest coding unit, the coding unit, the prediction block, and the transform block. Also, the current block of the current coding unit is a block that is currently being decoded or encoded or a block that is currently being split. The adjacent block may be a block reconstructed before the current block. The adjacent block may be adjacent to the current block spatially or temporally. The adjacent block may be located at one of the lower left, left, upper left, top, upper right, right, lower right of the current block.

Figure 3:
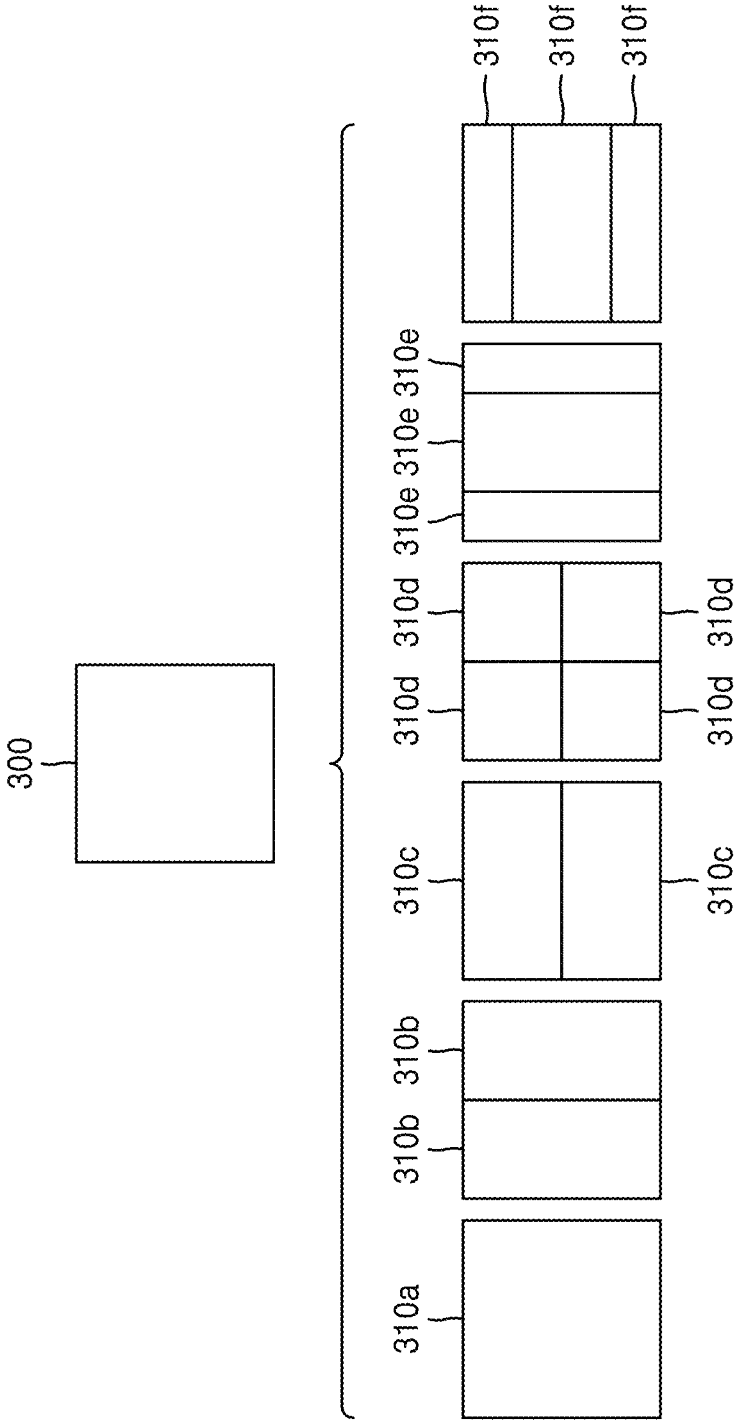
FIG. 3 illustrates a process, performed by an image decoding apparatus, of determining at least one coding unit by splitting a current coding unit, according to an embodiment.

FIG. 3 illustrates a process, performed by an image decoding apparatus, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, a direction, a ratio of width and height, or size of a coding unit.

The shape of the coding unit may include a square and a non-square. When the lengths of the width and height of the coding unit are the same (i.e., when the block shape of the coding unit is 4N×4N), the image decoding apparatus 100 may determine the block shape information of the coding unit as a square. The image decoding apparatus 100 may determine the shape of the coding unit to be a non-square.

When the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit as a non-square shape. When the shape of the coding unit is non-square, the image decoding apparatus 100 may determine the ratio of the width and height among the block shape information of the coding unit to be at least one of 1:2, 2:1, 1:4, 4:1, 1:8, 8:1, 1:16, 16:1, 1:32, and 32:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 2200 may determine pre-agreed split shape mode information, based on the block shape information. The image decoding apparatus 100 may determine the pre-agreed split shape mode information with respect to a largest coding unit or a smallest coding unit. For example, the image decoding apparatus 100 may determine split shape mode information with respect to the largest coding unit to be a quad split. Also, the image decoding apparatus 100 may determine split shape mode information regarding the smallest coding unit to be "not to perform splitting". In particular, the image decoding apparatus 100 may determine the size of the largest coding unit to be 256×256. The image decoding apparatus 100 may determine the pre-agreed split shape mode information to be a quad split. The quad split is a split shape mode in which the width and the height of the coding unit are both bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may determine that a coding unit 310*a* having the same size as the current coding unit 300 is not split, based on the split shape mode information indicating not to perform splitting, or may determine coding units 310*b*, 310*c*, 310*d*, 310*c*, or 310*f* split based on the split shape mode information indicating a preset splitting method.

Referring to FIG. 3, according to an embodiment, the image decoding apparatus 100 may determine two coding units 310*b* obtained by splitting the current coding unit 300 in a vertical direction, based on the split shape mode information indicating to perform splitting in a vertical direction. The image decoding apparatus 100 may determine two coding units 310*c* obtained by splitting the current coding unit 300 in a horizontal direction, based on the split shape mode information indicating to perform splitting in a horizontal direction. The image decoding apparatus 100 may determine four coding units 310*d* obtained by splitting the current coding unit 300 in vertical and horizontal directions, based on the split shape mode information indicating to perform splitting in vertical and horizontal directions. According to an embodiment, the image decoding apparatus 100 may determine three coding units 310*c* obtained by splitting the current coding unit 300 in a vertical direction, based on the split shape mode information indicating to perform ternary splitting in a vertical direction. The image decoding apparatus 100 may determine three coding units 310*f* obtained by splitting the current coding unit 300 in a horizontal direction, based on the split shape mode information indicating to perform ternary splitting in a horizontal direction. However, splitting methods of the square coding unit are not limited to the above-described methods, and the split shape mode information may indicate various methods. Preset splitting methods of splitting the square coding unit will be described in detail below in relation to various embodiments.

Figure 4:
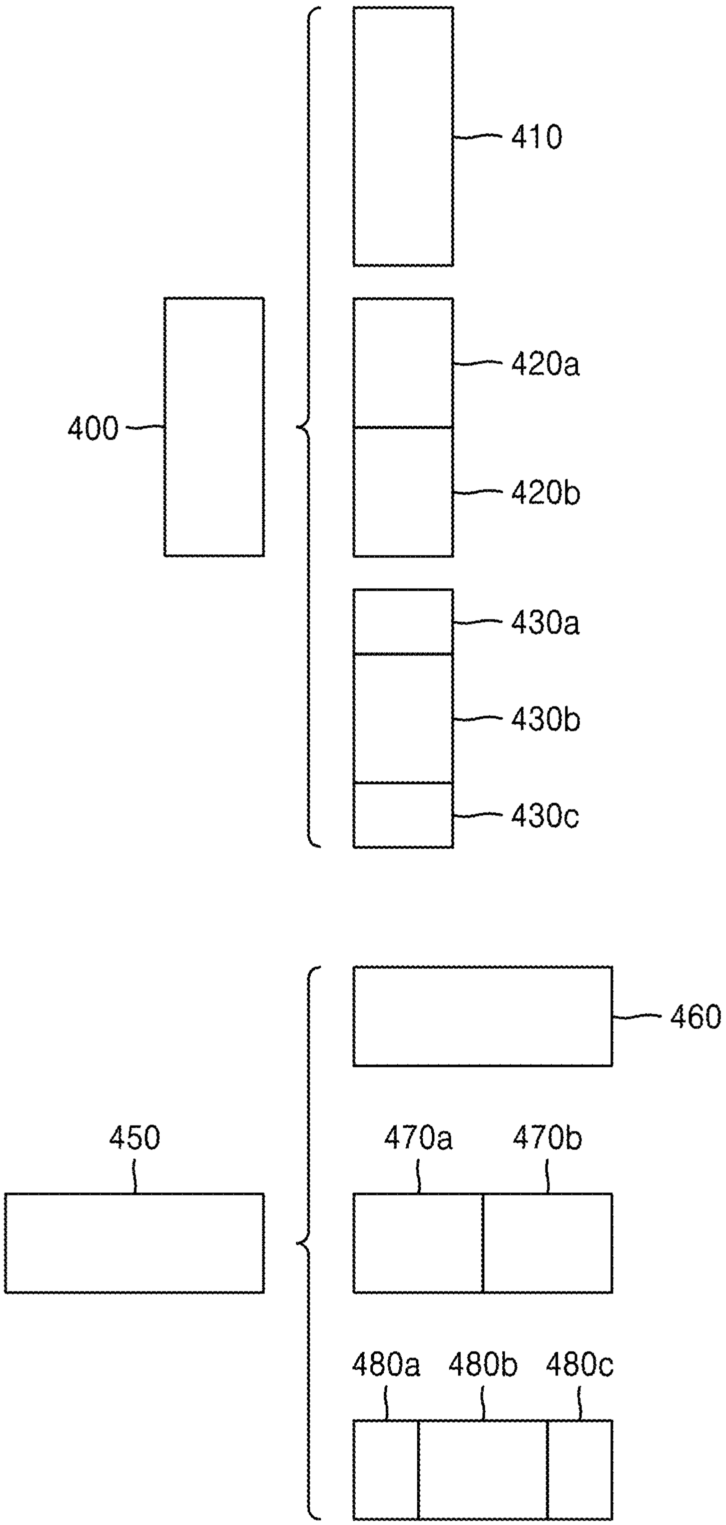
FIG. 4 illustrates a process, performed by an image decoding apparatus, of determining at least one coding unit by splitting a non-square coding unit, according to an embodiment.

FIG. 4 illustrates a process, performed by an image decoding apparatus, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a preset splitting method, based on split shape mode information. Referring to FIG. 4, when the block shape information of a current coding unit 400 or 450 indicates a non-square shape, the image decoding apparatus 100 may determine that a coding unit 410 or 460 having the same size as the current coding unit 400 or 450 is not split, based on the split shape mode information indicating not to perform splitting, or determine coding units 420*a* and 420*b*, 430*a* to 430*c*, 470*a* and 470*b*, or 480*a* to 480*c* split based on the split shape mode information indicating a preset splitting method. Preset splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420*a* and 420*b*, or 470*a* and 470*b* included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may consider the location of a long side of the non-square current coding unit 400 or 450 to split a current coding unit. For example, the image decoding apparatus 100 may determine a plurality of coding units by splitting the current coding unit 400 or 450 in a direction of splitting a long side of the current coding unit 400 or 450, in consideration of the shape of the current coding unit 400 or 450.

According to an embodiment, when the split shape mode information indicates to split (ternary split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430*a*, 430*b*, and 430*c*, or 480*a*, 480*b*, and 480*c*.

According to an embodiment, a ratio of the width and height of the current coding unit 400 or 450 may be 4:1 or 1:4. When the ratio of the width and height is 4:1, the block shape information may be a horizontal direction because the length of the width is longer than the length of the height. When the ratio of the width and height is 1:4, the block shape information may be a vertical direction because the length of the width is shorter than the length of the height. The image decoding apparatus 100 may determine to split a current coding unit into the odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430*a* to 430*c* by splitting the current coding unit 400 in the horizontal direction. Also, when the current coding unit 450 is in the horizontal direction, the image decoding apparatus 100 may determine the coding units 480*a* to 480*c* by splitting the current coding unit 450 in the vertical direction.

According to an embodiment, the image decoding apparatus 100 may determine the odd number of coding units included in the current coding unit 400 or 450, and not all the determined coding units may have the same size. For example, a preset coding unit 430*b* or 480*b* from among the determined odd number of coding units 430*a*, 430*b*, and 430*c*, or 480*a*, 480*b*, and 480*c* may have a size different from the size of the other coding units 430*a* and 430*c*, or 480*a* and 480*c*. That is, coding units which may be determined by splitting the current coding unit 400 or 450 may have multiple sizes and, in some cases, all of the odd number of coding units 430*a*, 430*b*, and 430*c*, or 480*a*, 480*b*, and 480*c* may have different sizes.

According to an embodiment, when the split shape mode information indicates to split a coding unit into the odd number of blocks, the image decoding apparatus 100 may determine the odd number of coding units included in the current coding unit 400 or 450, and moreover, may put a preset restriction on at least one coding unit from among the odd number of coding units generated by splitting the current coding unit 400 or 450. Referring to FIG. 4, the image decoding apparatus 100 may set a decoding process regarding the coding unit 430*b* or 480*b* located at the center among the three coding units 430*a*, 430*b*, and 430*c*, or 480*a*, 480*b*, and 480*c* generated as the current coding unit 400 or 450 is split to be different from that of the other coding units 430*a* and 430*c*, or 480*a* and 480*c*. For example, the image decoding apparatus 100 may restrict the coding unit 430*b* or 480*b* at the center location to be no longer split or to be split only a preset number of times, unlike the other coding units 430*a* and 430*c*, or 480*a* and 480*c*.

Figure 5:
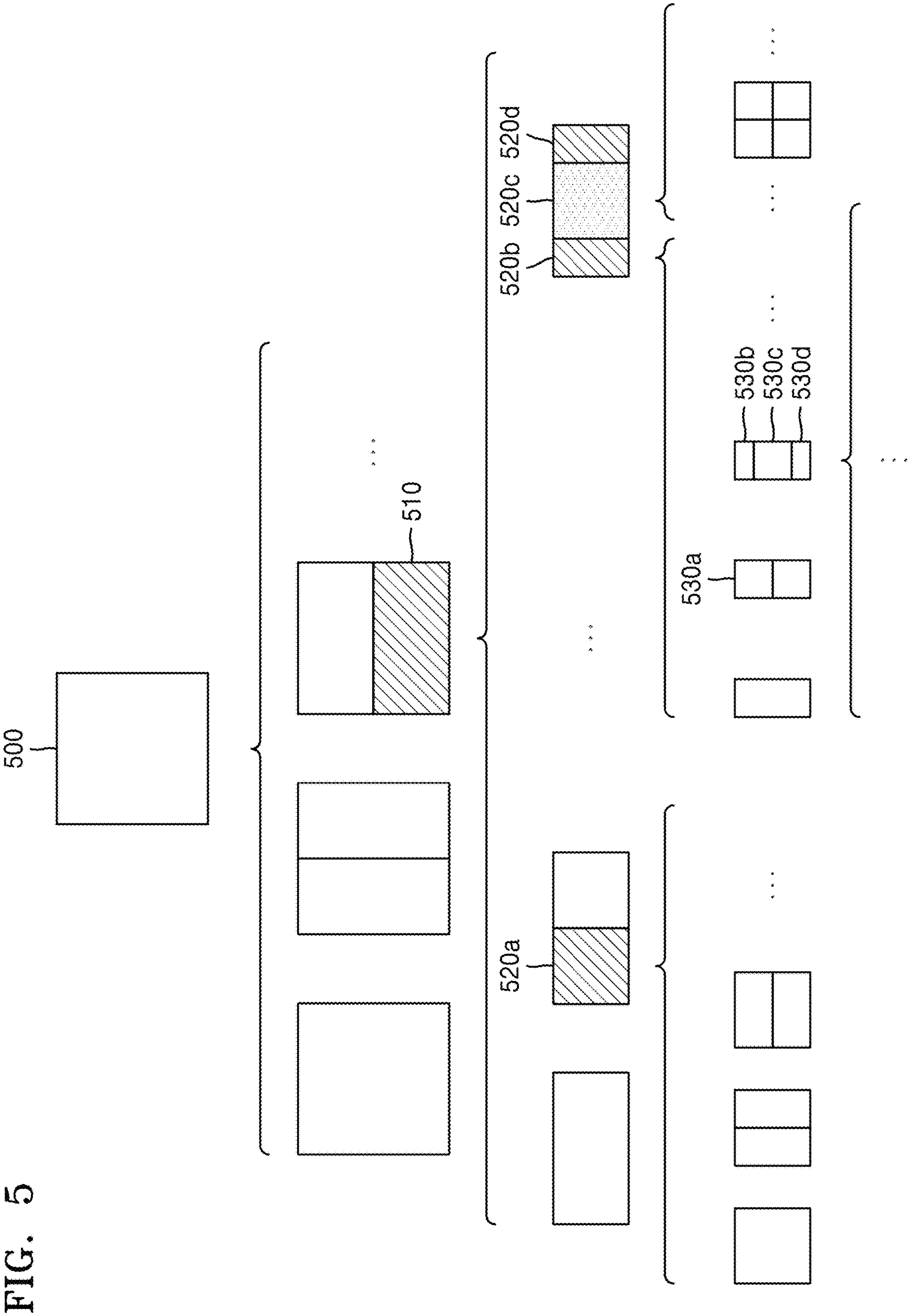
FIG. 5 illustrates a process, performed by an image decoding apparatus, of splitting a coding unit based on at least one of block shape information and split shape mode information, according to an embodiment.

FIG. 5 illustrates a process, performed by an image decoding apparatus, of splitting a coding unit based on at least one of block shape information and split shape mode information, according to an embodiment.

According to an embodiment, the image decoding apparatus 100 may determine to split or not to split a square first coding unit 500 into coding units, based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an embodiment, the image decoding apparatus 100 may determine to split or not to split the determined second coding unit 510 into coding units, based on the split shape mode information. Referring to FIG. 5, the image decoding apparatus 100 may split the non-square second coding unit 510, which is determined by splitting the first coding unit 500, into one or more third coding units 520*a*, 520*b*, 520*c*, and 520*d* based on at least one of the split shape mode information and the split shape mode information, or may not split the non-square second coding unit 510. The image decoding apparatus 100 may obtain the split shape mode information, and may obtain a plurality of various-shaped second coding units (e.g., 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units (e.g., 520*a*, or 520*b*, 520*c*, and 520*d*) based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a preset coding unit (e.g., a coding unit located at a center location, or a square coding unit) from among an odd number of third coding units 520*b*, 520*c*, and 520*d* determined by splitting the non-square second coding unit 510 may be recursively split. According to an embodiment, the square third coding unit 520*c* from among the odd number of third coding units 520*b*, 520*c*, and 520*d* may be split in a horizontal direction into a plurality of fourth coding units. A non-square fourth coding unit 530*b* or 530*d* from among the plurality of fourth coding units 530*a*, 530*b*, 530*c*, and 530*d* may be re-split into a plurality of coding units. For example, the non-square fourth coding unit 530*b* or 530*d* may be re-split into an odd number of coding units. A method that may be used to recursively split a coding unit will be described below in relation to various embodiments.

According to an embodiment, the image decoding apparatus 100 may split each of the third coding units 520*a*, or 520*b*, 520*c*, and 520*d* into coding units, based on the split shape mode information. Also, the image decoding apparatus 100 may determine not to split the second coding unit 510 based on the split shape mode information. According to an embodiment, the image decoding apparatus 100 may split the non-square second coding unit 510 into the odd number of third coding units 520*b*, 520*c*, and 520*d*. The image decoding apparatus 100 may put a preset restriction on a preset third coding unit from among the odd number of third coding units 520*b*, 520*c*, and 520*d*. For example, the image decoding apparatus 100 may restrict the third coding unit 520*c* at a center location from among the odd number of third coding units 520*b*, 520*c*, and 520*d* to be no longer split or to be split a settable number of times.

Referring to FIG. 5, the image decoding apparatus 100 may restrict the third coding unit 520*c*, which is at the center location from among the odd number of third coding units 520*b*, 520*c*, and 520*d* included in the non-square second coding unit 510, to be no longer split, to be split by using a preset splitting method (e.g., split into only four coding units or split by using a splitting method of the second coding unit 510), or to be split only a preset number of times (e.g., split only n times (where n>0)). However, the restrictions on the third coding unit 520*c* at the center location are not limited to the above-described examples, and may include various restrictions for decoding the third coding unit 520*c* at the center location differently from the other third coding units 520*b* and 520*d*.

According to an embodiment, the image decoding apparatus 100 may obtain the split shape mode information, which is used to split a current coding unit, from a preset location in the current coding unit.

Figure 6:
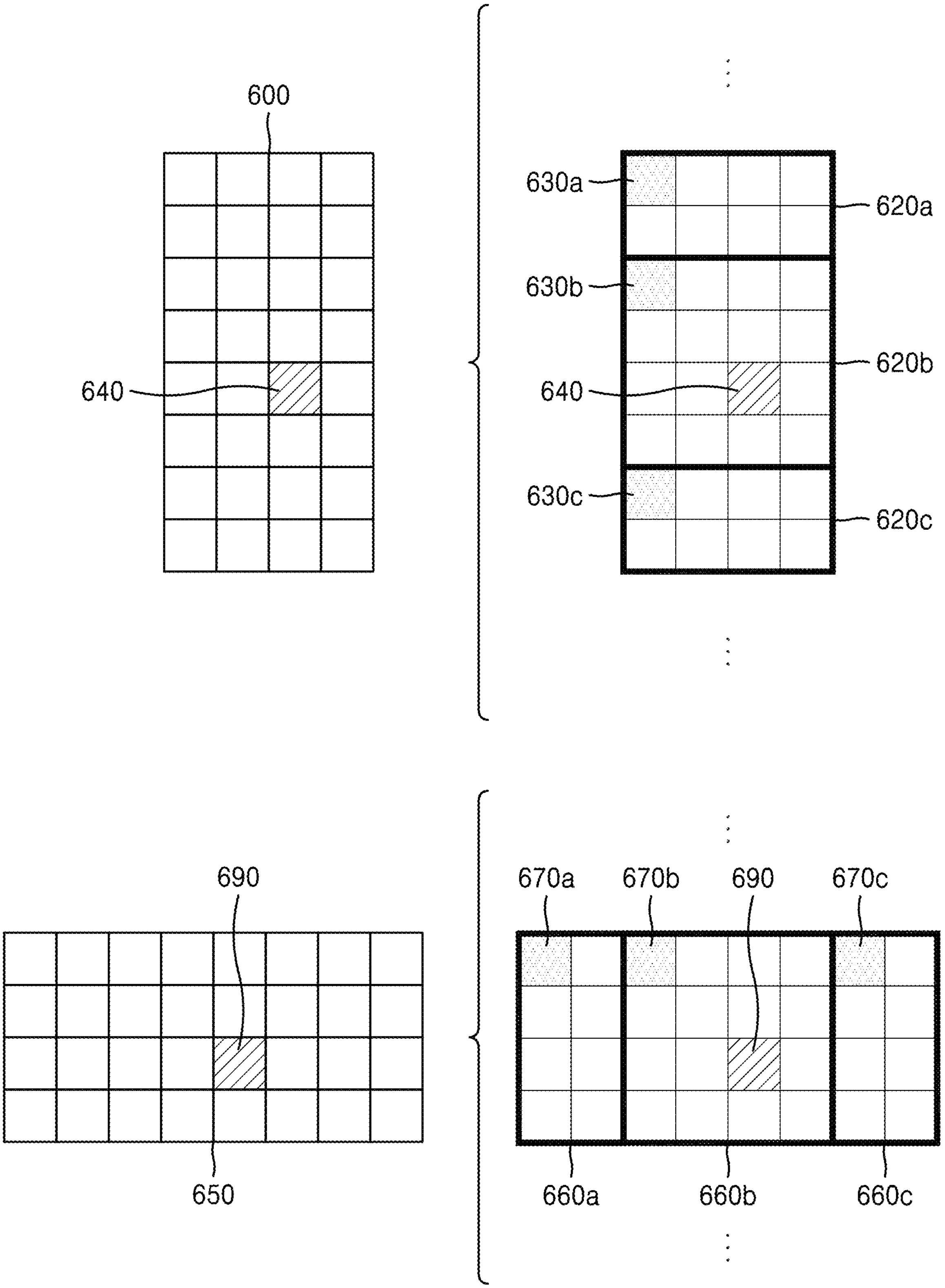
FIG. 6 illustrates a method, performed by an image decoding apparatus, of determining a preset coding unit from among an odd number of coding units, according to an embodiment.

FIG. 6 illustrates a method, performed by an image decoding apparatus, of determining a preset coding unit from among an odd number of coding units, according to an embodiment.

Referring to FIG. 6, split shape mode information of a current coding unit 600 or 650 may be obtained from a sample of a preset location (e.g., a sample 640 or 690 of a center location) from among a plurality of samples included in the current coding unit 600 or 650. However, the preset location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, lower right locations, or the like). The image decoding apparatus 100 may obtain the split shape mode information from the preset location and may determine to split or not to split the current coding unit into various-shaped and various-sized coding units.

According to an embodiment, when the current coding unit is split into a preset number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a preset location.

According to an embodiment, image decoding apparatus 100 may use information indicating locations of the odd number of coding units, to determine a coding unit at a center location from among the odd number of coding units. Referring to FIG. 6, the image decoding apparatus 100 may determine the odd number of coding units 620*a*, 620*b*, and 620*c* or the odd number of coding units 660*a*, 660*b*, and 660*c* by splitting the current coding unit 600 or the current coding unit 650. The image decoding apparatus 100 may determine the middle coding unit 620*b* or the middle coding unit 660*b* by using information about the locations of the odd number of coding units 620*a*, 620*b*, and 620*c* or the odd number of coding units 660*a*, 660*b*, and 660*c*. For example, the image decoding apparatus 100 may determine the coding unit 620*b* of the center location by determining the locations of the coding units 620*a*, 620*b*, and 620*c* based on information indicating locations of preset samples included in the coding units 620*a*, 620*b*, and 620*c*. In detail, the image decoding apparatus 100 may determine the coding unit 620*b* at the center location by determining the locations of the coding units 620*a*, 620*b*, and 620*c* based on information indicating locations of upper-left samples 630*a*, 630*b*, and 630*c* of the coding units 620*a*, 620*b*, and 620*c*.

According to an embodiment, the information indicating the locations of the upper-left samples 630*a*, 630*b*, and 630*c*, which are included in the coding units 620*a*, 620*b*, and 620*c*, respectively, may include information about locations or coordinates of the coding units 620*a*, 620*b*, and 620*c* in a picture. According to an embodiment, the information indicating the locations of the upper-left samples 630*a*, 630*b*, and 630*c*, which are included in the coding units 620*a*, 620*b*, and 620*c*, respectively, may include information indicating widths or heights of the coding units 620*a*, 620*b*, and 620*c* included in the current coding unit 600, and the widths or heights may correspond to information indicating differences between the coordinates of the coding units 620*a*, 620*b*, and 620*c* in the picture. That is, the image decoding apparatus 100 may determine the coding unit 620*b* at the center location by directly using the information about the locations or coordinates of the coding units 620*a*, 620*b*, and 620*c* in the picture, or by using the information about the widths or heights of the coding units, which correspond to the difference values between the coordinates.

According to an embodiment, information indicating the location of the upper-left sample 630*a* of the upper coding unit 620*a* may include coordinates (xa, ya), information indicating the location of the upper-left sample 630*b* of the middle coding unit 620*b* may include coordinates (xb, yb), and information indicating the location of the upper-left sample 630*c* of the lower coding unit 620*c* may include coordinates (xc, yc). The image decoding apparatus 100 may determine the middle coding unit 620*b* by using the coordinates of the upper-left samples 630*a*, 630*b*, and 630*c* which are included in the coding units 620*a*, 620*b*, and 620*c*, respectively. For example, when the coordinates of the upper-left samples 630*a*, 630*b*, and 630*c* are sorted in an ascending or descending order, the coding unit 620*b* including the coordinates (xb, yb) of the sample 630*b* at a center location may be determined as a coding unit at a center location from among the coding units 620*a*, 620*b*, and 620*c* determined by splitting the current coding unit 600. However, the coordinates indicating the locations of the upper-left samples 630*a*, 630*b*, and 630*c* may include coordinates indicating absolute locations in the picture, or may use coordinates (dxb, dyb) indicating a relative location of the upper-left sample 630*b* of the middle coding unit 620*b* and coordinates (dxc, dyc) indicating a relative location of the upper-left sample 630*c* of the lower coding unit 620*c* with reference to the location of the upper-left sample 630*a* of the upper coding unit 620*a*. A method of determining a coding unit at a preset location by using coordinates of a sample included in the coding unit, as information indicating a location of the sample, is not limited to the above-described method, and may include various arithmetic methods capable of using the coordinates of the sample.

According to an embodiment, the image decoding apparatus 100 may split the current coding unit 600 into a plurality of coding units 620*a*, 620*b*, and 620*c*, and may select one of the coding units 620*a*, 620*b*, and 620*c* based on a preset criterion. For example, the image decoding apparatus 100 may select the coding unit 620*b*, which has a size different from that of the others, from among the coding units 620*a*, 620*b*, and 620*c*.

According to an embodiment, the image decoding apparatus 100 may determine the width or height of each of the coding units 620*a*, 620*b*, and 620*c* by using the coordinates (xa, ya) that is the information indicating the location of the upper-left sample 630*a* of the upper coding unit 620*a*, the coordinates (xb, yb) that is the information indicating the location of the upper-left sample 630*b* of the middle coding unit 620*b*, and the coordinates (xc, yc) that is the information indicating the location of the upper-left sample 630*c* of the lower coding unit 620*c*. The image decoding apparatus 100 may determine the respective sizes of the coding units 620*a*, 620*b*, and 620*c* by using the coordinates (xa, ya), (xb, yb), and (xc, yc) indicating the locations of the coding units 620*a*, 620*b*, and 620*c*. According to an embodiment, the image decoding apparatus 100 may determine the width of the upper coding unit 620*a* to be the width of the current coding unit 600. The image decoding apparatus 100 may determine the height of the upper coding unit 620*a* to be yb-ya. According to an embodiment, the image decoding apparatus 100 may determine the width of the middle coding unit 620*b* to be the width of the current coding unit 600. The image decoding apparatus 100 may determine the height of the middle coding unit 620*b* to be yc-yb. According to an embodiment, the image decoding apparatus 100 may determine the width or height of the lower coding unit 620*c* by using the width or height of the current coding unit 600 or the widths or heights of the upper and middle coding units 620*a* and 620*b*. The image decoding apparatus 100 may determine a coding unit, which has a size different from that of the others, based on the determined widths and heights of the coding units 620*a* to 620*c*. Referring to FIG. 6, the image decoding apparatus 100 may determine the middle coding unit 620*b*, which has a size different from the size of the upper and lower coding units 620*a* and 620*c*, as the coding unit of the preset location. However, the above-described method, performed by the image decoding apparatus 100, of determining a coding unit having a size different from the size of the other coding units merely corresponds to an example of determining a coding unit at a preset location by using the sizes of coding units, which are determined based on coordinates of samples, and thus various methods of determining a coding unit at a preset location by comparing the sizes of coding units, which are determined based on coordinates of preset samples, may be used.

The image decoding apparatus 100 may determine the width or height of each of the coding units 660*a*, 660*b*, and 660*c* by using the coordinates (xd, yd) that is information indicating the location of an upper-left sample 670*a* of the left coding unit 660*a*, the coordinates (xe, ye) that is information indicating the location of an upper-left sample 670*b* of the middle coding unit 660*b*, and the coordinates (xf, yf) that is information indicating a location of the upper-left sample 670*c* of the right coding unit 660*c*. The image decoding apparatus 100 may determine the respective sizes of the coding units 660*a*, 660*b*, and 660*c* by using the coordinates (xd, yd), (xe, ye), and (xf, yf) indicating the locations of the coding units 660*a*, 660*b*, and 660*c*.

According to an embodiment, the image decoding apparatus 100 may determine the width of the left coding unit 660*a* to be xe-xd. The image decoding apparatus 100 may determine the height of the left coding unit 660*a* to be the height of the current coding unit 650. According to an embodiment, the image decoding apparatus 100 may determine the width of the middle coding unit 660*b* to be xf-xe. The image decoding apparatus 100 may determine the height of the middle coding unit 660*b* to be the height of the current coding unit 650. According to an embodiment, the image decoding apparatus 100 may determine the width or height of the right coding unit 660*c* by using the width or height of the current coding unit 650 or the widths or heights of the left and middle coding units 660*a* and 660*b*. The image decoding apparatus 100 may determine a coding unit, which has a size different from that of the others, based on the determined widths and heights of the coding units 660*a* to 660*c*. Referring to FIG. 6, the image decoding apparatus 100 may determine the middle coding unit 660*b*, which has a size different from the sizes of the left and right coding units 660*a* and 660*c*, as the coding unit of the preset location. However, the above-described method, performed by the image decoding apparatus 100, of determining a coding unit having a size different from the size of the other coding units merely corresponds to an example of determining a coding unit at a preset location by using the sizes of coding units, which are determined based on coordinates of samples, and thus various methods of determining a coding unit at a preset location by comparing the sizes of coding units, which are determined based on coordinates of preset samples, may be used.

However, locations of samples considered to determine locations of coding units are not limited to the above-described upper left locations, and information about arbitrary locations of samples included in the coding units may be used.

According to an embodiment, the image decoding apparatus 100 may select a coding unit at a preset location from among an odd number of coding units determined by splitting the current coding unit, considering the shape of the current coding unit. For example, when the current coding unit has a non-square shape, a width of which is longer than a height, the image decoding apparatus 100 may determine the coding unit at the preset location in a horizontal direction. That is, the image decoding apparatus 100 may determine one of coding units at different locations in a horizontal direction and put a restriction on the coding unit. When the current coding unit has a non-square shape, a height of which is longer than a width, the image decoding apparatus 100 may determine the coding unit at the preset location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the preset location from among the even number of coding units. The image decoding apparatus 100 may determine an even number of coding units by splitting (binary splitting) the current coding unit, and may determine the coding unit at the preset location by using the information about the locations of the even number of coding units. An operation related thereto may correspond to the operation of determining a coding unit at a preset location (e.g., a center location) from among an odd number of coding units, which has been described in detail above in relation to FIG. 6, and thus detailed descriptions thereof are not provided here.

According to an embodiment, when a non-square current coding unit is split into a plurality of coding units, preset information about a coding unit at a preset location may be used in a splitting operation to determine the coding unit at the preset location from among the plurality of coding units. For example, the image decoding apparatus 100 may use at least one of block shape information and split shape mode information, which is stored in a sample included in a middle coding unit, in a splitting operation to determine a coding unit at a center location from among the plurality of coding units determined by splitting the current coding unit.

Referring to FIG. 6, the image decoding apparatus 100 may split the current coding unit 600 into the plurality of coding units 620*a*, 620*b*, and 620*c* based on the split shape mode information, and may determine the coding unit 620*b* at a center location from among the plurality of the coding units 620*a*, 620*b*, and 620*c*. Furthermore, the image decoding apparatus 100 may determine the coding unit 620*b* at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620*a*, 620*b*, and 620*c* based on the split shape mode information, the coding unit 620*b* including the sample 640 may be determined as the coding unit at the center location. However, information used to determine the coding unit at the center location is not limited to the split shape mode information, and various types of information may be used to determine the coding unit at the center location.

According to an embodiment, preset information for identifying the coding unit at the preset location may be obtained from a preset sample included in a coding unit to be determined. Referring to FIG. 6, the image decoding apparatus 100 may use the split shape mode information, which is obtained from a sample at a preset location in the current coding unit 600 (e.g., a sample at a center location of the current coding unit 600) to determine a coding unit at a preset location from among the plurality of the coding units 620*a*, 620*b*, and 620*c* determined by splitting the current coding unit 600 (e.g., a coding unit at a center location from among a plurality of split coding units). That is, the image decoding apparatus 100 may determine the sample at the preset location by considering a block shape of the current coding unit 600, determine the coding unit 620*b* including a sample, from which preset information (e.g., the split shape mode information) may be obtained, from among the plurality of coding units 620*a*, 620*b*, and 620*c* determined by splitting the current coding unit 600, and may put a preset restriction on the coding unit 620*b*. Referring to FIG. 6, according to an embodiment, the image decoding apparatus 100 may determine the sample 640 at the center location of the current coding unit 600 as the sample from which the preset information may be obtained, and may put a preset restriction on the coding unit 620*b* including the sample 640, in a decoding operation. However, the location of the sample from which the preset information may be obtained is not limited to the above-described location, and may include arbitrary locations of samples included in the coding unit 620*b* to be determined for a restriction.

According to an embodiment, the location of the sample from which the preset information may be obtained may be determined based on the shape of the current coding unit 600. According to an embodiment, the block shape information may indicate whether the current coding unit has a square or non-square shape, and the location of the sample from which the preset information may be obtained may be determined based on the shape. For example, the image decoding apparatus 100 may determine a sample located on a boundary for splitting at least one of a width and height of the current coding unit in half, as the sample from which the preset information may be obtained, by using at least one of information about the width of the current coding unit and information about the height of the current coding unit. As another example, when the block shape information of the current coding unit indicates a non-square shape, the image decoding apparatus 100 may determine one of samples adjacent to a boundary for splitting a long side of the current coding unit in half, as the sample from which the preset information may be obtained.

According to an embodiment, when the current coding unit is split into a plurality of coding units, the image decoding apparatus 100 may use the split shape mode information to determine a coding unit at a preset location from among the plurality of coding units. According to an embodiment, the image decoding apparatus 100 may obtain the split shape mode information from a sample at a preset location in a coding unit, and split the plurality of coding units, which are generated by splitting the current coding unit, by using the split shape mode information, which is obtained from the sample of the preset location in each of the plurality of coding units. That is, a coding unit may be recursively split based on the split shape mode information, which is obtained from the sample at the preset location in each coding unit. An operation of recursively splitting a coding unit has been described above in relation to FIG. 5, and thus detailed descriptions thereof will not be provided here.

According to an embodiment, the image decoding apparatus 100 may determine one or more coding units by splitting the current coding unit, and may determine an order of decoding the one or more coding units, based on a preset block (e.g., the current coding unit).

Figure 7:
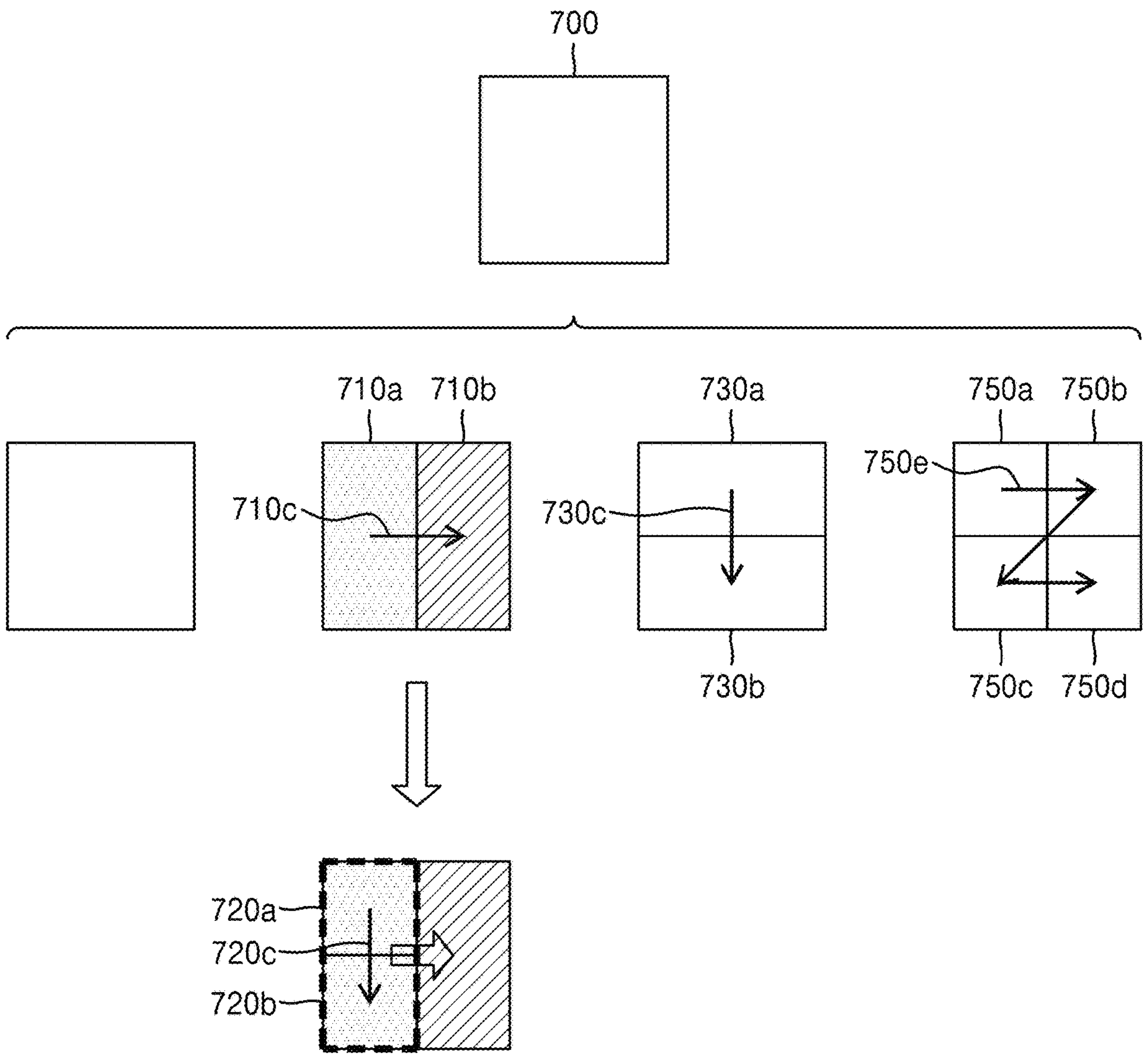
FIG. 7 illustrates an order of processing a plurality of coding units when an image decoding apparatus determines the plurality of coding units by splitting a current coding unit, according to an embodiment.

FIG. 7 illustrates an order of processing a plurality of coding units when an image decoding apparatus determines the plurality of coding units by splitting a current coding unit, according to an embodiment.

According to an embodiment, the image decoding apparatus 100 may determine second coding units 710*a* and 710*b* by splitting a first coding unit 700 in a vertical direction, determine second coding units 730*a* and 730*b* by splitting the first coding unit 700 in a horizontal direction, or determine second coding units 750*a* to 750*d* by splitting the first coding unit 700 in vertical and horizontal directions, based on split shape mode information.

Referring to FIG. 7, the image decoding apparatus 100 may determine to process the second coding units 710*a* and 710*b*, which are determined by splitting the first coding unit 700 in a vertical direction, in a horizontal direction order 710*c*. The image decoding apparatus 100 may determine to process the second coding units 730*a* and 730*b*, which are determined by splitting the first coding unit 700 in a horizontal direction, in a vertical direction order 730*c*. The image decoding apparatus 100 may determine the second coding units 750*a* to 750*d*, which are determined by splitting the first coding unit 700 in vertical and horizontal directions, according to a preset order (e.g., a raster scan order or Z-scan order 750*c*) by which coding units in a row are processed and then coding units in a next row are processed.

According to an embodiment, the image decoding apparatus 100 may recursively split coding units. Referring to FIG. 7, the image decoding apparatus 100 may determine the plurality of coding units 710*a* and 710*b*, 730*a* and 730*b*, or 750*a* to 750*d* by splitting the first coding unit 700, and recursively split each of the determined plurality of coding units 710*a*, 710*b*, 730*a*, 730*b*, 750*a*, 750*b*, 750*c*, and 750*d*. A splitting method of the plurality of coding units 710*a* and 710*b*, 730*a* and 730*b*, or 750*a* to 750*d* may correspond to a splitting method of the first coding unit 700. As such, each of the plurality of coding units 710*a* and 710*b*, 730*a* and 730*b*, or 750*a* to 750*d* may be independently split into a plurality of coding units. Referring to FIG. 7, the image decoding apparatus 100 may determine the second coding units 710*a* and 710*b* by splitting the first coding unit 700 in a vertical direction, and may determine to independently split or not to split each of the second coding units 710*a* and 710*b*.

According to an embodiment, the image decoding apparatus 100 may determine third coding units 720*a* and 720*b* by splitting the left second coding unit 710*a* in a horizontal direction, and may not split the right second coding unit 710*b*.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720*a* and 720*b* determined by splitting the left second coding unit 710*a*, independently of the right second coding unit 710*b*. Because the third coding units 720*a* and 720*b* are determined by splitting the left second coding unit 710*a* in a horizontal direction, the third coding units 720*a* and 720*b* may be processed in a vertical direction order 720*c*. Because the left and right second coding units 710*a* and 710*b* are processed in the horizontal direction order 710*c*, the right second coding unit 710*b* may be processed after the third coding units 720*a* and 720*b* included in the left second coding unit 710*a* are processed in the vertical direction order 720*c*. An operation of determining a processing order of coding units based on a coding unit before being split is not limited to the above-described example, and various methods may be used to independently process coding units, which are split and determined to various shapes, in a preset order.

Figure 8:
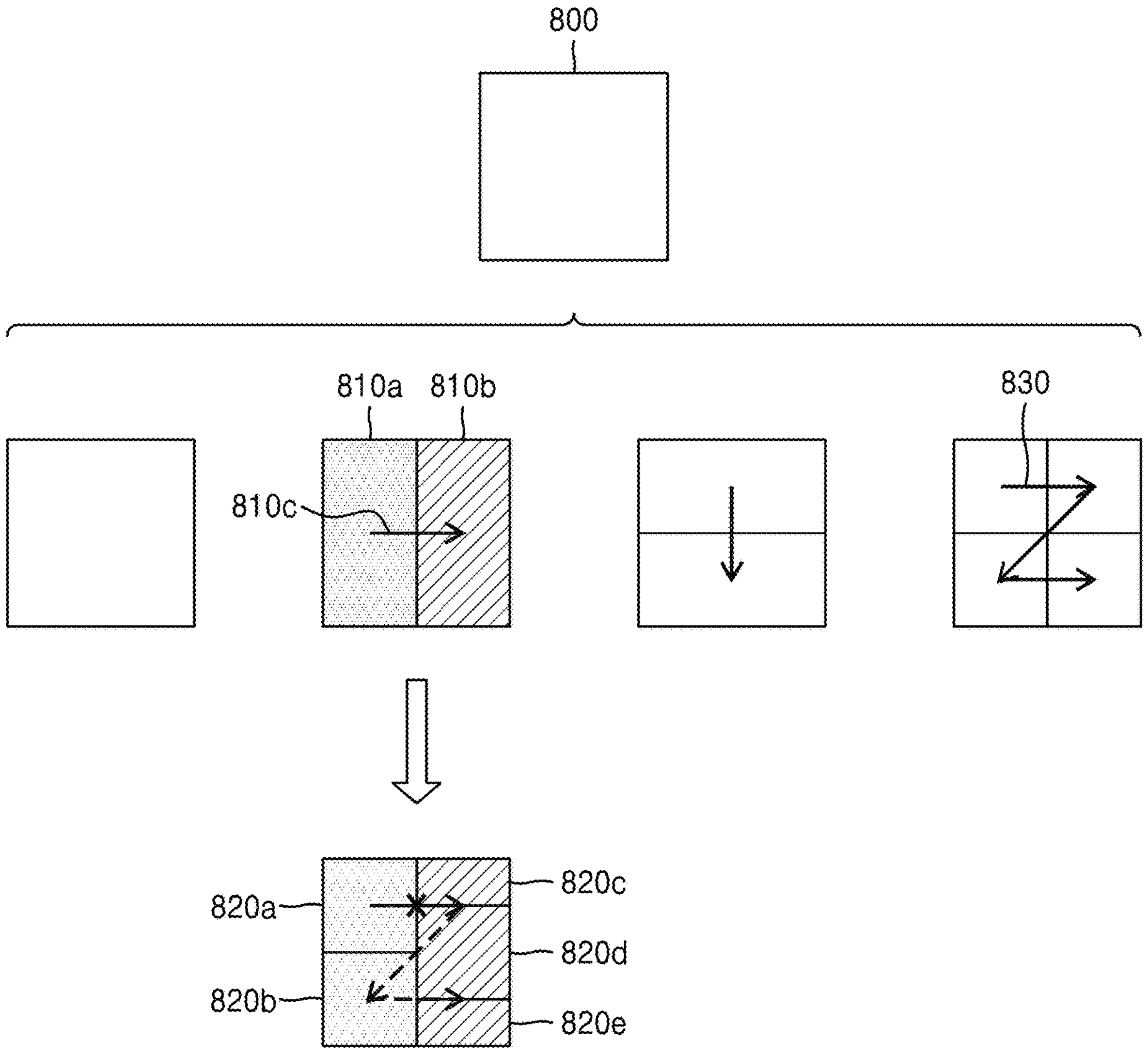
FIG. 8 illustrates a process, performed by an image decoding apparatus, of determining that a current coding unit is to be split into an odd number of coding units, when the coding units are not processable in a preset order, according to an embodiment.

FIG. 8 illustrates a process, performed by an image decoding apparatus, of determining that a current coding unit is to be split into an odd number of coding units, when the coding units are not processable in a preset order, according to an embodiment.

According to an embodiment, the image decoding apparatus 100 may determine that the current coding unit is split into an odd number of coding units, based on obtained split shape mode information. Referring to FIG. 8, a square first coding unit 800 may be split into non-square second coding units 810*a* and 810*b*, and the second coding units 810*a* and 810*b* may be independently split into third coding units 820*a* and 820*b*, and 820*c* to 820*c*. According to an embodiment, the image decoding apparatus 100 may determine the plurality of third coding units 820*a* and 820*b* by splitting the left second coding unit 810*a* in a horizontal direction, and may split the right second coding unit 810*b* into the odd number of third coding units 820*c* to 820*c*.

According to an embodiment, the video decoding apparatus 100 may determine whether any coding unit is split into an odd number of coding units, by determining whether the third coding units 820*a* and 820*b*, and 820*c* to 820*e* are processable in a preset order. Referring to FIG. 8, the image decoding apparatus 100 may determine the third coding units 820*a* and 820*b*, and 820*c* to 820*e* by recursively splitting the first coding unit 800. The image decoding apparatus 100 may determine whether any of the first coding unit 800, the second coding units 810*a* and 810*b*, or the third coding units 820*a* and 820*b*, and 820*c* to 820*e* are split into an odd number of coding units, based on at least one of the block shape information and the split shape mode information. For example, a coding unit located in the right from among the second coding units 810*a* and 810*b* may be split into an odd number of third coding units 820*c*, 820*d*, and 820*c*. A processing order of a plurality of coding units included in the first coding unit 800 may be a preset order (e.g., a Z-scan order 830), and the image decoding apparatus 100 may determine whether the third coding units 820*c*, 820*d*, and 820*e*, which are determined by splitting the right second coding unit 810*b* into an odd number of coding units, satisfy a condition for processing in the preset order.

According to an embodiment, the image decoding apparatus 100 may determine whether the third coding units 820*a* and 820*b*, and 820*c* to 820*e* included in the first coding unit 800 satisfy the condition for processing in the preset order, and the condition relates to whether at least one of a width and height of the second coding units 810*a* and 810*b* is to be split in half along a boundary of the third coding units 820*a* and 820*b*, and 820*c* to 820*c*. For example, the third coding units 820*a* and 820*b* determined when the height of the left second coding unit 810*a* of the non-square shape is split in half may satisfy the condition. It may be determined that the third coding units 820*c* to 820*e* do not satisfy the condition because the boundaries of the third coding units 820*c* to 820*e* determined when the right second coding unit 810*b* is split into three coding units are unable to split the width or height of the right second coding unit 810*b* in half. When the condition is not satisfied as described above, the image decoding apparatus 100 may determine disconnection of a scan order, and may determine that the right second coding unit 810*b* is to be split into an odd number of coding units, based on a result of the determination. According to an embodiment, when a coding unit is split into an odd number of coding units, the image decoding apparatus 100 may put a preset restriction on a coding unit at a preset location from among the split coding units. The restriction or the preset location has been described above in relation to various embodiments, and thus detailed descriptions thereof will not be provided herein.

Figure 9:
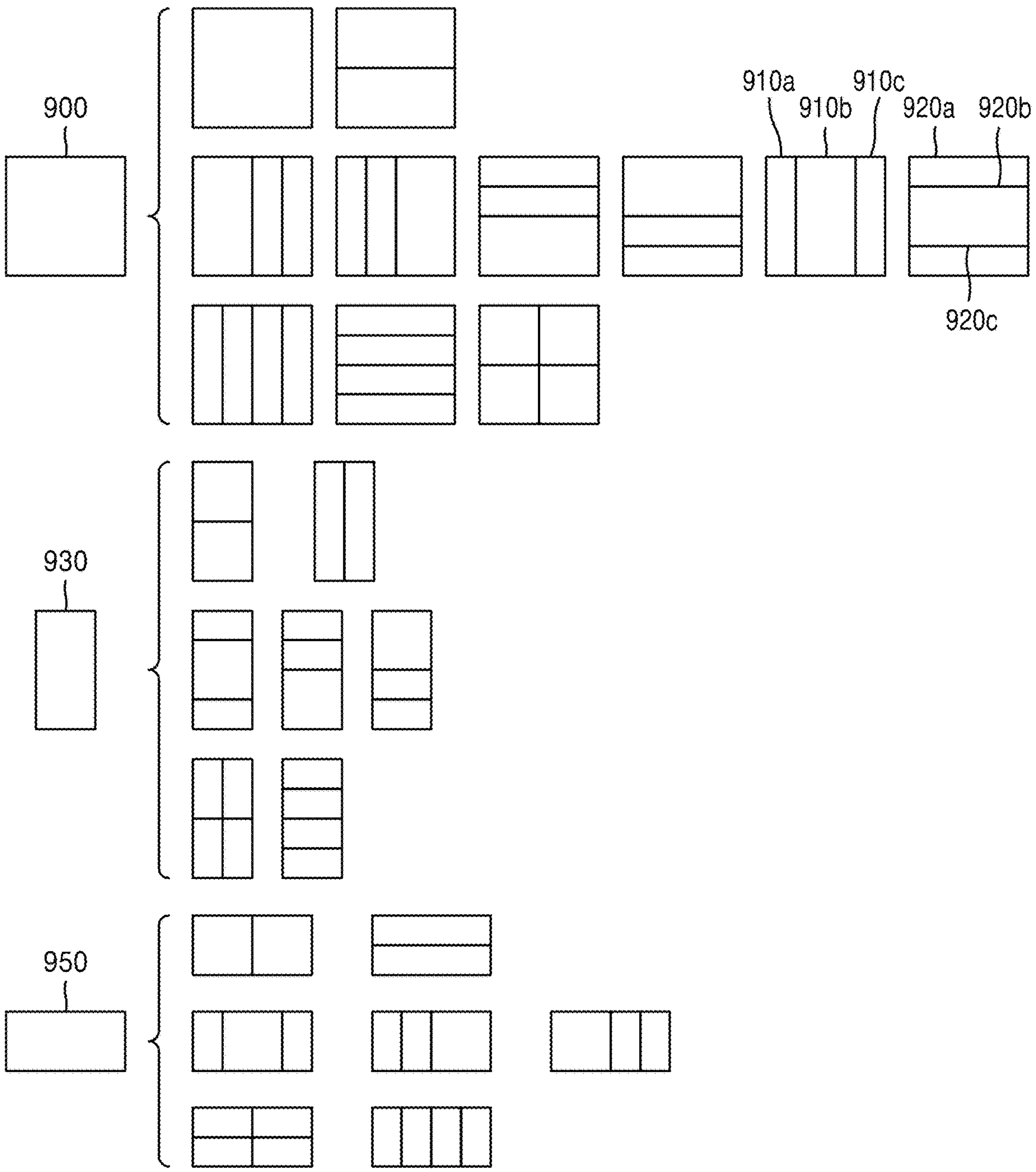
FIG. 9 illustrates a process, performed by an image decoding apparatus, of determining at least one coding unit by splitting a first coding unit, according to an embodiment.

FIG. 9 illustrates a process, performed by an image decoding apparatus, of determining at least one coding unit by splitting a first coding unit, according to an embodiment.

According to an embodiment, the image decoding apparatus 100 may split the first coding unit 900, based on split shape mode information, which is obtained through the receiver 110. The square first coding unit 900 may be split into four square coding units, or may be split into a plurality of non-square coding units. For example, referring to FIG. 9, when the first coding unit 900 has a square shape and the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910*a*, 910*b*, and 910*c* determined by splitting the square first coding unit 900 in a vertical direction or second coding units 920*a*, 920*b*, and 920*c* determined by splitting the square first coding unit 900 in a horizontal direction.

According to an embodiment, the image decoding apparatus 100 may determine whether the second coding units 910*a*, 910*b*, 910*c*, 920*a*, 920*b*, and 920*c* included in the first coding unit 900 satisfy a condition for processing in a preset order, and the condition relates to whether at least one of a width and height of the first coding unit 900 is to be split in half along a boundary of the second coding units 910*a*, 910*b*, 910*c*, 920*a*, 920*b*, and 920*c*. Referring to FIG. 9, because boundaries of the second coding units 910*a*, 910*b*, and 910*c* determined by splitting the square first coding unit 900 in a vertical direction do not split the height of the first coding unit 900 in half, it may be determined that the first coding unit 900 does not satisfy the condition for processing in the preset order. Also, because boundaries of the second coding units 920*a*, 920*b*, and 920*c* determined by splitting the square first coding unit 900 in a horizontal direction do not split the width of the first coding unit 900 in half, it may be determined that the first coding unit 900 does not satisfy the condition for processing in the preset order. When the condition is not satisfied as described above, the image decoding apparatus 100 may decide disconnection of a scan order, and may determine that the first coding unit 900 is to be split into an odd number of coding units, based on a result of the decision. According to an embodiment, when a coding unit is split into an odd number of coding units, the image decoding apparatus 100 may put a preset restriction on a coding unit at a preset location from among the split coding units. The restriction or the preset location has been described above in relation to various embodiments, and thus detailed descriptions thereof will not be provided herein.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
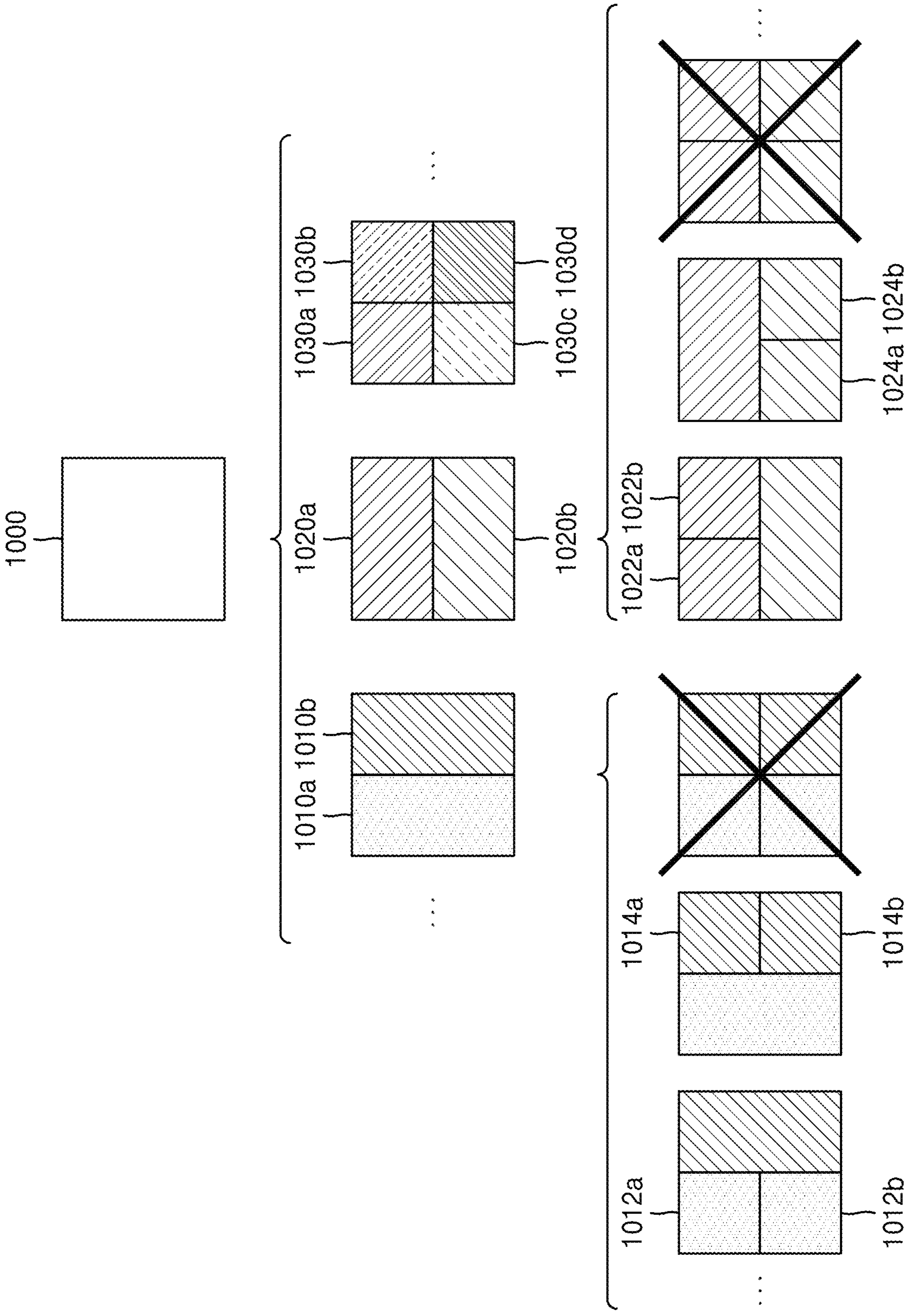
FIG. 10 illustrates that a shape into which a second coding unit is splittable is restricted when the second coding unit having a non-square shape, which is determined by splitting a first coding unit, satisfies a preset condition, according to an embodiment.

FIG. 10 illustrates that a shape into which a second coding unit is splittable is restricted when the second coding unit having a non-square shape, which is determined when an image decoding apparatus splits a first coding unit, satisfies a preset condition, according to an embodiment.

According to an embodiment, the image decoding apparatus 100 may determine to split the square first coding unit 1000 into non-square second coding units 1010*a*, and 1010*b* or 1020*a* and 1020*b*, based on split shape mode information, which is obtained by the receiver 110. The second coding units 1010*a* and 1010*b*, or 1020*a* and 1020*b* may be independently split. As such, the image decoding apparatus 100 may determine to split or not to split each of the second coding units 1010*a* and 1010*b*, or 1020*a* and 1020*b* into a plurality of coding units, based on the split shape mode information of each of the second coding units 1010*a* and 1010*b*, or 1020*a* and 1020*b*. According to an embodiment, the image decoding apparatus 100 may determine third coding units 1012*a* and 1012*b* by splitting the non-square left second coding unit 1010*a*, which is determined by splitting the first coding unit 1000 in a vertical direction, in a horizontal direction. However, when the left second coding unit 1010*a* is split in a horizontal direction, the image decoding apparatus 100 may restrict the right second coding unit 1010*b* to not be split in a horizontal direction in which the left second coding unit 1010*a* is split. When third coding units 1014*a* and 1014*b* are determined by splitting the right second coding unit 1010*b* in a same direction, because the left and right second coding units 1010*a* and 1010*b* are independently split in a horizontal direction, the third coding units 1012*a* and 1012*b*, or 1014*a* and 1014*b* may be determined. However, this case serves equally as a case in which the image decoding apparatus 100 splits the first coding unit 1000 into four square second coding units 1030*a*, 1030*b*, 1030*c*, and 1030*d*, based on the split shape mode information, and may be inefficient in terms of image decoding.

According to an embodiment, the image decoding apparatus 100 may determine third coding units 1022*a* and 1022*b*, or 1024*a* and 1024*b* by splitting the non-square second coding unit 1020*a* or 1020*b*, which is determined by splitting the first coding unit 1000 in a horizontal direction, in a vertical direction. However, when a second coding unit (e.g., the upper second coding unit 1020*a*) is split in a vertical direction, for the above-described reason, the image decoding apparatus 100 may restrict the other second coding unit (e.g., the lower second coding unit 1020*b*) to not be split in a vertical direction in which the upper second coding unit 1020*a* is split.

Figure 11:
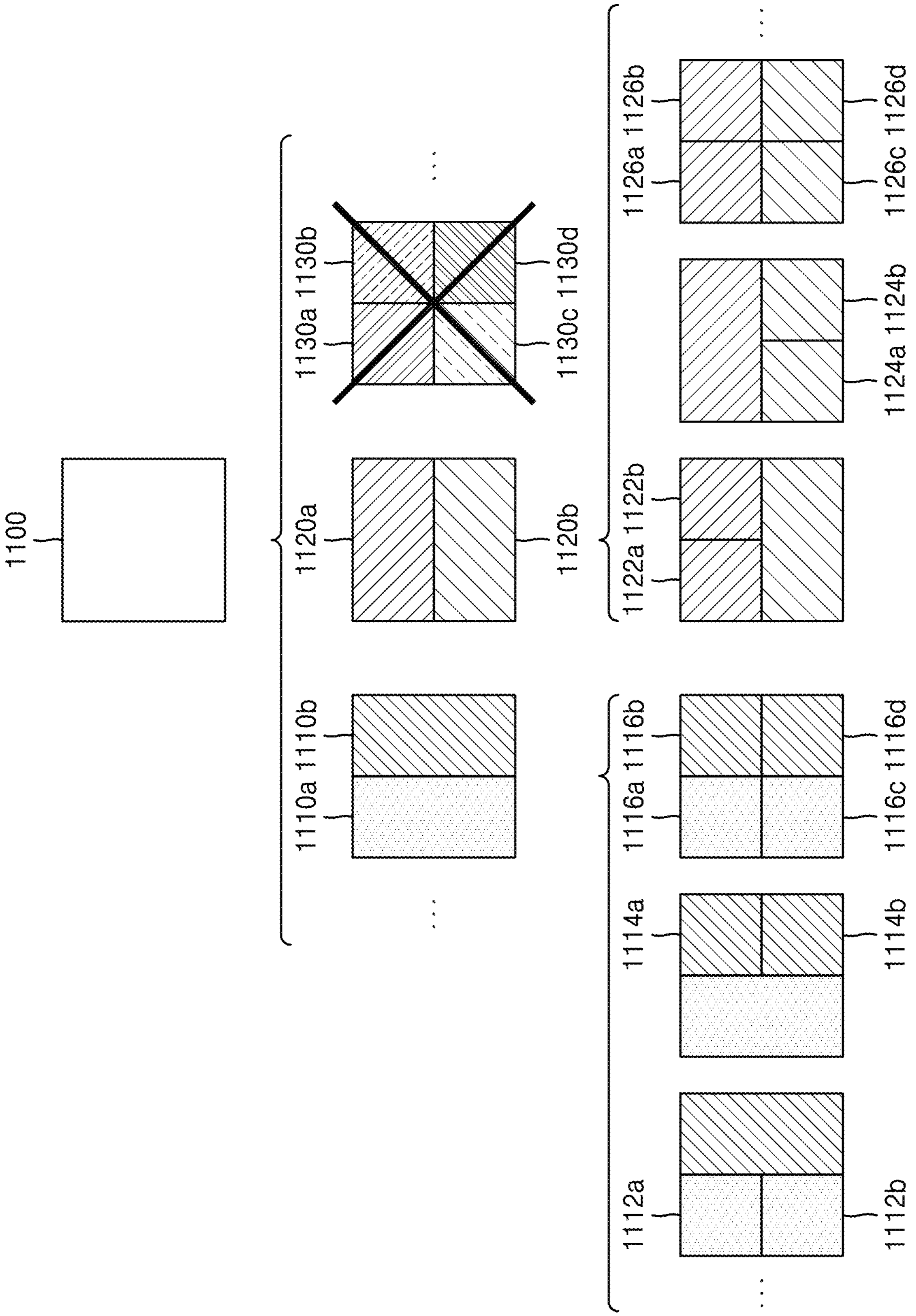
FIG. 11 illustrates a process, performed by an image decoding apparatus, of splitting a square coding unit when split shape mode information indicates that the square coding unit is not to be split into four square coding units, according to an embodiment.

FIG. 11 illustrates a process, performed by an image decoding apparatus, of splitting a square coding unit when split shape mode information indicates that the square coding unit is not to be split into four square coding units, according to an embodiment.

According to an embodiment, the image decoding apparatus 100 may determine second coding units 1110*a* and 1110*b*, or 1120*a* and 1120*b*, etc. by splitting a first coding unit 1100, based on split shape mode information. The split shape mode information may include information about various methods of splitting a coding unit but, the information about various splitting methods may not include information for splitting a coding unit into four square coding units. According to such split shape mode information, the image decoding apparatus 100 may not split the square first coding unit 1100 into four square second coding units 1130*a*, 1130*b*, 1130*c*, and 1130*d*. The image decoding apparatus 100 may determine the non-square second coding units 1110*a* and 1110*b*, or 1120*a* and 1120*b*, etc., based on the split shape mode information.

According to an embodiment, the image decoding apparatus 100 may independently split the non-square second coding units 1110*a* and 1110*b*, or 1120*a* and 1120*b*, etc. Each of the second coding units 1110*a* and 1110*b*, or 1120*a* and 1120*b*, etc. may be recursively split in a preset order, and this splitting method may correspond to a method of splitting the first coding unit 1100, based on the split shape mode information.

For example, the image decoding apparatus 100 may determine square third coding units 1112*a* and 1112*b* by splitting the left second coding unit 1110*a* in a horizontal direction, and may determine square third coding units 1114*a* and 1114*b* by splitting the right second coding unit 1110*b* in a horizontal direction. Furthermore, the image decoding apparatus 100 may determine square third coding units 1116*a*, 1116*b*, 1116*c*, and 1116*d* by splitting both of the left and right second coding units 1110*a* and 1110*b* in a horizontal direction. In this case, coding units having the same shape as the four square second coding units 1130*a*, 1130*b*, 1130*c*, and 1130*d* split from the first coding unit 1100 may be determined.

As another example, the image decoding apparatus 100 may determine square third coding units 1122*a* and 1122*b* by splitting the upper second coding unit 1120*a* in a vertical direction, and may determine square third coding units 1124*a* and 1124*b* by splitting the lower second coding unit 1120*b* in a vertical direction. Furthermore, the image decoding apparatus 100 may determine square third coding units 1126*a*, 1126*b*, 1126*c*, and 1126*d* by splitting both of the upper and lower second coding units 1120*a* and 1120*b* in a vertical direction. In this case, coding units having the same shape as the four square second coding units 1130*a*, 1130*b*, 1130*c*, and 1130*d* split from the first coding unit 1100 may be determined.

Figure 12:
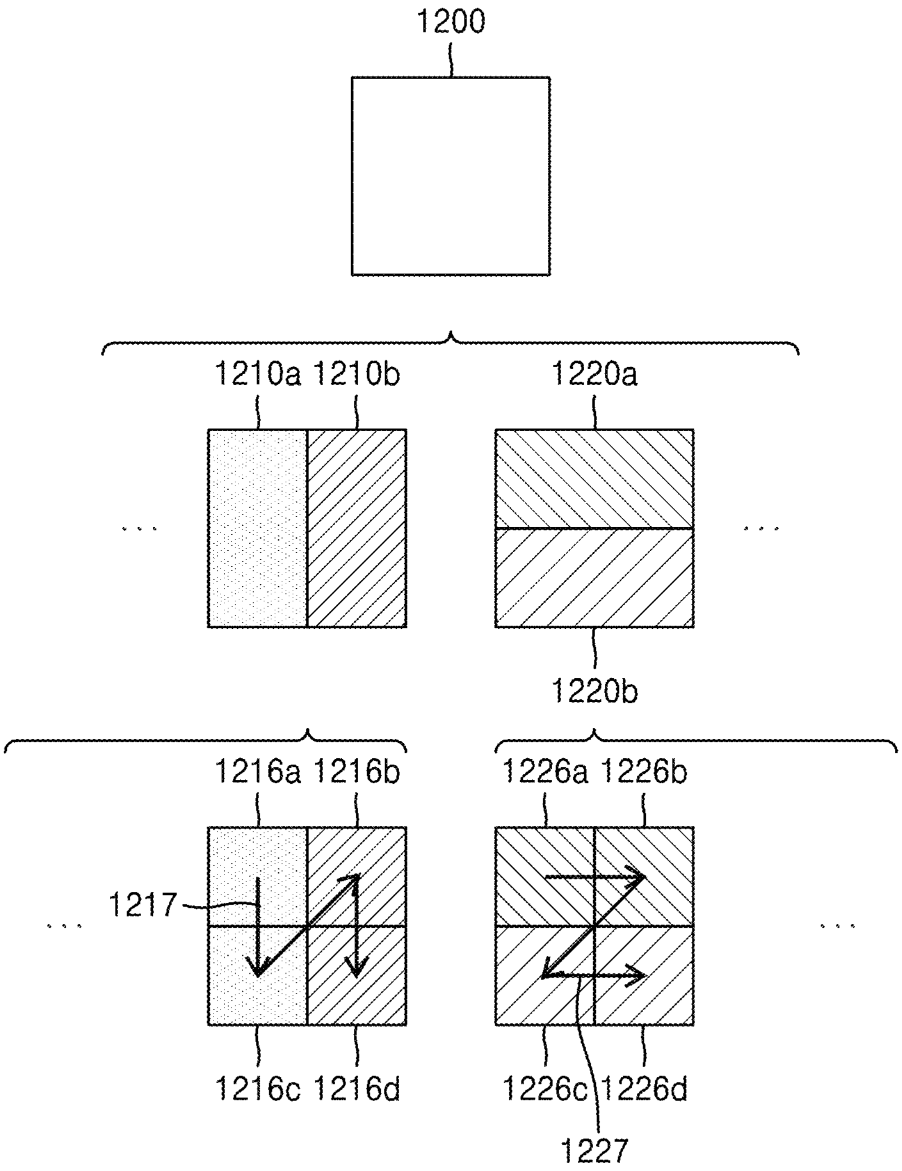
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on split shape mode information. When a block shape indicates a square shape and the split shape mode information indicates to split the first coding unit 1200 in at least one of horizontal and vertical directions, the image decoding apparatus 100 may determine second coding units 1210*a* and 1210*b*, or 1220*a* and 1220*b*, etc. by splitting the first coding unit 1200. Referring to FIG. 12, the non-square second coding units 1210*a* and 1210*b*, or 1220*a* and 1220*b* determined by splitting the first coding unit 1200 in only a horizontal direction or vertical direction may be independently split based on the split shape mode information of each coding unit. For example, the image decoding apparatus 100 may determine third coding units 1216*a*, 1216*b*, 1216*c*, and 1216*d* by splitting the second coding units 1210*a* and 1210*b*, which are generated by splitting the first coding unit 1200 in a vertical direction, in a horizontal direction, and may determine third coding units 1226*a*, 1226*b*, 1226*c*, and 1226*d* by splitting the second coding units 1220*a* and 1220*b*, which are generated by splitting the first coding unit 1200 in a horizontal direction, in a vertical direction. An operation of splitting the second coding units 1210*a* and 1210*b*, or 1220*a* and 1220*b* has been described above in relation to FIG. 11, and thus detailed descriptions thereof will not be provided herein.

According to an embodiment, the image decoding apparatus 100 may process coding units in a preset order. An operation of processing coding units in a preset order has been described above in relation to FIG. 7, and thus detailed descriptions thereof will not be provided herein. Referring to FIG. 12, the image decoding apparatus 100 may determine four square third coding units 1216*a*, 1216*b*, 1216*c*, and 1216*d*, and 1226*a*, 1226*b*, 1226*c*, and 1226*d* by splitting the square first coding unit 1200. According to an embodiment, the image decoding apparatus 100 may determine processing orders of the third coding units 1216*a*, 1216*b*, 1216*c*, and 1216*d*, or 1226*a*, 1226*b*, 1226*c*, and 1226*d* based on a split shape by which the first coding unit 1200 is split.

According to an embodiment, the image decoding apparatus 100 may determine the third coding units 1216*a*, 1216*b*, 1216*c*, and 1216*d* by splitting the second coding units 1210*a* and 1210*b* generated by splitting the first coding unit 1200 in a vertical direction, in a horizontal direction, and may process the third coding units 1216*a*, 1216*b*, 1216*c*, and 1216*d* in a processing order 1217 for initially processing the third coding units 1216*a* and 1216*c*, which are included in the left second coding unit 1210*a*, in a vertical direction and then processing the third coding unit 1216*b* and 1216*d*, which are included in the right second coding unit 1210*b*, in a vertical direction.

According to an embodiment, the image decoding apparatus 100 may determine the third coding units 1226*a*, 1226*b*, 1226*c*, and 1226*d* by splitting the second coding units 1220*a* and 1220*b* generated by splitting the first coding unit 1200 in a horizontal direction, in a vertical direction, and may process the third coding units 1226*a*, 1226*b*, 1226*c*, and 1226*d* in a processing order 1227 for initially processing the third coding units 1226*a* and 1226*b*, which are included in the upper second coding unit 1220*a*, in a horizontal direction and then processing the third coding unit 1226*c* and 1226*d*, which are included in the lower second coding unit 1220*b*, in a horizontal direction.

Referring to FIG. 12, the square third coding units 1216*a*, 1216*b*, 1216*c*, and 1216*d*, and 1226*a*, 1226*b*, 1226*c*, and 1226*d* may be determined by splitting the second coding units 1210*a* and 1210*b*, and 1220*a* and 1220*b*, respectively. Although the second coding units 1210*a* and 1210*b* are determined by splitting the first coding unit 1200 in a vertical direction differently from the second coding units 1220*a* and 1220*b* which are determined by splitting the first coding unit 1200 in a horizontal direction, the third coding units 1216*a*, 1216*b*, 1216*c*, and 1216*d*, and 1226*a*, 1226*b*, 1226*c*, and 1226*d* split therefrom eventually show same-shaped coding units split from the first coding unit 1200. As such, by recursively splitting a coding unit in different manners based on the split shape mode information, the image decoding apparatus 100 may process a plurality of coding units in different orders even when the coding units are eventually determined to be the same shape.

Figure 13:
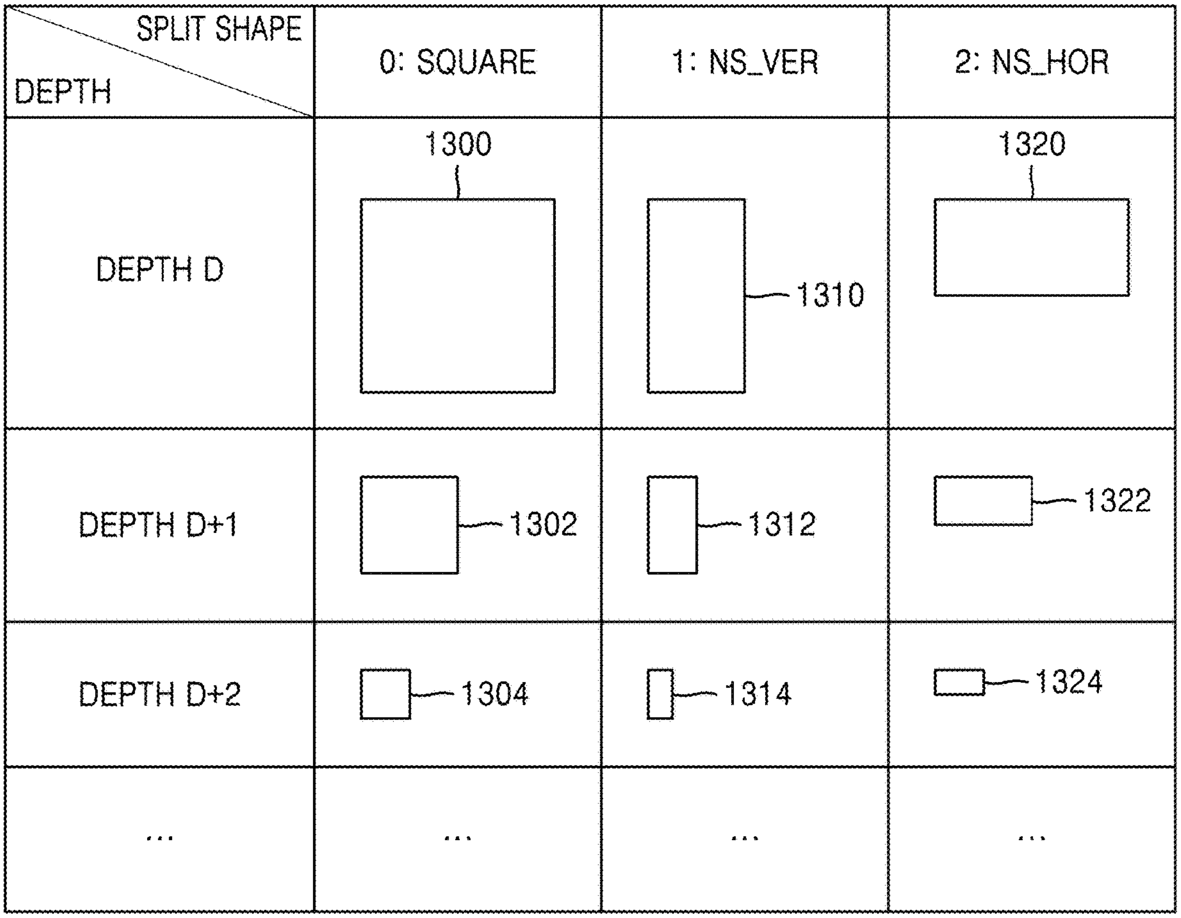
FIG. 13 illustrates a process of determining a depth of a coding unit as a shape and size of the coding unit change, when the coding unit is recursively split such that a plurality of coding units are determined, according to an embodiment.

FIG. 13 illustrates a process of determining a depth of a coding unit as a shape and size of the coding unit change, when the coding unit is recursively split such that a plurality of coding units are determined, according to an embodiment.

According to an embodiment, the image decoding apparatus 100 may determine the depth of the coding unit, based on a preset criterion. For example, the preset criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following description, a coding unit having an increased depth is expressed as a coding unit of a deeper depth.

Referring to FIG. 13, according to an embodiment, the image decoding apparatus 100 may determine a second coding unit 1302 and a third coding unit 1304 of deeper depths by splitting a square first coding unit 1300 based on block shape information indicating a square shape (for example, the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of deeper depths by splitting a non-square first coding unit 1310 or 1320 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine a second coding unit 1302, 1312, or 1322 by splitting at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
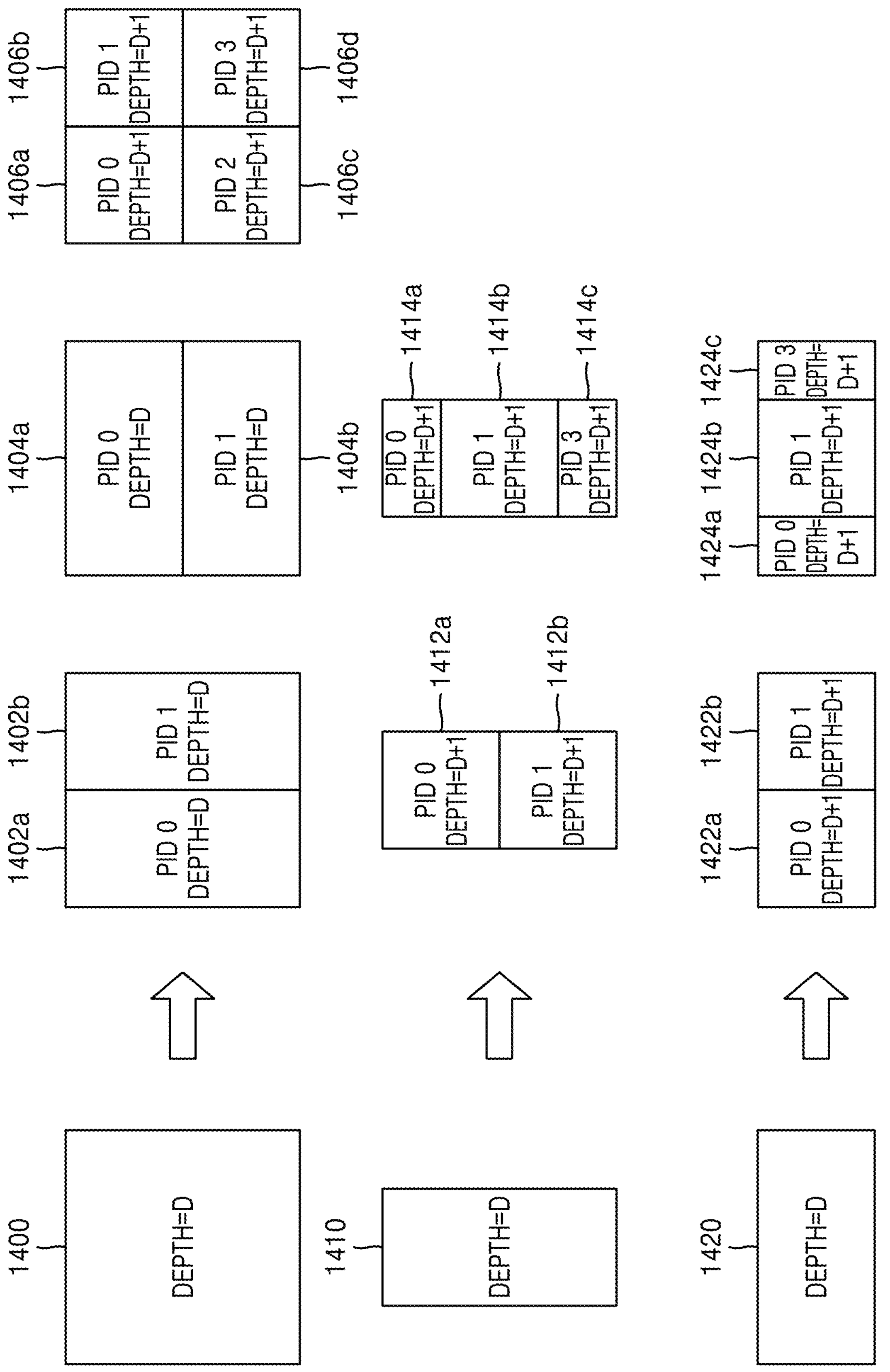
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402*a* and 1402*b*, 1404*a* and 1404*b*, and 1406*a*, 1406*b*, 1406*c*, and 1406*d* by splitting the first coding unit 1400 in at least one of vertical and horizontal directions based on split shape mode information. That is, the image decoding apparatus 100 may determine the second coding units 1402*a* and 1402*b*, 1404*a* and 1404*b*, and 1406*a*, 1406*b*, 1406*c*, and 1406*d*, based on the split shape mode information of the first coding unit 1400.

According to an embodiment, depths of the second coding units 1402*a* and 1402*b*, 1404*a* and 1404*b*, and 1406*a*, 1406*b*, 1406*c*, and 1406*d* that are determined based on the split shape mode information of the square first coding unit 1400 may be determined based on the length of a long side thereof. For example, because the length of a side of the square first coding unit 1400 equals the length of a long side of the non-square second coding units 1402*a* and 1402*b*, and 1404*a* and 1404*b*, the first coding unit 1400 and the non-square second coding units 1402*a* and 1402*b*, and 1404*a* and 1404*b* may have the same depth, e.g., D. However, when the image decoding apparatus 100 splits the first coding unit 1400 into the four square second coding units 1406*a*, 1406*b*, 1406*c*, and 1406*d* based on the split shape mode information, because the length of a side of the square second coding units 1406*a*, 1406*b*, 1406*c*, and 1406*d* is ½ times the length of a side of the first coding unit 1400, a depth of the second coding units 1406_a_, 1406_b_, 1406_c_, and 1406_d_ may be D+1 which is deeper than the depth D of the first coding unit 1400 by 1.

According to an embodiment, the image decoding apparatus 100 may determine a plurality of second coding units 1412_a_ and 1412_b_, and 1414_a_, 1414_b_, and 1414_c_ by splitting a first coding unit 1410, a height of which is longer than a width, in a horizontal direction based on the split shape mode information. According to an embodiment, the image decoding apparatus 100 may determine a plurality of second coding units 1422_a_ and 1422_b_, and 1424_a_, 1424_b_, and 1424_c_ by splitting a first coding unit 1420, a width of which is longer than a height, in a vertical direction based on the split shape mode information.

According to an embodiment, a depth of the second coding units 1412_a_ and 1412_b_, and 1414_a_, 1414_b_, and 1414_c_, or 1422_a_ and 1422_b_, and 1424_a_, 1424_b_, and 1424_c_, which are determined based on the split shape mode information of the non-square first coding unit 1410 or 1420, may be determined based on the length of a long side thereof. For example, because the length of a side of the square second coding units 1412_a_ and 1412_b_ is ½ times the length of a long side of the first coding unit 1410 having a non-square shape, a height of which is longer than a width, a depth of the square second coding units 1412_a_ and 1412_b_ is D+1 which is deeper than the depth D of the non-square first coding unit 1410 by 1.

Furthermore, the image decoding apparatus 100 may split the non-square first coding unit 1410 into an odd number of second coding units 1414_a_, 1414_b_, and 1414_c_ based on the split shape mode information. The odd number of second coding units 1414_a_, 1414_b_, and 1414_c_ may include the non-square second coding units 1414_a_ and 1414_c_ and the square second coding unit 1414_b_. In this case, because the length of a long side of the non-square second coding units 1414_a_ and 1414_c_ and the length of a side of the square second coding unit 1414_b_ are ½ times the length of a long side of the first coding unit 1410, a depth of the second coding units 1414_a_, 1414_b_, and 1414_c_ may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1414_b_ of a center location among an odd number of split coding units 1414_a_, 1414_b_, and 1414_c_ may have a width equal to that of the other coding units 1414_a_ and 1414_c_ and a height which is two times that of the other coding units 1414_a_ and 1414_c_. That is, in this case, the coding unit 1414_b_ at the center location may include two of the other coding unit 1414_a_ or 1414_c_. Therefore, when a PID of the coding unit 1414_b_ at the center location is 1 based on a scan order, a PID of the coding unit 1414_c_ located next to the coding unit 1414_b_ may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412_a_ and 1412_b_ or an odd number of coding units 1414_a_, 1414_b_, and 1414_c_ by splitting the first coding unit 1410 having a rectangular shape, a height of which is longer than a width. The image decoding apparatus 100 may use PIDs indicating respective coding units so as to identify the respective coding units. According to an embodiment, the PID may be obtained from a sample at a preset location of each coding unit (e.g., an upper-left sample).

According to an embodiment, the image decoding apparatus 100 may determine a coding unit at a preset location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414_a_, 1414_b_, and 1414_c_. The image decoding apparatus 100 may assign a PID to each of the three coding units 1414_a_, 1414_b_, and 1414_c_. The image decoding apparatus 100 may compare PIDs of an odd number of split coding units to determine a coding unit at a center location from among the coding units. The image decoding apparatus 100 may determine the coding unit 1414_b_ having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414_b_ generated by splitting the first coding unit 1410 may have a width equal to that of the other coding units 1414_a_ and 1414_c_ and a height which is two times that of the other coding units 1414_a_ and 1414_c_. In this case, when the PID of the coding unit 1414_b_ at the center location is 1, the PID of the coding unit 1414_c_ located next to the coding unit 1414_b_ may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a preset location among an odd number of coding units (e.g., a coding unit of a centre location) has a size different from that of the other coding units. In this case, the image decoding apparatus 100 may determine the coding unit of the centre location, which has a different size, by using PIDs of the coding units. However, the PIDs and the size or location of the coding unit of the preset location are not limited to the above-described examples, and various PIDs and various locations and sizes of coding units may be used.

According to an embodiment, the image decoding apparatus 100 may use a preset data unit where a coding unit starts to be recursively split.

Figure 15:
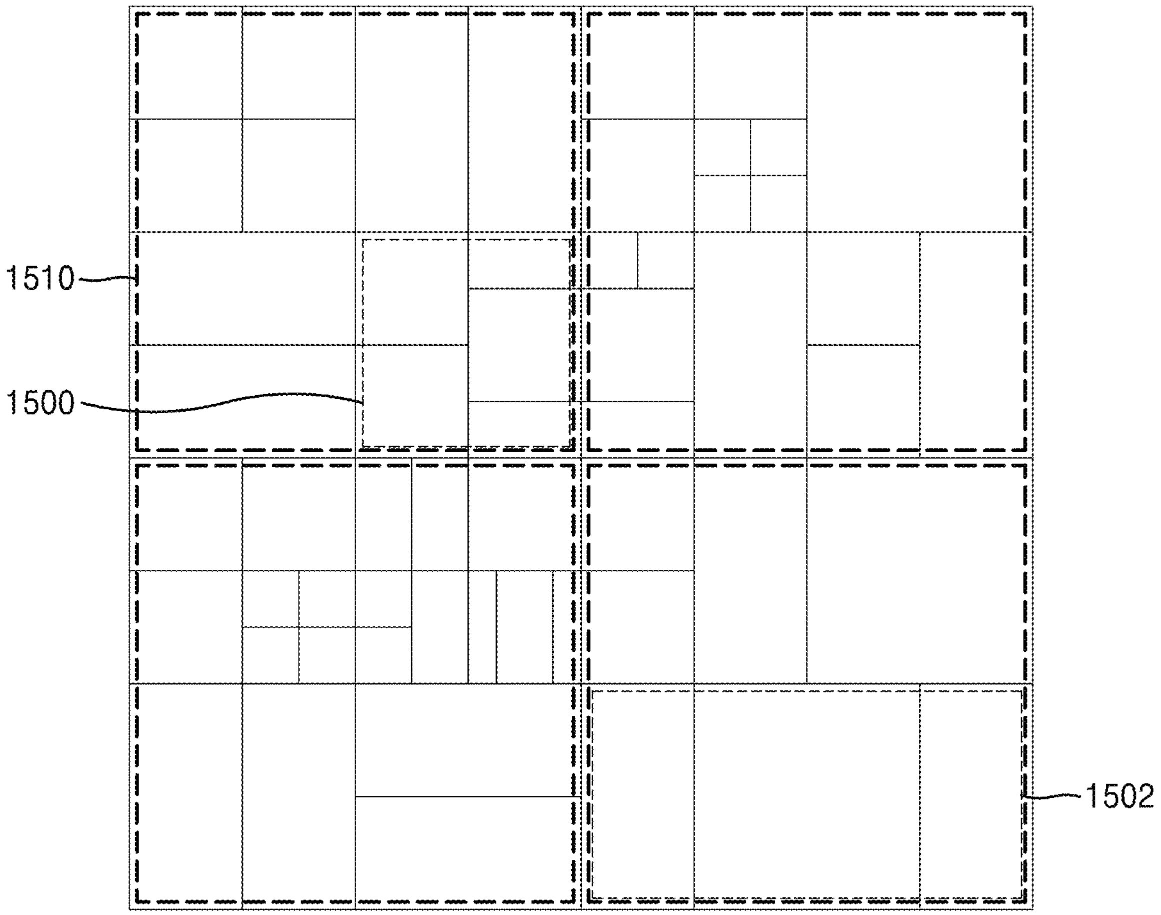
FIG. 15 illustrates that a plurality of coding units are determined based on a plurality of preset data units included in a picture, according to an embodiment.

FIG. 15 illustrates that a plurality of coding units are determined based on a plurality of preset data units included in a picture, according to an embodiment.

According to an embodiment, a preset data unit may be defined as a data unit where a coding unit starts to be recursively split by using split shape mode information. That is, the preset data unit may correspond to a coding unit of an uppermost depth, which is used to determine a plurality of coding units split from a current picture. In the following descriptions, for convenience of explanation, the preset data unit is referred to as a reference data unit.

According to an embodiment, the reference data unit may have a preset size and a preset shape. According to an embodiment, a reference coding unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data unit may correspond to a splitting operation using a quadtree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, tiles, tile groups, largest coding units, or the like).

According to an embodiment, the receiver 110 of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof will not be provided herein.

According to an embodiment, the image decoding apparatus 100 may use a PID for identifying the size and shape of reference coding units, to determine the size and shape of reference coding units according to some data units previously determined based on a preset condition. That is, the receiver 110 may obtain, from the bitstream, only the PID for identifying the size and shape of reference coding units with respect to each slice, slice segment, tile, tile group, or largest coding unit which is a data unit satisfying a preset condition (e.g., a data unit having a size equal to or smaller than a slice) among the various data units (e.g., sequences, pictures, slices, slice segments, tiles, tile groups, largest coding units, or the like). The image decoding apparatus 100 may determine the size and shape of reference data units with respect to each data unit, which satisfies the preset condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the split shape mode information according to various embodiments.

Figure 16:
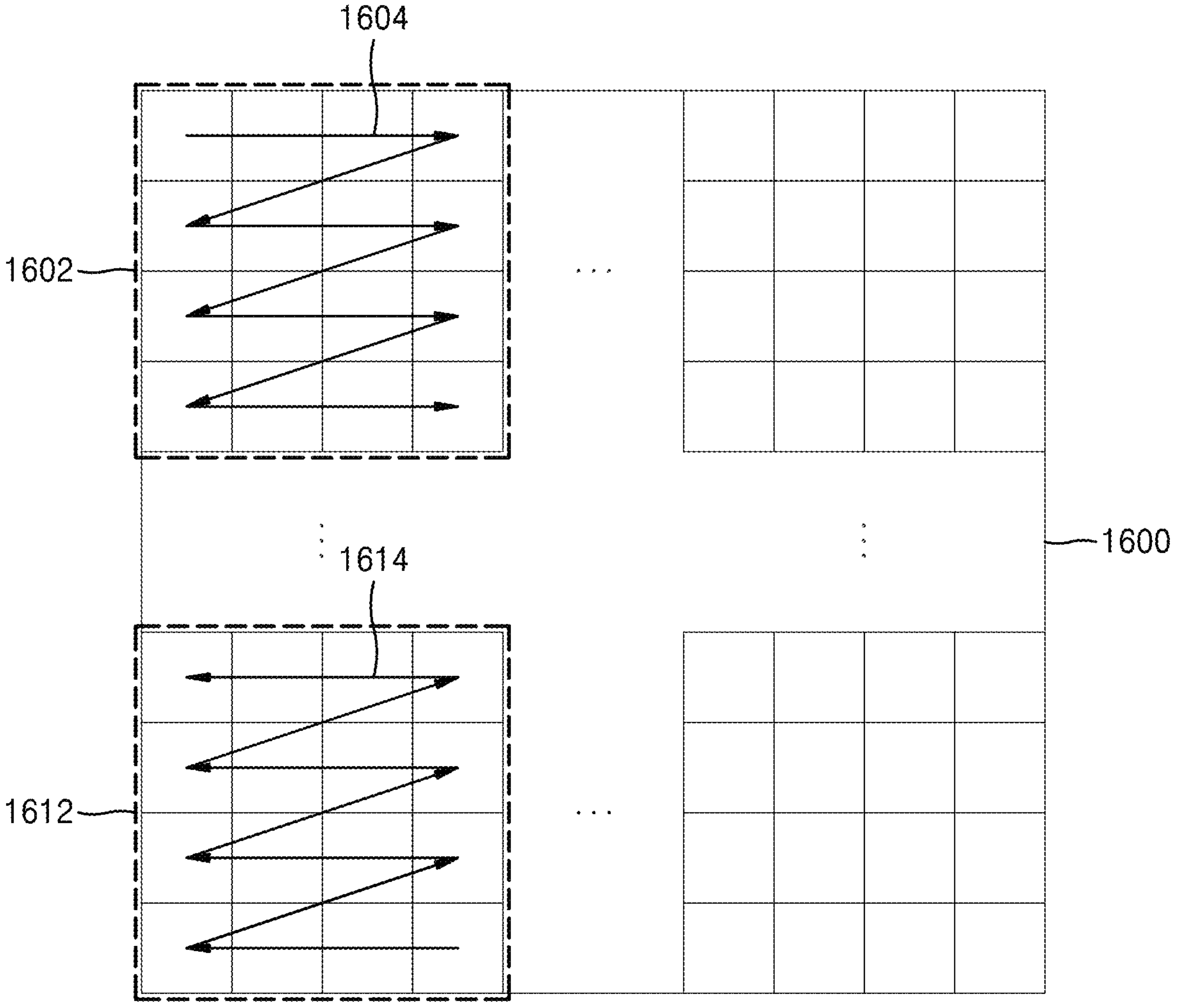
FIG. 16 illustrates a processing block serving as a unit for determining a determination order of reference coding units included in a picture, according to an embodiment.

FIG. 16 illustrates a processing block serving as a unit for determining a determination order of reference coding units included in a picture, according to an embodiment.

According to an embodiment, the image decoding apparatus 100 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the image decoding apparatus 100 may obtain processing block size information and may determine the size of one or more processing blocks included in the picture. The image decoding apparatus 100 may obtain the processing block size information from a bitstream and may determine the size of one or more processing blocks included in the picture. The size of processing blocks may be a preset size of data units, which is indicated by the processing block size information.

According to an embodiment, the receiver 110 of the image decoding apparatus 100 may obtain the processing block size information from the bitstream according to each specific data unit. For example, the processing block size information may be obtained from the bitstream in a data unit such as an image, sequence, picture, slice, slice segment, tile, or tile group. That is, the receiver 110 may obtain the processing block size information from the bitstream according to each of the various data units, and the image decoding apparatus 100 may determine the size of one or more processing blocks, which are split from the picture, by using the obtained processing block size information. The size of the processing blocks may be integer times that of the reference coding units.

According to an embodiment, the image decoding apparatus 100 may determine the size of processing blocks 1602 and 1612 included in the picture 1600. For example, the image decoding apparatus 100 may determine the size of processing blocks based on the processing block size information obtained from the bitstream. Referring to FIG. 16, according to an embodiment, the image decoding apparatus 100 may determine a width of the processing blocks 1602 and 1612 to be four times the width of the reference coding units, and may determine a height of the processing blocks 1602 and 1612 to be four times the height of the reference coding units. The image decoding apparatus 100 may determine a determination order of one or more reference coding units in one or more processing blocks.

According to an embodiment, the image decoding apparatus 100 may determine the processing blocks 1602 and 1612, which are included in the picture 1600, based on the size of processing blocks, and may determine a determination order of one or more reference coding units in the processing blocks 1602 and 1612. According to an embodiment, determination of reference coding units may include determination of the size of the reference coding units.

According to an embodiment, the image decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 100 may obtain, from the bitstream, the determination order information of reference coding units according to each specific data unit. For example, the receiver 110 may obtain the determination order information of reference coding units from the bitstream according to each data unit such as an image, sequence, picture, slice, slice segment, tile, tile group, or processing block. Because the determination order information of reference coding units indicates an order for determining reference coding units in a processing block, the determination order information may be obtained with respect to each specific data unit including an integer number of processing blocks.

According to an embodiment, the image decoding apparatus 100 may determine one or more reference coding units based on the determined determination order.

According to an embodiment, the receiver 110 may obtain the determination order information of reference coding units from the bitstream as information related to the processing blocks 1602 and 1612, and the image decoding apparatus 100 may determine a determination order of one or more reference coding units included in the processing blocks 1602 and 1612 and determine one or more reference coding units, which are included in the picture 1600, based on the determination order. Referring to FIG. 16, the image decoding apparatus 100 may determine determination orders 1604 and 1614 of one or more reference coding units in the processing blocks 1602 and 1612, respectively. For example, when the determination order information of reference coding units is obtained with respect to each processing block, different types of the determination order information of reference coding units may be obtained for the processing blocks 1602 and 1612. When the determination order 1604 of reference coding units in the processing block 1602 is a raster scan order, reference coding units included in the processing block 1602 may be determined according to a raster scan order. On the contrary, when the determination order 1614 of reference coding units in the other processing block 1612 is a backward raster scan order, reference coding units included in the processing block 1612 may be determined according to the backward raster scan order.

According to an embodiment, the image decoding apparatus 100 may decode the determined one or more reference coding units. The image decoding apparatus 100 may decode an image, based on the reference coding units determined as described above. A method of decoding the reference coding units may include various image decoding methods.

According to an embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

Hereinafter, a method of determining a split rule, according to an embodiment of the disclosure will be described in detail.

The image decoding apparatus 100 may determine a split rule of an image. The split rule may be predetermined between the image decoding apparatus 100 and the image encoding apparatus 2200. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, a slice segment header, a tile header, and a tile group header. The image decoding apparatus 100 may determine the split rule differently according to frames, slices, tiles, temporal layers, largest coding units, or coding units.

The image decoding apparatus 100 may determine the split rule based on a block shape of a coding unit. The block shape may include a size, shape, a ratio of width and height, and a direction of the coding unit. The image encoding apparatus 2200 and the image decoding apparatus 100 may pre-determine to determine the split rule based on the block shape of the coding unit. However, the embodiment is not limited thereto. The image decoding apparatus 100 may determine the split rule based on the information obtained from the bitstream received from the image encoding apparatus 2200.

The shape of the coding unit may include a square and a non-square. When the lengths of the width and height of the coding unit are the same, the image decoding apparatus 100 may determine the shape of the coding unit to be a square. Also, when the lengths of the width and height of the coding unit are not the same, the image decoding apparatus 100 may determine the shape of the coding unit to be a non-square.

The size of the coding unit may include various sizes, such as 4×4, 8×4, 4×8, 8×8, 16×4, 16×8, and to 256×256. The size of the coding unit may be classified based on the length of a long side of the coding unit, the length of a short side, or the area. The image decoding apparatus 100 may apply the same split rule to coding units classified as the same group. For example, the image decoding apparatus 100 may classify coding units having the same lengths of the long sides as having the same size. Also, the image decoding apparatus 100 may apply the same split rule to coding units having the same lengths of long sides.

The ratio of the width and height of the coding unit may include 1:2, 2:1, 1:4, 4:1, 1:8, 8:1, 1:16, 16:1, 32:1, 1:32, or the like. Also, a direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule predetermined between the image encoding apparatus 2200 and the image decoding apparatus 100. Also, the image decoding apparatus 100 may determine the split rule based on the information obtained from the bitstream.

The image decoding apparatus 100 may adaptively determine the split rule based on a location of the coding unit. The image decoding apparatus 100 may adaptively determine the split rule based on the location of the coding unit in the image.

Also, the image decoding apparatus 100 may determine the split rule such that coding units generated via different splitting paths do not have the same block shape. However, an embodiment is not limited thereto, and the coding units generated via different splitting paths have the same block shape. The coding units generated via the different splitting paths may have different decoding processing orders. Because the decoding processing orders have been described above with reference to FIG. 12, details thereof are not provided again.

Hereinafter, a video encoding or decoding method and apparatus will be described in detail with reference to FIGS. 17 to 20, according to an embodiment of the disclosure, in which whether an intra prediction mode of the current block is a DC mode is determined, when the intra prediction mode of the current block is the DC mode, in a case where a height and a width of the current block are the same, an average of upper reference samples of the current block, which are samples of an upper adjacent block located in the upper side of the current block, and left reference samples of the current block, which are samples of a left adjacent block located in the left side of the current block, is determined as a DC value, and in a case where the height and the width of the current block are different from each other, a weighted average value, which is determined by determining an average of the upper reference samples of the current block as an upper DC value, determining an average of the left reference samples of the current block as a left DC value, and combining the upper DC value and the left DC value with a predetermined weight, is determined as a DC value, and intra prediction is performed on the current block, based on the DC value.

Figure 17:
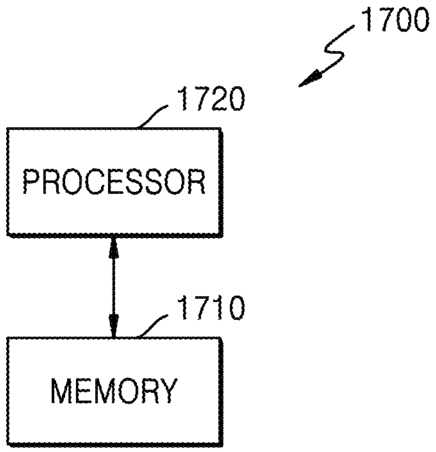
FIG. 17 illustrates a block diagram of a video decoding apparatus according to an embodiment.

FIG. 17 illustrates a block diagram of a video decoding apparatus according to an embodiment.

Intra prediction is a prediction method using only spatial reference, and refers to a method of predicting a current block with reference to samples adjacent to a block to be coded. An adjacent reference sample used for intra prediction refers to a brightness value reconstructed through prediction and reconstruction. Intra prediction is particularly effective for flat areas with continuity and areas with constant directionality.

The video decoding apparatus 1700 according to an embodiment may include a memory 1710 and at least one processor 1720 connected to the memory 1710. The video decoding apparatus 1700 according to an embodiment may operate as individual processors or may be operated under the control of a central processor. Also, the memory 1710 of the video decoding apparatus 1700 may store data received from the outside, data generated by the at least one processor, for example, information about reference samples of a current block, etc.

The processor 1720 of the video decoding apparatus 1700 may be configured to determine whether an intra prediction mode of the current block is a DC mode, when the intra prediction mode of the current block is the DC mode, in a case where a height and a width of the current block are the same, determine an average of upper reference samples of the current block, which are samples of an upper adjacent block located in the upper side of the current block, and left reference samples of the current block, which are samples of a left adjacent block located in the left side of the current block, as a DC value, and in a case where the height and the width of the current block are different from each other, determine a weighted average value, which is determined by determining an average of the upper reference samples of the current block as an upper DC value, determining an average of the left reference samples of the current block as a left DC value, and combining the upper DC value and the left DC value with a predetermined weight, as a DC value, and perform intra prediction on the current block, based on the DC value.

Hereinafter, specific operations of a video decoding method will be described in detail with reference to FIG. 18, in which the video decoding apparatus 1700 according to an embodiment is configured to determine whether an intra prediction mode of the current block is a DC mode, when the intra prediction mode of the current block is the DC mode, in a case where a height and a width of the current block are the same, determine an average of upper reference samples of the current block, which are samples of an upper adjacent block located in the upper side of the current block, and left reference samples of the current block, which are samples of a left adjacent block located in the left side of the current block, as a DC value, and in a case where the height and the width of the current block are different from each other, determine a weighted average value, which is determined by determining an average of the upper reference samples of the current block as an upper DC value, determining an average of the left reference samples of the current block as a left DC value, and combining the upper DC value and the left DC value with a predetermined weight, as a DC value, and perform intra prediction on the current block, based on the DC value.

Figure 18:
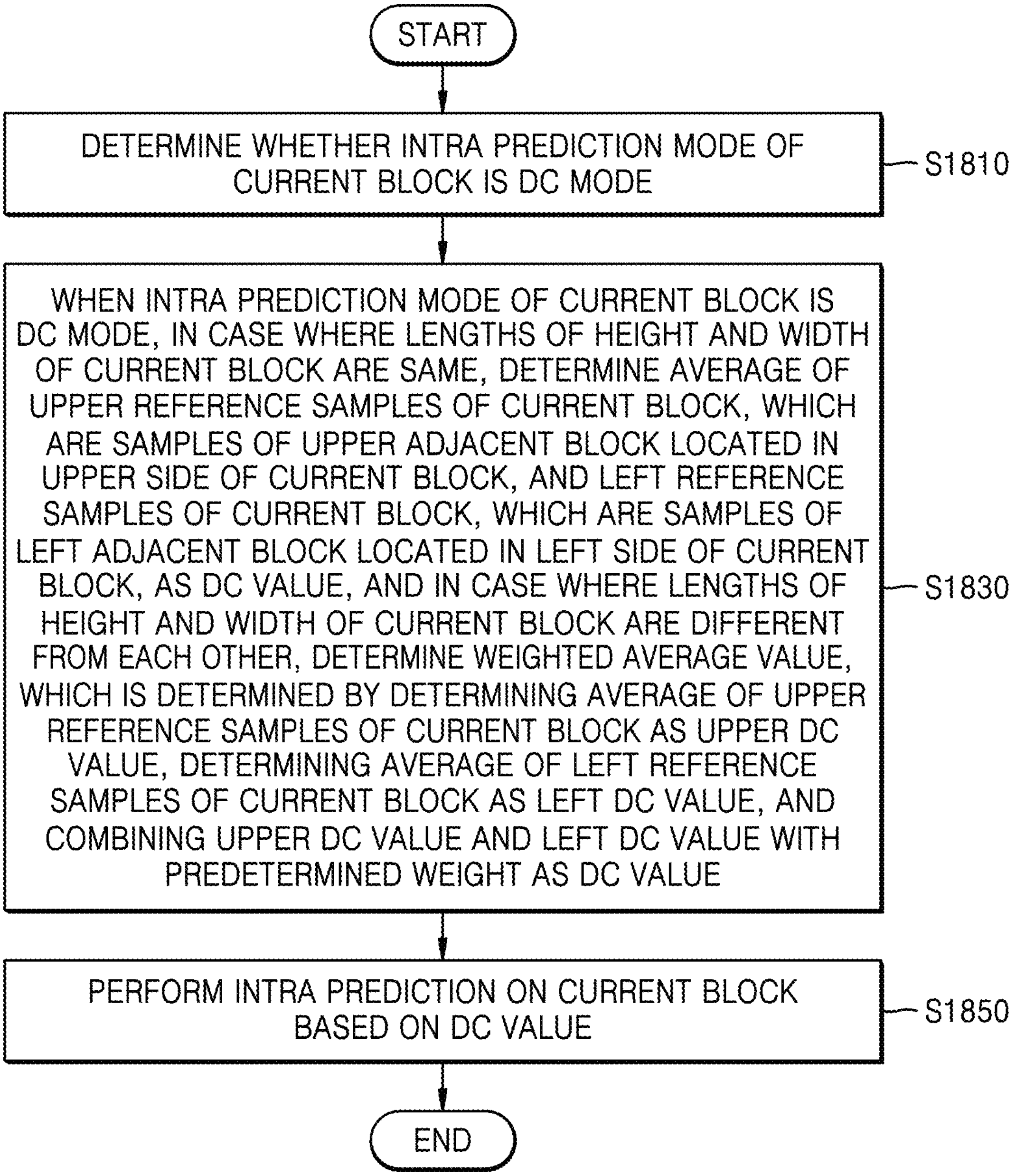
FIG. 18 illustrates a flowchart of a video decoding method according to an embodiment.

FIG. 18 illustrates a flowchart of a video decoding method according to an embodiment.

Referring to FIG. 18, in operation S1810, the video decoding apparatus 1700 may determine whether an intra prediction mode of a current block is a DC mode.

In operation S1830, in a case where the intra prediction mode of the current block is the DC mode and a height and a width of the current block are the same, an average of upper reference samples of the current block, which are samples of an upper adjacent block located in the upper side of the current block, and left reference samples of the current block, which are samples of a left adjacent block located in the left side of the current block, may be determined as a DC value, and in a case where the intra prediction mode of the current block is the DC mode and the height and the width of the current block are different from each other, a weighted average value, which is determined by determining an average of the upper reference samples of the current block as an upper DC value, determining an average of the left reference samples of the current block as a left DC value, and combining the upper DC value and the left DC value with a predetermined weight, may be determined as a DC value.

According to an embodiment, in a case where the intra prediction mode of the current block is the DC mode and the height and the width of the current block are different from each other, when the width is greater than the height, the average of the upper reference samples of the current block may be determined as a DC value, and when the height is greater than the width, the average of the left reference samples of the current block may be determined as a DC value.

According to an embodiment, when a right adjacent block located in the right side of the current block is previously reconstructed, in a case where the intra prediction mode of the current block is the DC mode and the height and the width of the current block are the same, an average of the upper reference samples and right reference samples of the current block, which are samples of the right adjacent block located in the right side of the current block, may be determined as a DC value, and in a case where the intra prediction mode of the current block is the DC mode and the height and the width of the current block are different from each other, a weighted average value, which is determined by determining the average of the upper reference samples as an upper DC value, determining an average of the right reference samples as a right DC value, and combining the upper DC value and the right DC value with a predetermined weight, may be determined as a DC value.

According to an embodiment, in a case where the intra prediction mode of the current block is the DC mode and the height and the width of the current block are different from each other, when the width is greater than the height, the average of the upper reference samples may be determined as a DC value, and when the height is greater than the width, the average of the right reference samples may be determined as a DC value.

A method proposed in the above-described embodiment may be represented as Equation 1 below.

[Equation 1]

$$DC = \frac{\left(w_0 \cdot \sum_{x=0}^{width-1} ref[x][-1] + w_1 \cdot \sum_{y=0}^{height-1} ref[-1][y] + w_0 \cdot \left(\frac{\text{width}}{2}\right) + w_1 \cdot \left(\frac{\text{height}}{2}\right)\right)}{(w_0 \cdot \text{width} + w_1 \cdot \text{height})}$$

DC refers to a DC value, width refers to a width of the current block, height refers to a height of the current block, ref[x][y] refers to a reference sample of the current block, wherein a location of ref is expressed when the upper left location of the current block is [0][0], $w_0$ refers to a weight corresponding to the width, and $w_1$ refers to a weight corresponding to the height. $w_0$ and $w_1$ are real numbers between 0 and 1.

For example, when the width and height are the same (e.g., a square), $w_0$ and $w_1$ may both be 1, when the width is longer than the height, $w_0$ may be 1, and $w_1$ may be 0, and when the height is longer than the width, $w_0$ may be 0, and $w_1$ may be 1.

This is represented by the following equations 2 to 4.

When the width and the height are the same, it may be represented as Equation 2 below.

[Equation 2]

$$DC = \frac{\left(\sum_{x=0}^{width-1} ref[x][-1] + \sum_{y=0}^{height-1} ref[-1][y] + \left(\frac{\text{width}}{2}\right) + \left(\frac{\text{height}}{2}\right)\right)}{(\text{width} + \text{height})}$$

When the width is greater than the height, it may be represented as Equation 3 below.

[Equation 3]

$$DC = \frac{\left(\sum_{x=0}^{width-1} ref[x][-1] + \left(\frac{\text{width}}{2}\right)\right)}{(\text{width})}$$

When the height is greater than the width, it may be represented as Equation 4 below.

[Equation 4]

$$DC = \frac{\left(\sum_{y=0}^{height-1} ref[-1][y] + \left(\frac{\text{height}}{2}\right)\right)}{(\text{height})}$$

According to an embodiment, among reference samples of the current block, a sample value of a reference sample closest to reference samples having no sample value, among reference samples having a sample value, may be determined as a sample value of the reference samples having no sample value.

According to an embodiment, among the reference samples of the current block, an average value of the reference samples having a sample value may be determined as a sample value of the reference samples having no sample value.

According to an embodiment, among the reference samples of the current block, a predetermined default value may be determined as a sample value of the reference sample having no sample value.

Referring back to FIG. 18, in operation S1850, intra prediction may be performed on the current block, based on the DC value.

Figure 19:
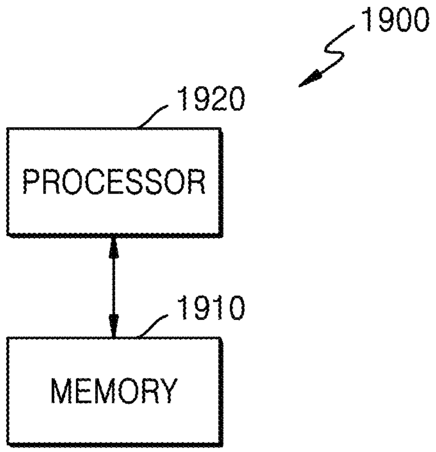
FIG. 19 illustrates a block diagram of a video encoding apparatus according to an embodiment.
Figure 20:
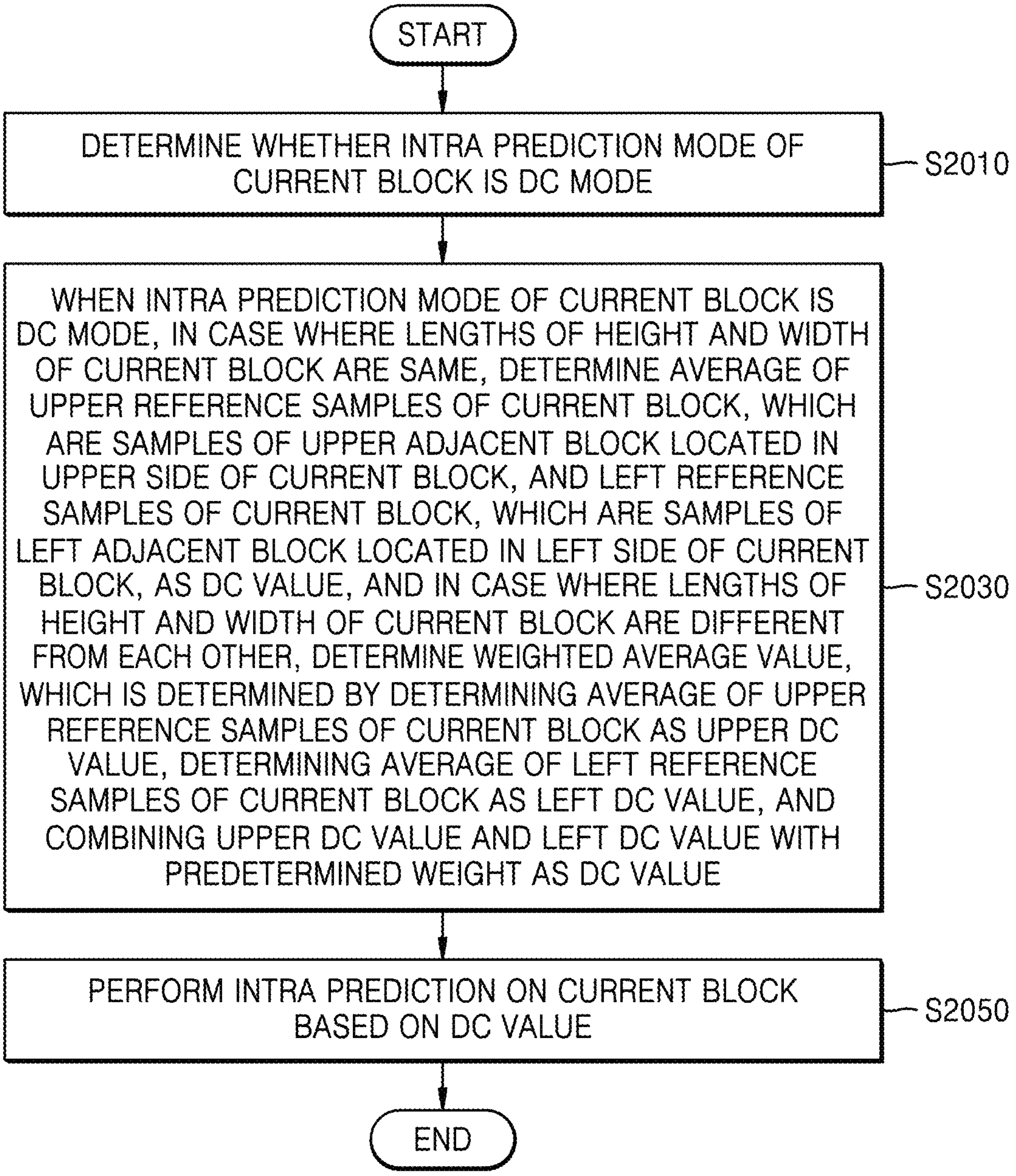
FIG. 20 illustrates a flowchart of a video encoding method according to an embodiment.

FIGS. 19 and 20 illustrate a block diagram of a video encoding apparatus according to an embodiment and a flowchart of a video encoding method according to an embodiment, corresponding to the video decoding apparatus and the video decoding method described above, respectively.

FIG. 19 illustrates a block diagram of a video encoding apparatus according to an embodiment.

The video encoding apparatus 1900 according to an embodiment may include a memory 1910 and at least one processor 1920 connected to the memory 1910. The video encoding apparatus 1900 according to an embodiment may operate as individual processors or may be operated under the control of a central processor. Also, the memory 1910 of the video encoding apparatus 1900 may store data received from the outside, data generated by the at least one processor, for example, information about reference samples of a current block, etc.

The processor 1920 of the video encoding apparatus 1900 may be configured to determine whether an intra prediction mode of the current block is a DC mode, when the intra prediction mode of the current block is the DC mode, in a case where a height and a width of the current block are the same, determine an average of upper reference samples of the current block, which are samples of an upper adjacent block located in the upper side of the current block, and left reference samples of the current block, which are samples of a left adjacent block located in the left side of the current block, as a DC value, and in a case where the height and the width of the current block are different from each other, determine a weighted average value, which is determined by determining an average of the upper reference samples of the current block as an upper DC value, determining an average of the left reference samples of the current block as a left DC value, and combining the upper DC value and the left DC value with a predetermined weight, as a DC value, and perform intra prediction on the current block, based on the DC value.

Hereinafter, specific operations of a video encoding method will be described in detail with reference to FIG. 20, in which the video encoding apparatus 1900 according to an embodiment determines whether an intra prediction mode of the current block is a DC mode, when the intra prediction mode of the current block is the DC mode, in a case where a height and a width of the current block are the same, determine an average of upper reference samples of the current block, which are samples of an upper adjacent block located in the upper side of the current block, and left reference samples of the current block, which are samples of a left adjacent block located in the left side of the current block, as a DC value, and in a case where the height and the width of the current block are different from each other, determines a weighted average value, which is determined by determining an average of the upper reference samples of the current block as an upper DC value, determining an average of the left reference samples of the current block as a left DC value, and combining the upper DC value and the left DC value with a predetermined weight, as a DC value, and performs intra prediction on the current block, based on the DC value.

FIG. 20 illustrates a flowchart of a video encoding method according to an embodiment.

Referring to FIG. 20, in operation S2010, the video encoding apparatus 1900 may determine whether an intra prediction mode of a current block is a DC mode.

In operation S2030, in a case where the intra prediction mode of the current block is the DC mode and a height and a width of the current block are the same, an average of upper reference samples of the current block, which are samples of an upper adjacent block located in the upper side the current block, and left reference samples of the current block, which are samples of a left adjacent block located in the left side of the current block, may be determined as a DC value, and in a case where the intra prediction mode of the current block is the DC mode and the height and the width of the current block are different from each other, a weighted average value, which is determined by determining an average of the upper reference samples of the current block as an upper DC value, determining an average of the left reference samples of the current block as a left DC value, and combining the upper DC value and the left DC value with a predetermined weight, may be determined as a DC value.

According to an embodiment, in a case where the intra prediction mode of the current block is the DC mode and the height and the width of the current block are different from each other, when the width is greater than the height, an average of the samples of the upper adjacent block may be determined as a DC value, and when the height is greater than the width, an average of the samples of the left adjacent block may be determined as a DC value.

According to an embodiment, when a right adjacent block located in the right side of the current block is pre-encoded, in a case where the intra prediction mode of the current block is the DC mode and the height and the width of the current block are the same, an average of the upper reference samples and right reference samples of the current block, which are samples of the right adjacent block located in the right side of the current block, may be determined as a DC value, and in a case where the intra prediction mode of the current block is the DC mode and the height and the width of the current block are different from each other, a weighted average value, which is determined by determining the average of the upper reference samples as an upper DC value, determining an average of the right reference samples as a right DC value, and combining the upper DC value and the right DC value with a predetermined weight, may be determined as a DC value.

According to an embodiment, in a case where the intra prediction mode of the current block is the DC mode and the height and the width of the current block are different from each other, when the width is greater than the height, the average of the upper reference samples may be determined as a DC value, and when the height is greater than the width, the average of the right reference samples may be determined as a DC value.

The DC values in the above-described embodiments may be calculated by Equations 1 to 4 mentioned above.

According to an embodiment, among reference samples of the current block, a sample value of a reference sample closest to reference samples having no sample value, among reference samples having a sample value, may be determined as a sample value of the reference samples having no sample value.

According to an embodiment, among the reference samples of the current block, an average value of the reference samples having a sample value may be determined as a sample value of the reference samples having no sample value.

According to an embodiment, among the reference samples of the current block, a predetermined default value may be determined as a sample value of the reference sample having no sample value.

Referring back to FIG. 20, in operation S2050, intra prediction may be performed on the current block, based on the DC value.

A method of determining whether left, upper, and right adjacent blocks are available will be described below with reference to FIGS. 21 and 22.

Figure 21:
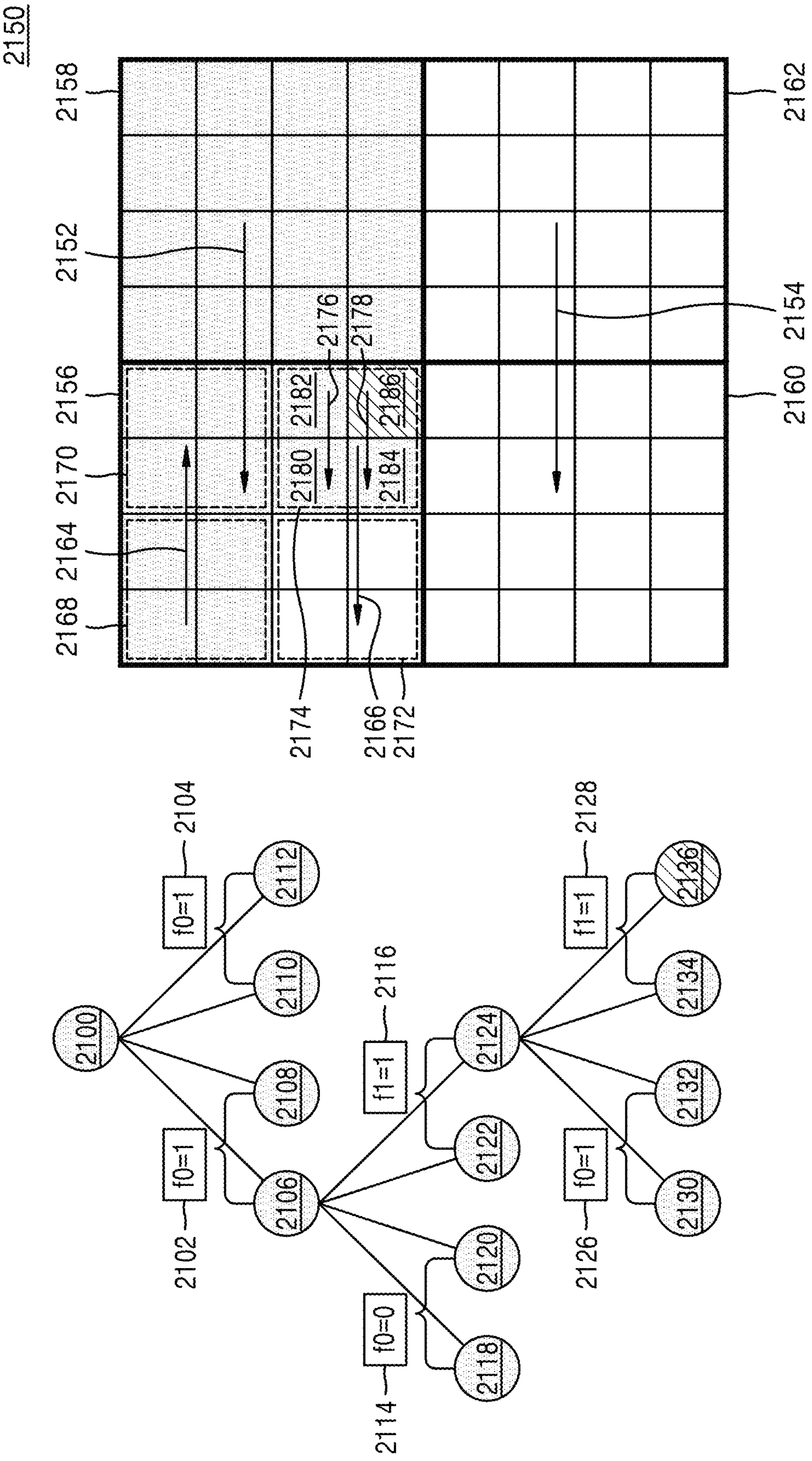
FIG. 21 illustrates a diagram for describing a coding order of a largest coding unit and coding units included in the largest coding unit.

FIG. 21 illustrates a diagram for describing a coding order of a largest coding unit and coding units included in the largest coding unit.

A largest coding unit 2150 is split into a plurality of coding units 2156, 2158, 2160, 2162, 2168, 2170, 2172, 2174, 2180, 2182, 2184, and 2186. The largest coding unit 2150 corresponds to a highest node 2100 having a tree structure. The coding units 2156, 2158, 2160, 2162, 2168, 2170, 2172, 2174, 2180, 2182, 2184, and 2186 correspond to a plurality of nodes 2106, 2108, 2110, 2112, 2118, 2121, 2122, 2124, 2130, 2132, 2134, and 2136, respectively. Upper coding order flags 2102, 2114, and 2126 indicating the coding order in the tree structure correspond arrows 2152, 2164, and 2176, and lower coding order flags 2104, 2116, and 2128 correspond to arrows 2154, 2166, and 2178.

The upper coding order flag indicates a coding order of two coding units located in the upper end among four coding units split from one coding unit. When the upper coding order flag is 0, encoding is performed in a forward direction. In contrast, when the upper coding order flag is 1, encoding is performed in a reverse direction.

Similarly, the lower coding order flag indicates a coding order of two coding units located in the lower end among the four coding units split from one coding unit. When the lower coding order flag is 0, encoding is performed in a forward direction. In contrast, when the lower coding order flag is 1, encoding is performed in a reverse direction.

For example, because the upper coding order flag 2114 is 0, the coding order of the coding units 2168 and 2170 is determined in a direction from left to right, that is, a forward direction. Because the lower coding order flag 2116 is 1, the coding order of the coding units 2172 and 2174 is determined in a direction from right to left, that is, a reverse direction.

According to an embodiment, the upper coding order flag and the lower coding order flag may be set to have the same value. For example, when the upper coding order flag 2102 is determined to be 1, the lower coding order flag 2104 corresponding to the upper coding order flag 2102 may also be determined to be 1. Because the values of the upper coding order flag and the lower coding order flag are determined to be 1 bit, the information amount of coding order information decreases.

According to an embodiment, the upper coding order flag and the lower coding order flag of the current coding unit may be determined with reference to at least one of an upper coding order flag and a lower coding order flag that are applied to a coding unit larger than the current coding unit. For example, the upper coding order flag 2126 and the lower coding order flag 2128 that are applied to the coding units 2180, 2182, 2184, and 2186 may be determined based on the lower coding order flag 2116 applied to the coding units 2172 and 2174. Therefore, the upper coding order flag 2126 and the lower coding order flag 2128 may be determined to be the same value as the lower coding order flag 2116. Because the values of the upper coding order flag and the lower coding order flag are determined from a higher coding unit of the current coding unit, coding order information is not obtained from a bitstream. Therefore, the information amount of the coding order information decreases.

According to an embodiment, whether a coding order flag of a block may be determined according to a size or depth of the block. For example, a coding order flag may be obtained only for a block having a predetermined size, and a coding order flag may not be obtained for blocks having other sizes. When the current block is larger than the block having the predetermined size, the coding order may be determined in the forward direction without obtaining a coding order flag. When the current block is smaller than the block having the predetermined size, the coding order may be determined based on a higher block of the current block without obtaining a coding order flag. A size of a block in which the coding order flag is obtained may be arbitrarily determined. For example, the size of the block in which the coding order flag is obtained may be determined to be 16×16 and 32×32.

Figure 22:
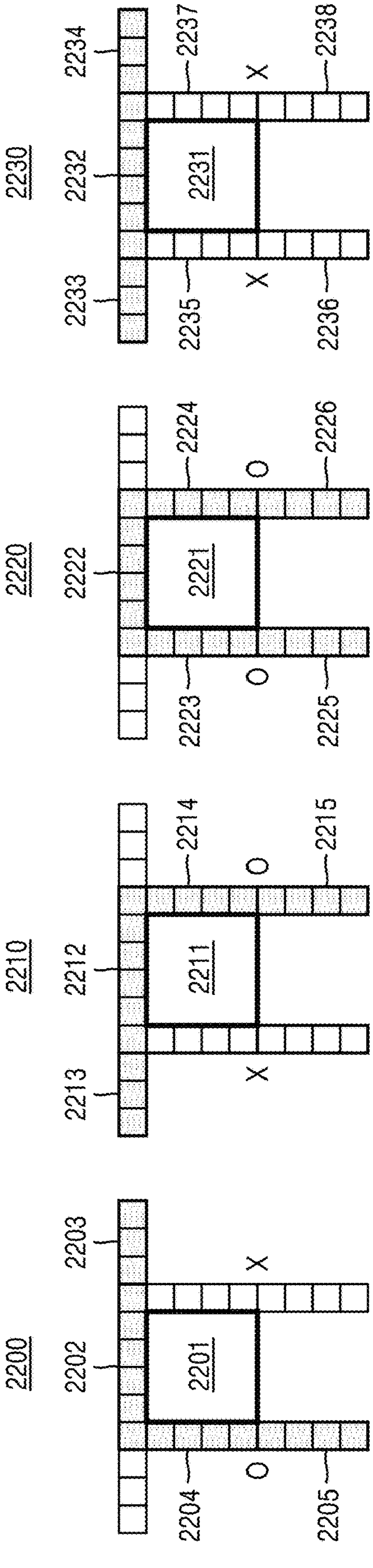
FIG. 22 illustrates an intra prediction method depending on whether an adjacent block is reconstructed.

FIG. 22 illustrates an intra prediction method depending on whether an adjacent block is reconstructed.

A first embodiment 2200 illustrates an intra prediction method when an upper block and a left block are reconstructed earlier than a current block 2201 according to a decoding order. In the first embodiment 2200, upper reference samples 2202, upper-right reference samples 2203, left reference samples 2204, and lower-left reference samples 2205 may be used for intra prediction. The first embodiment 2200 occurs in a conventional video decoding method in which a decoding order is not switched, and the current block 2201 is predicted according to a conventional intra prediction method.

A second embodiment 2210 illustrates an intra prediction method when an upper block and a right block are reconstructed earlier than a current block 2211 according to a decoding order. In the second embodiment 2210, upper reference samples 2212, upper-left reference samples 2213, right reference samples 2214, and lower-right reference samples 2215 may be used for intra prediction. The second embodiment 2210 is bilaterally symmetrical to the first embodiment 2200, the intra prediction method according to the second embodiment 2210 is bilaterally symmetrical to the intra prediction method according to the first embodiment 2200. For example, when a horizontal mode is applied to the current block, the left reference samples 2204 are referred to in the first embodiment 2200, and the right reference samples 2214 are referred to in the second embodiment 2210. Similarly, the intra prediction method according to other directional intra modes and a planar mode of the second embodiment 2210 may also be bilaterally symmetrical to the intra prediction method according to other directional intra modes and a planar mode of the first embodiment 2200.

A third embodiment 2220 illustrates an intra prediction method when an upper block, a left block, and a right block are reconstructed earlier than a current block 2221 according to a decoding order. In the third embodiment 2220, upper reference samples 2222, left reference samples 2223, right reference samples 2224, lower-left reference samples 2225, and lower-right reference samples 2226 may be used for intra prediction. In the third embodiment 2220, the left reference samples 2223 and the right reference samples 2224 may be used together for the prediction of the current block 2221. For example, when a horizontal mode is applied to the current block 2221, a decoder 120 may predict the current block 2221 by using an average or weighted average of a first reference value obtained from the left reference samples 2223 and a second reference value obtained from the right reference samples 2224.

According to another embodiment, the decoder 120 may predict the current block 2221 of the third embodiment 2220 by using an average value of a first intermediate prediction value according to the intra prediction method of the first embodiment 2200 and a second intermediate prediction value according to the intra prediction method of the second embodiment 2210. For example, when the horizontal mode is applied to the current block 2221, the decoder 120 may obtain a final prediction value of the current block 2221 according to the third embodiment 2220 based on a first intermediate prediction value obtained from the left reference samples 2204 according to the intra prediction method of the first embodiment 2200 and a second intermediate prediction value obtained from the right reference samples 2214 according to the intra prediction method of the second embodiment 2210.

According to another embodiment, the decoder 120 may predict the current block 2221 of the third embodiment 2220 by using one of a first prediction value according to the intra prediction method of the first embodiment 2200 and a second prediction value according to the intra prediction method of the second embodiment 2210. For example, when a horizontal mode is applied to the current block 2221, the decoder 120 may obtain a final prediction value of the current block 2221 according to the third embodiment 2220 by using one selected from among a first prediction value obtained from the left reference samples 2204 according to the intra prediction method of the first embodiment 2200 and a second prediction value obtained from the right reference samples 2214 according to the intra prediction method of the second embodiment 2210.

A fourth embodiment 2230 illustrates an intra prediction method when only an upper block, an upper-left block, and an upper-right block are reconstructed earlier than a current block 2231. In the fourth embodiment 2230, upper reference samples 2232, upper-left reference samples 2233, and upper-right reference samples 2234 may be used for intra prediction. Therefore, an intra prediction method in which left reference samples 2235, lower-left reference samples 2236, right reference samples 2237, and lower-right reference samples 2238 are essentially used may not be used in the fourth embodiment 2230. For example, the horizontal mode uses left reference samples or right reference samples and thus may not be used in the fourth embodiment 2230.

In the fourth embodiment 2230, the reference samples adjacent to the current block 2231 are only the upper reference samples 2232 according to the decoding order. Also, because the upper-left reference samples 2233 and the upper-right reference samples 2234 are spatially separated from the current block 2231, the prediction accuracy may be low compared to the other embodiments 2200, 2210, and 2220. Therefore, the intra prediction method used in the fourth embodiment 2230 is preferably a vertical mode using the upper reference sample 2232 of the upper block adjacent to the current block 2231 or a directional prediction mode in a direction adjacent to the vertical mode.

However, when the left reference samples 2235, the lower-left reference samples 2236, the right reference samples 2237, and the lower-right reference samples 2238 are padded based on the upper reference samples 2232, the upper-left reference samples 2233, and the upper-right reference samples 2234, the decoder 120 may predict the current block 2231 of the fourth embodiment 2230 according to the intra prediction method of the third embodiment 2220.

Figure 23:
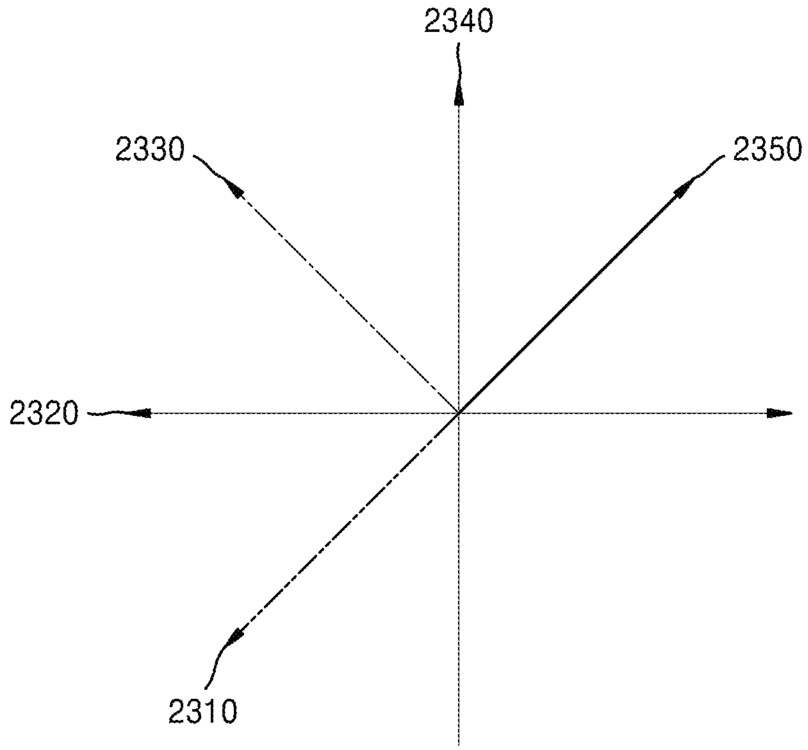
FIG. 23 illustrates an embodiment of an intra prediction mode direction.

FIG. 23 illustrates an embodiment of an intra prediction mode direction.

In detail, a vertical direction 2340 that is a positive direction of a y-axis, and a horizontal direction 2320 that is a negative direction of an x-axis, among intra prediction directions of an intra prediction mode in FIG. 23 illustrate a vertical mode and a horizontal mode of the intra prediction mode, respectively. Also, FIG. 23 illustrates a diagonal directional mode 2350 on a first quadrant, which is a last direction among the intra prediction directions, a diagonal directional mode 2310 on a third quadrant, which is a start direction of a directional mode, and a diagonal mode 2330 perpendicular to a direction of a 45-degree diagonal directional mode 2350. The direction of the diagonal directional mode 2350 among the intra prediction modes of FIG. 23 may be an angular direction other than the 45-degree direction.

According to an embodiment, 67 intra prediction modes are provided. In detail, the intra prediction modes may include a DC mode, a planar mode, and 65 directional modes. The intra prediction modes may be classified by indicating indexes of the intra prediction modes as 0 to 66 (0 is the planar mode, 1 is the DC mode, and 2 to 66 are the directional modes).

Referring to FIG. 23, a mode in which an index of the intra prediction mode is 2 may be the directional mode 2310 of a direction opposite to the 45-degree directional mode 2350. A mode in which an index of the intra prediction mode is 34 may be the diagonal mode 2330 perpendicular to the direction of the 45-degree directional mode 2350. A mode in which an index of the intra prediction mode is 66 may be the intra prediction mode of the 45-degree direction 2350. An index of the horizontal mode 2320 that is the negative direction of the x-axis may be 18. An index of the vertical mode 2340 that is the positive direction of the y-axis may be 50.

Figure 24:
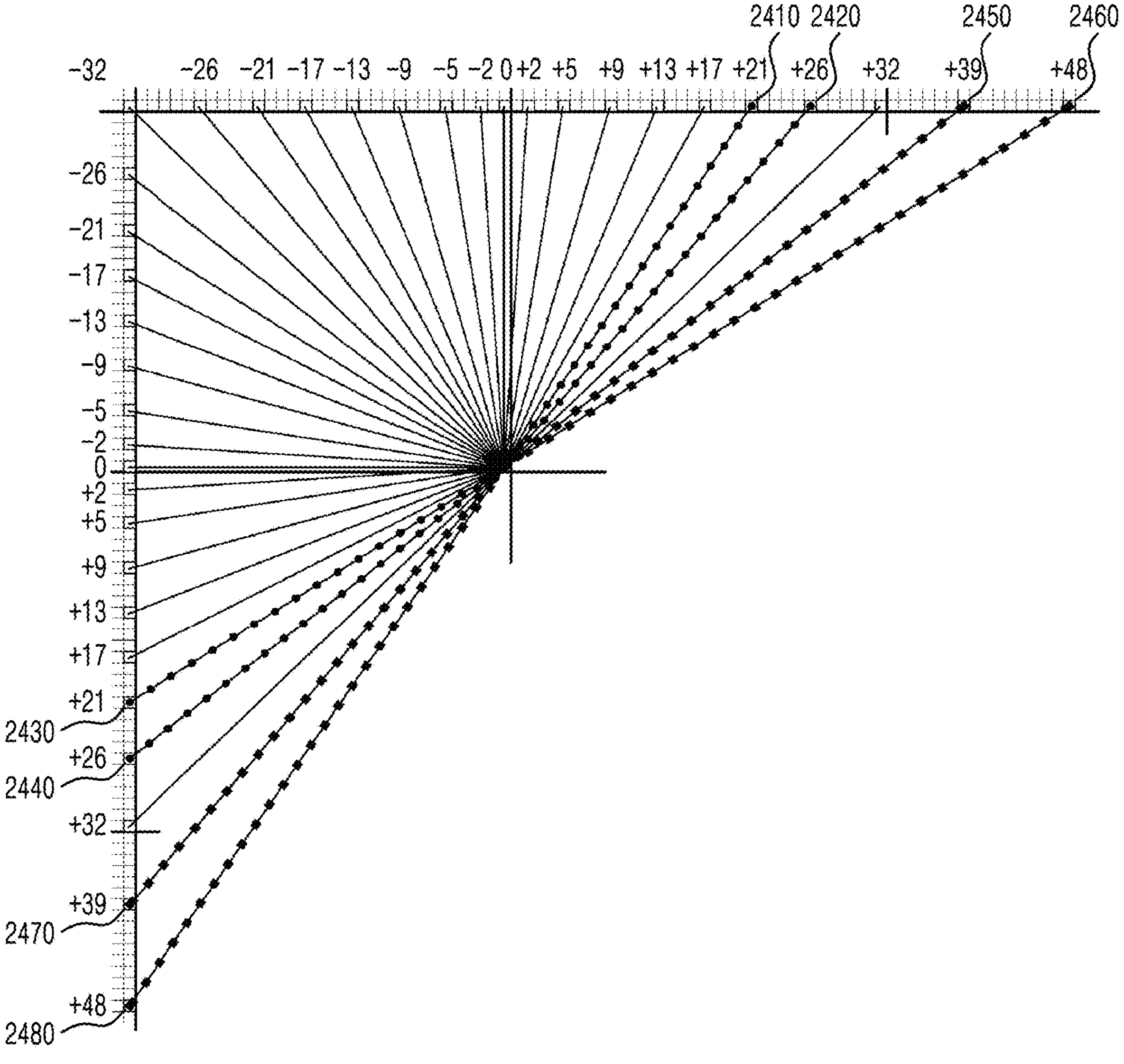
FIG. 24 illustrates an example of a wide-angle directional mode.

FIG. 24 illustrates an example of a wide-angle directional mode.

Referring to FIG. 24, a wide-angle directional mode, which is an angular direction other than the 65 directional modes described above in FIG. 23, may be additionally included in the intra prediction modes. In detail, in FIG. 24, in addition to directional modes 2410 and 2420 located inside a directional mode in a 45-degree direction and directional modes 2430 and 2440 located inside a directional mode in a direction opposite to the 45-degree direction, additional wide-angle directional modes may be included in the intra prediction modes, such as directional modes 2450 and 2460 located outside the directional mode in the 45-degree direction and directional modes 2470 and 2480 located outside the directional mode in the direction opposite to the 45-degree direction. The wide-angle directional modes may be applied to intra prediction with respect to a rectangular block. As such, intra prediction suitable for a rectangular block may be performed. When intra prediction with respect to a rectangular block as shown in FIGS. 25B and 25C to be described below is performed, a wide-angle directional mode is performed by using reference samples corresponding to twice a width and a height of the rectangular block, and thus information required for prediction may be sufficiently provided and a buffer may be efficiently used.

Figure 25A:
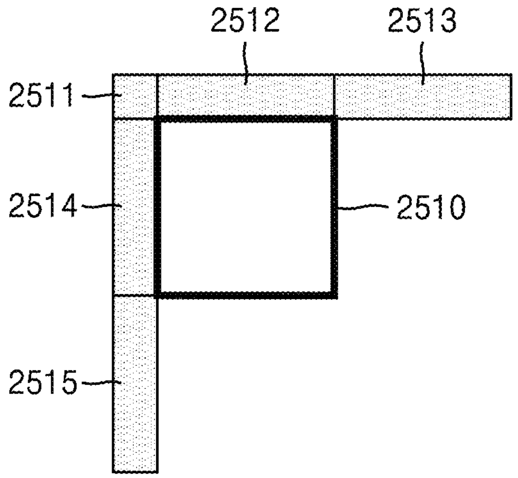
FIG. 25A illustrates an example of reference samples of a square block.
Figure 25B:
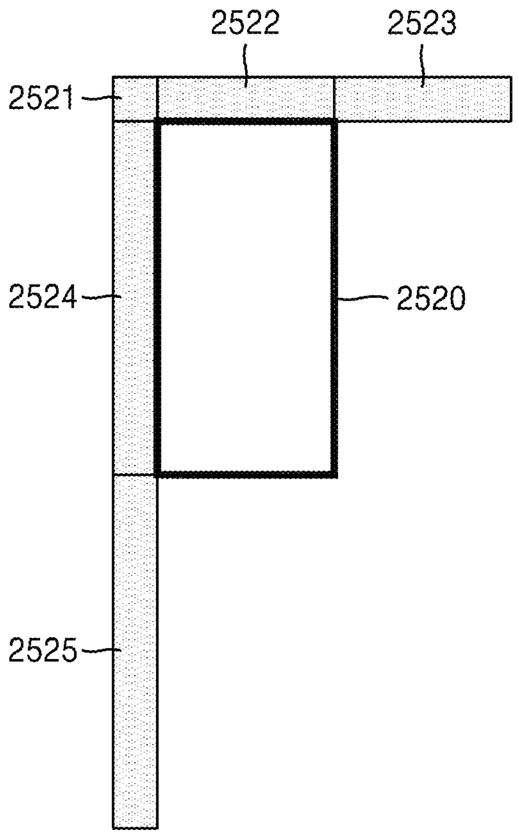
FIG. 25B illustrates an example of reference samples of a rectangular block having longer vertical sides.
Figure 25C:
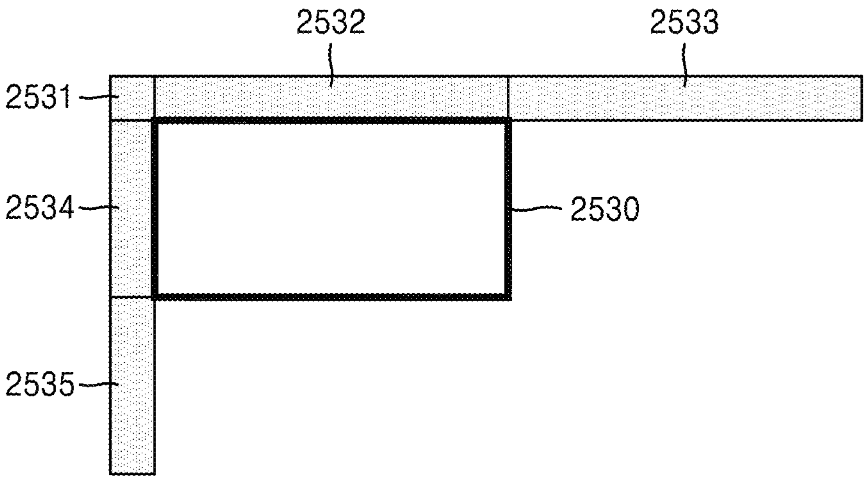
FIG. 25C illustrates an example of reference samples of a rectangular block having longer horizontal sides.

FIG. 25A illustrates an example of reference samples of a square block, FIG. 25B illustrates an example of reference samples of a rectangular block having longer vertical sides, and FIG. 25C illustrates an example of reference samples of a rectangular block having longer horizontal sides.

Referring to FIG. 25A, reference samples used when intra prediction is performed on a square current block 2510 may include reference samples 2512 adjacent to the upper side of the current block 2510 and reference samples 2513 adjacent to the upper right side of the current block 2510, which correspond to twice a width of the current block 2510, reference samples 2514 adjacent to the left side of the current block 2510 and reference samples 2515 adjacent to the lower left side of the current block 2510, which correspond to twice a height of the current block 2510, and a reference sample 2511 in the upper lower end. Intra prediction with respect to the current block 2510 may be performed by using the reference samples.

According to an embodiment, whether a current first block is to be split into a plurality of second blocks may be determined, when the current first block is not split into the second blocks, and a prediction mode of the current first block is an intra prediction mode, reference samples including reference samples corresponding to twice a height and a width of the current first block may be determined, and intra prediction with respect to the current first block may be performed based on the determined reference samples. According to an embodiment, whether the current first block is to be split into the plurality of second blocks may be determined, when the current first block is split into the second blocks, and a prediction mode of a current second block is an intra prediction mode, reference samples including reference samples corresponding to twice a height and a width of the current second block may be determined, and intra prediction may be performed on the current second block, based on the determined reference samples. The current block 2510 of FIG. 25A may be a first block or a second block, the first block may be a coding unit, a transform unit, or a prediction unit, and the second block may be a coding unit, a transform unit, or a prediction unit.

According to an embodiment, in a codec being used, in a case where there is a possibility that the first block or the second block has a rectangular shape, a reference sample corresponding to twice a width and a height of the first block or the second block may be determined when intra prediction is performed.

According to an embodiment, in a case where an intra prediction mode of the current block 2510 is a DC mode, an average of the reference samples 2512 adjacent to the upper side of the current block 2510 and the reference samples 2514 adjacent to the left side of the current block 2510 may be used as a DC value.

According to an embodiment, when a prediction mode of the current block 2510 is a planar mode, a prediction sample in the lower left end of the current block 2510 may be calculated through linear interpolation of a sample located at the bottom among the reference samples 2515 in the lower left end and a sample located in the rightmost side among the reference samples 2513 in the upper right end.

According to an embodiment, when a right adjacent block of the current block 2510 is previously encoded or previously reconstructed, intra prediction may be performed by using right reference samples, lower-right reference samples, upper-left reference samples, and upper-right reference samples, instead of the left reference samples 2514, the lower-left reference samples 2515, the upper-right reference samples 2513, and the upper-left reference sample 2511.

According to an embodiment, when information of an adjacent block of a current block is not accessible or is invalid, values of reference samples may be filled by padding a value of a reference sample that is closest to a valid reference sample among the adjacent blocks of the current block.

According to an embodiment, when the information of the adjacent block of the current block is not accessible or is invalid, the values of the reference samples may be filled with a DC value that is an average of valid reference samples of the current block.

According to an embodiment, when the information of the adjacent block of the current block is not accessible or is valid, the values of the reference samples may be filled with a predetermined default value.

According to an embodiment, when a plurality of reference sample lines are used instead of one reference sample line in intra prediction, a length of a reference sample required according to an intra mode of the current block and a shape of the current block may be increased.

Referring to FIG. 25B, reference samples used when intra prediction is performed on a rectangular current block 2520 with longer vertical sides may include reference samples 2522 adjacent to the upper side of the current block 2520 and reference samples 2523 adjacent to the upper right side of the current block 2520, which correspond to twice a width of the current block 2520, reference samples 2524 adjacent to the left side of the current block 2520 and reference samples 2525 adjacent to the lower left side of the current block 2520, which correspond to twice a height of the current block 2520, and a reference sample 2521 in the upper lower end. Intra prediction with respect to the current block 2520 may be performed by using the reference samples.

According to an embodiment, whether a current first block is to be split into a plurality of second blocks may be determined, when the current first block is not split into the second blocks, and a prediction mode of the current first block is an intra prediction mode, reference samples including reference samples corresponding to twice a height and a width of the current first block may be determined, and intra prediction may be performed on the current first block, based on the determined reference samples. According to an embodiment, whether the current first block is to be split into the plurality of second blocks may be determined, when the current first block is split into the second blocks, and a prediction mode of a current second block is an intra prediction mode, reference samples including reference samples corresponding to twice a height and a width of the current second block may be determined, and intra prediction may be performed on the current second block, based on the determined reference samples. The current block 2520 of FIG. 25B may be a first block or a second block, the first block may be a coding unit, a transform unit, or a prediction unit, and the second block may be a coding unit, a transform unit, or a prediction unit.

According to an embodiment, in a codec being used, in a case where there is a possibility that the first block or the second block has a rectangular shape, a reference sample corresponding to twice a width and a height of the first block or the second block may be determined when intra prediction is performed.

According to an embodiment, in a case where an intra prediction mode of the current block 2520 is a DC mode and the width and the height of the current block 2520 are the same, an average of the reference samples 2522 adjacent to the upper side of the current block 2520 and the reference samples 2524 adjacent to the left side of the current block 2520 may be used as a DC value.

According to an embodiment, when the intra prediction mode of the current block 2520 is the DC mode and the width and the height of the current block 2520 are different from each other, the number of samples to calculate an average may not be $2^N$ (where N is an integer equal to or greater than 1). In this case, a case where a division operation may not be replaced by a shift operation may occur. At this time, a predetermined weighted value according to various size combinations of blocks may be stored in a look-up table, and a DC value may be determined by multiplying an average value of the reference samples 2522 adjacent to the upper side of the current block 2520 and the reference samples 2524 adjacent to the left side of the current block 2520, by the predetermined weighted value.

According to an embodiment, in a case where the intra prediction mode of the current block 2520 is the DC mode and the width and the height of the current block 2520 are different from each other, an average of the reference samples 2522 adjacent to the upper side of the current block 2520 may be determined as an upper DC value, an average of the reference samples 2524 adjacent to the left side of the current block 2520 may be determined as a left DC value, and a weighted average value determined by using predetermined weights of the upper DC value and the left DC value may be used as a final DC value.

According to an embodiment, in a case where the intra prediction mode of the current block 2520 is the DC mode and the width and the height of the current block 2520 are different from each other, an average of the reference samples 2524 adjacent to the left side of the current block 2520 may be used as a DC value. This is the same as, in a case where a current block has a rectangular shape with longer vertical sides, assigning a weight 1 to an average value of left reference samples and assigning a weight 0 to an average value of upper reference samples.

According to an embodiment, in a case where the intra prediction mode of the current block 2520 is the DC mode and the width and the height of the current block 2520 are different from each other, an average of the reference samples 2522 adjacent to the upper side of the current block 2520 may be determined as an upper DC value, an average of the reference samples 2524 adjacent to the left side of the current block 2520 may be determined as a left DC value, and intra prediction may be performed using different weights according to a location of a prediction sample of the current block 2520, as in a planar mode, by using the upper DC value and the left DC value.

According to an embodiment, when a prediction mode of the current block 2520 is a planar mode, a prediction sample in the lower left end of the current block 2520 may be calculated through linear interpolation of a sample located at the bottom among the lower-left reference samples 2525 and a sample located in the rightmost side among the upper-right reference samples 2523.

According to an embodiment, when information of an adjacent block of a current block is not accessible or is invalid, values of reference samples may be filled by padding a value of a reference sample that is closest to a valid reference sample among the adjacent blocks of the current block.

According to an embodiment, when the information of the adjacent block of the current block is not accessible or is invalid, the values of the reference samples may be filled with a DC value that is an average of valid reference samples of the current block.

According to an embodiment, when the information of the adjacent block of the current block is not accessible or is valid, the values of the reference samples may be filled with a predetermined default value.

According to an embodiment, when a plurality of reference sample lines are used instead of one reference sample line in intra prediction, a length of a reference sample required according to an intra mode of the current block and a shape of the current block may be increased.

According to an embodiment, when a right adjacent block of the current block 2520 is previously encoded or previously reconstructed, intra prediction may be performed by using right reference samples, lower-right reference samples, upper-left reference samples, and upper-right reference samples, instead of the left reference samples 2524, the lower-left reference samples 2525, the upper-right reference samples 2523, and the upper-left reference sample 2521.

Referring to FIG. 25C, reference samples used when intra prediction is performed on a rectangular current block 2530 with longer horizontal sides may include reference samples 2532 adjacent to the upper side of the current block 2530 and reference samples 2533 adjacent to the upper right side of the current block 2530, which correspond to twice a width of the current block 2530, reference samples 2534 adjacent to the left side of the current block 2530 and reference samples 2535 adjacent to the lower left side of the current block 2530, which correspond to twice a height of the current block 2530, and a reference sample 2531 in the upper lower end. Intra prediction may be performed on the current block 2530 by using the reference samples.

According to an embodiment, whether a current first block is to be split into a plurality of second blocks may be determined, when the current first block is not split into the second blocks, and a prediction mode of the current first block is an intra prediction mode, reference samples including reference samples corresponding to twice a height and a width of the current first block may be determined, and intra prediction may be performed on the current first block, based on the determined reference samples. According to an embodiment, whether the current first block is to be split into the plurality of second blocks may be determined, when the current first block is split into the second blocks, and a prediction mode of a current second block is an intra prediction mode, reference samples including reference samples corresponding to twice a height and a width of the current second block may be determined, and intra prediction may be performed on the current second block, based on the determined reference samples. The current block 2530 of FIG. 25C may be a first block or a second block, the first block may be a coding unit, a transform unit, or a prediction unit, and the second block may be a coding unit, a transform unit, or a prediction unit.

According to an embodiment, in a codec being used, in a case where there is a possibility that the first block or the second block has a rectangular shape, a reference sample corresponding to twice a width and a height of the first block or the second block may be determined when intra prediction is performed.

According to an embodiment, when an intra prediction mode of the current block 2530 is a DC mode and the width and the height of the current block 2530 are the same, an average value of the reference samples 2532 adjacent to the upper side of the current block 2530 and the reference samples 2534 adjacent to the left side of the current block 2530 may be used as a DC value.

According to an embodiment, when the intra prediction mode of the current block 2530 is the DC mode and the width and the height of the current block 2530 are different from each other, the number of samples to calculate an average may not be $2^N$ (where N is an integer equal to or greater than 1). In this case, a case where a division operation may not be replaced by a shift operation may occur. At this time, a predetermined weighted value according to various size combinations of blocks may be stored in a look-up table, and a DC value may be determined by multiplying an average value of the reference samples 2532 adjacent to the upper side of the current block 2530 and the reference samples 2534 adjacent to the left side of the current block 2530, by the predetermined weighted value.

According to an embodiment, when the intra prediction mode of the current block 2530 is the DC mode and the width and the height of the current block 2530 are different from each other, an average of the reference samples 2532 adjacent to the upper side of the current block 2530 may be determined as an upper DC value, an average of the reference samples 2534 adjacent to the left side of the current block 2530 may be determined as a left DC value, and a weighted average value determined by using predetermined weights of the upper DC value and the left DC value may be used as a final DC value.

According to an embodiment, when the intra prediction mode of the current block 2530 is the DC mode and the width and the height of the current block 2530 are different from each other, an average of the reference samples 2532 adjacent to the upper side of the current block 2530 may be used as a DC value. This is the same as, when a current block has a rectangular shape with longer horizontal sides, assigning a weight 1 to an average value of upper reference samples and assigning a weight 0 to an average value of left reference samples.

According to an embodiment, in a case where the intra prediction mode of the current block 2530 is the DC mode, when the width and the height of the current block 2530 are different from each other, an average of the reference samples 2532 adjacent to the upper side of the current block 2530 may be determined as an upper DC value, an average of the reference samples 2534 adjacent to the left side of the current block 2530 may be determined as a left DC value, and different weights are set according to a location of a prediction sample of the current block 2530, as in a planar mode, by using the upper DC value and the left DC value, so that intra prediction may be performed.

According to an embodiment, when a prediction mode of the current block 2530 is a planar mode, a prediction sample in the lower left end of the current block 2530 may be calculated through linear interpolation of a sample located at the bottom among the lower-left reference samples 2535 and a sample located in the rightmost side among the upper-right reference samples 2533.

According to an embodiment, when information of an adjacent block of a current block is not accessible or is invalid, values of reference samples may be filled by padding a value of a reference sample that is closest to a valid reference sample among the adjacent blocks of the current block.

According to an embodiment, when the information of the adjacent block of the current block is not accessible or is invalid, the values of the reference samples may be filled with a DC value that is an average of valid reference samples of the current block.

According to an embodiment, when the information of the adjacent block of the current block is not accessible or is valid, the values of the reference samples may be filled with a predetermined default value.

According to an embodiment, when a plurality of reference sample lines are used instead of one reference sample line in intra prediction, a length of a reference sample required according to an intra mode of the current block and a shape of the current block may be increased.

According to an embodiment, when a right adjacent block of the current block 2530 is previously encoded or previously reconstructed, intra prediction may be performed by using right reference samples, lower-right reference samples, upper-left reference samples, and upper-right reference samples, instead of the left reference samples 2534, the lower-left reference samples 2535, the upper-right reference samples 2533, and the upper-left reference sample 2531.

Figure 26:
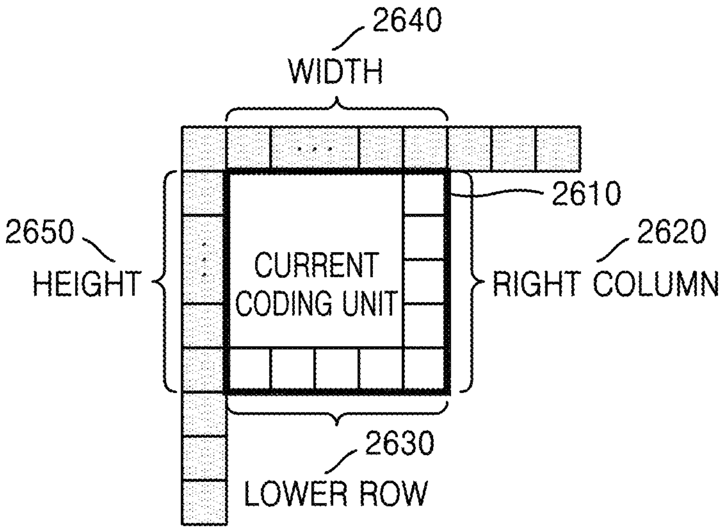
FIG. 26 illustrates an example of generating an additional reference sample inside a current coding unit.

FIG. 26 illustrates an example of generating an additional reference sample inside a current coding unit.

According to an embodiment, reference samples are generated in an area where reference samples do not exist, and the generated reference samples may be used for intra prediction. In this case, calculation may be facilitated by generating the reference samples according to powers of 2, so that a division operation may be replaced by a shift operation.

For example, referring to FIG. 26, additional reference samples are generated in a right column 2620 and a lower row 2630 inside a current coding unit 2610, and the generated additional samples are additionally used for intra prediction, and thus prediction calculation of the current coding unit 2610 may be facilitated. For example, reference samples located in the right column 2620 are generated by copying a value of a reference sample located in the upper side of the right column 2620 as it is, reference samples located in the lower row 2630 are generated by copying a value of a reference sample located in the left side of the lower row 2630 as it is, and a lower-right reference sample may be generated so that an average value of the reference sample located in the upper side of the right column 2620 and the reference sample located in the left side of the lower row 2630 is a sample value. Alternatively, after the lower-right reference sample is generated so that the average value of the reference sample located in the upper side of the right column 2620 and the reference sample located in the left side of the lower row 2630 is the sample value, the reference samples located in the lower row 2630 may be generated through linear interpolation of the value of the reference sample located in the left side of the lower-right reference sample and a value of the lower-right reference sample, and the reference samples located in the right column 2620 may be generated through linear interpolation of the value of the reference sample located in the upper side of the right column 2620 and the value of the lower-right reference sample. Because the right column 2620 and the lower row 2630 correspond to sizes of a height and a width of the current coding unit 2610, reference sample of powers of 2 may be generated. Therefore, additional reference samples are powers of 2, and thus a division operation may be replaced by a shift operation, thereby facilitating calculation.

Figure 27:
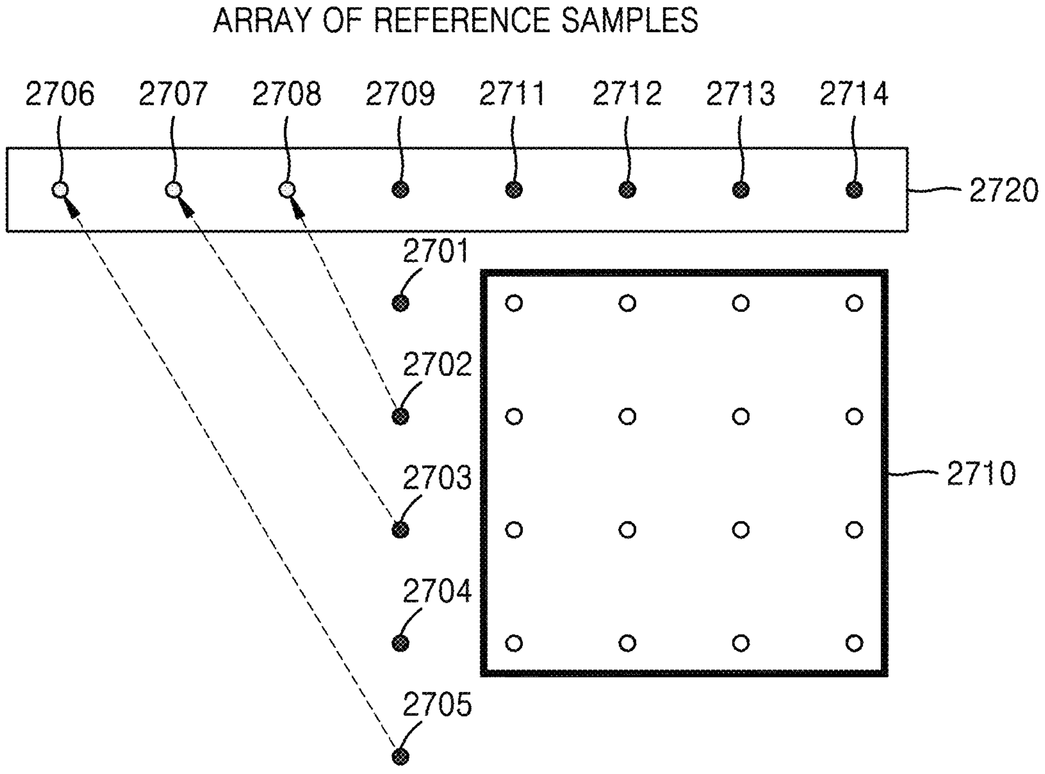
FIG. 27 illustrates an example of changing locations of reference samples in intra prediction of a current block.

FIG. 27 illustrates an example of changing locations of reference samples in intra prediction of a current block.

According to an embodiment, reference samples located in the left side of a current block are moved to the left side of reference samples located in the upper side of the current block according to an intra prediction mode, or the reference samples located in the upper side of the current block are moved to the upper side of the reference sample located in the left side of the current block, and the reference samples are copied to a continuous memory, so that intra prediction may be performed by using the reference samples.

According to an embodiment, when locations of the reference samples are moved, intra prediction may be performed after only some of the reference samples are moved.

Referring to FIG. 27, locations of five reference samples 2701, 2702, 2703, 2704, and 2705 located in the left side of a current block 2710 are changed to the left side of reference samples located in the upper side of the current block 2710, and locations of only the reference samples 2702, 2703, and 2705 required to perform intra prediction according to an intra prediction mode among the five reference samples are changed, so that reference samples 2706, 2707, and 2708 of which locations are changed may be generated. Intra prediction may be performed on the current block 2710 by using an array 2720 of reference samples including the changed reference samples 2706, 2707, and 2708, a reference sample 2709 located in an existing upper left end, and reference samples 2711, 2712, 2713, and 2714 located in the upper side of the current block 2710. By moving locations of the reference samples through vertical or horizontal interpolation, the accuracy of intra prediction may be improved.

According to another embodiment, new reference samples 2706, 2707, and 2708 may be generated by applying filtering to the five reference samples 2701, 2702, 2703, 2704, and 2705 located in the left side of the current block 2710. Intra prediction may be performed on the current block 2710 by using an array 2720 of reference samples including the new reference samples 2706, 2707, and 2708, the reference sample 2709 located in the existing upper left end, and the reference samples 2711, 2712, 2713, and 2714 located in the upper side of the current block 2710.

Hereinafter, as one of the intra prediction methods, a decoding process of a line-based intra prediction method will be described below.

The "line-based intra prediction method" refers to a method of performing intra prediction by determining an intra prediction mode based on a line splitting a first block that splits a current frame or for each unit of a second block that is a sub-block. The line-based intra prediction method to be described below may be performed by the processor 1720 of the video decoding apparatus 1700 in FIG. 17 and the processor 1920 of the video encoding apparatus 1900 in FIG. 19. The memory 1710 of the video decoding apparatus 1700 and the memory 1910 of the video encoding apparatus 1900 may be configured to store data received from the outside, data generated by a processor, for example, information about methods to split a first block into a plurality of second blocks, information about an intra prediction mode of the first block, etc.

A relationship between data blocks, which are the first block that splits the current frame and at least one second block included in the first block, may include an inclusion relationship between various data blocks. The second block may be a sub-block of the first block or a block obtained by splitting the first block by line.

A direction in which the first block is split into the second blocks may be determined through signaled information, or may be determined according to a shape of the first block or an intra mode of the first block. According to an embodiment, the signaled information indicates that a plurality of second blocks are obtained by vertically splitting the first block, the second blocks may be obtained by vertically splitting the first block. According to another embodiment, when the first block has a rectangular shape with horizontally longer sides, second blocks may be obtained by vertically splitting the first block, and when the first block has a rectangular shape with vertically longer sides, second blocks may be obtained by horizontally splitting the first block.

According to an embodiment, when the first block is a largest coding unit, the second blocks included in the first block may be coding units split from the largest coding unit. According to an embodiment, when the first block is a first coding unit, the second blocks included in the first block may be a second coding unit smaller than the first coding unit. According to an embodiment, when the first block is a coding unit, the second blocks included in the first block may be a prediction unit or transform unit determined based on the coding unit. However, because the above-described embodiments are examples to describe an inclusion relationship between the first block and the second blocks, the first block and the second blocks are not limited to the above-described embodiments, and various types of data blocks in an inclusion relationship similar to the above-described embodiments may be used.

According to an embodiment, a width or height of the second block, which is a sub-block, may be 1 or greater.

According to an embodiment, the processor 1720 of the video decoding apparatus 1700 may be configured to determine at least one first block that splits a current frame, which is one of at least one frame included in an image, when intra prediction is performed in the current first block, determine a first prediction mode indicating an intra prediction method to be performed in the current first block based on first intra prediction mode information obtained from a bitstream, determine a plurality of second blocks included in the current first block, determine a second prediction mode indicating an intra prediction method to be performed in the second blocks based on at least one of the first prediction mode and second intra prediction mode information obtained from a bitstream for each second block, and perform intra prediction based on the first prediction mode and the second prediction mode, so that the image may be decoded.

Figure 28A:
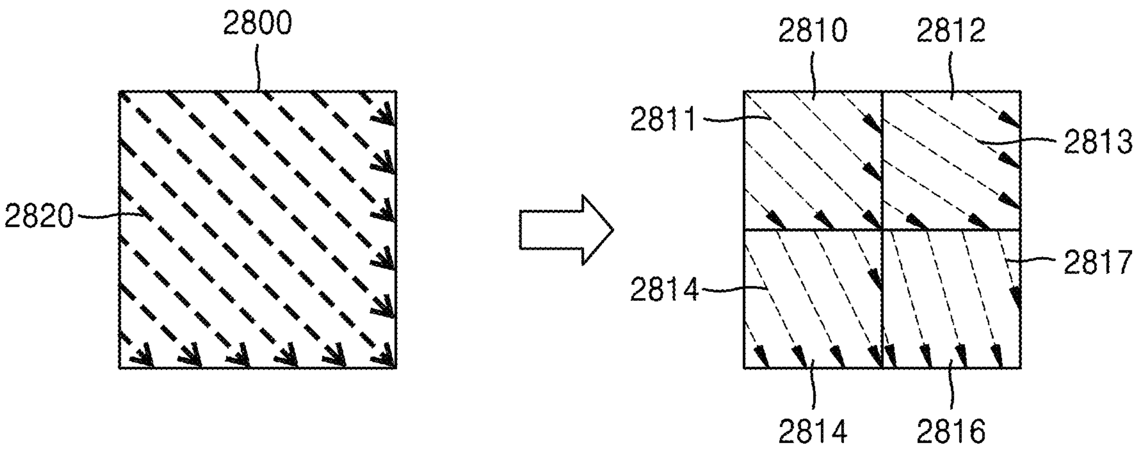
FIG. 28A illustrates an example of a process of determining an intra prediction mode of a plurality of second blocks, which are sub-blocks of a first block, based on an intra prediction mode of the first block.

FIG. 28A illustrates an example of a process of determining an intra prediction mode of a plurality of second blocks, which are sub-blocks of a first block, based on an intra prediction mode of the first block.

According to an embodiment, during a decoding process, when intra prediction is performed in a current first block, a first prediction mode indicating an intra prediction method to be performed in the current first block based on first intra prediction mode information obtained from a bitstream may be determined. Referring to FIG. 28A, whether intra prediction is to be performed in a current first block 2800, which is one of first blocks that split a current frame, may be determined, and which method is to be used to perform intra prediction may be determined based on first intra prediction mode information obtained from a bitstream.

According to an embodiment, an intra prediction mode that may be performed in a first block may be a directional intra prediction method or a non-directional intra prediction method. An index that identifies intra prediction modes that may be performed may be used, and during the decoding process, which intra prediction mode is to be performed in the current first block 2800 may be determined by obtaining the first intra prediction mode information from the bitstream. Referring to FIG. 28A, during the decoding process, based on the first intra prediction mode information, it may be determined to perform directional intra prediction referring to a sample adjacent to an upper left direction 2802 of the current first block 2800. However, the directional intra prediction referring to the sample adjacent to the upper left direction 2802 shown in FIG. 28A is not limited to the above-described embodiments, and directional intra prediction that may be performed in the current first block 2800 may be intra prediction referring to samples adjacent to the current first block 2800 in various directions.

According to an embodiment, during the decoding process, a plurality of second blocks 2810, 2812, 2814, and 2816 that are sub-blocks of the current first block 2800 may be determined, the sub-blocks being included in the current first block 2800. Also, second intra prediction mode information may be obtained from a bitstream for each of the second blocks 2810, 2812, 2814, and 2816. An intra prediction mode that may be performed in the second blocks may be individually determined by using the second intra prediction mode information obtained for each of the second blocks 2810, 2812, 2814, and 2816.

Referring to FIG. 28A, during the decoding process, a plurality of types of intra prediction may be performed based on at least one of the first prediction mode and the second intra prediction mode information obtained for each of the second blocks 2810, 2812, 2814, and 2816.

According to an embodiment, the second intra prediction mode information obtained in relation to the second blocks 2810, 2812, 2814, and 2816 may be obtained from a bitstream generated in relation to an intra prediction method of the current first block 2800. According to an embodiment, an index indicating an intra prediction mode may be used, and whether to perform directional intra prediction or non-directional intra prediction may be determined based on the index. For example, as the intra prediction method of the current first block 2800, second prediction modes of the second blocks 2810, 2812, 2814, and 2816 may be determined based on an index (or first intra prediction mode information) indicating a directional intra prediction method referring to samples adjacent to the upper left direction 2802 of the current first block 2800 and the second intra prediction mode information obtained in relation to the second blocks 2810, 2812, 2814, and 2816. In this case, in another embodiment, the first prediction mode may be equally used as the second prediction mode without a separate index.

According to an embodiment, when the index indicating the directional intra prediction method referring to the samples adjacent to the upper left direction 2802 of the current first block 2800 is K, one of indexes such as K−N−1, K−N, K+N, K+N+1, or the like may be determined as an index indicating an intra prediction mode to be performed in the second blocks 2810, 2812, 2814, and 2816, based on the second intra prediction mode information. That is, with respect to an index of an intra prediction mode of the current first block 2800, determined by the first intra prediction mode information, an index indicating an intra prediction mode to be performed for each of the second blocks may be determined based on pieces of second intra prediction mode information obtained respectively from bitstreams in relation with the second blocks 2810, 2812, 2814, and 2816, and the second prediction mode may be determined based on the index. Table 1 below illustrates an example indicating an index of an intra prediction mode that may be determined for the second blocks 2810, 2812, 2814, and 2816 included in the current first block 2800 based on at least one of the first intra prediction mode information and the second intra prediction mode information. According to an embodiment, the number of bits of second intra prediction mode information obtained from a bitstream may vary depending on the variety of types of second prediction modes in which the second blocks 2810, 2812, 2814, and 2816 may be determined based on the first prediction mode, and furthermore, lengths of the bits may be variable. Table 1 below merely corresponds to an example indicating an index of an intra mode of a second block, which may be determined based on second intra prediction mode information with respect to an index of a first block, and the embodiment is not limited to the index or second intra prediction mode information indicated in Table 1 below. Here, K, A, and B may include a preset integer.

TABLE 1

| Index of intra mode of first block | Second intra prediction mode information | Index of intra prediction mode of second block |
|---|---|---|
| K | 00 | K |
| | 01 | K + A |
| | 10 | K + A + B |
| | 11 | K − A |

According to an embodiment, a direction or angle of a reference sample used in the directional intra prediction mode may be determined according to an index indicating an intra prediction mode. According to an embodiment, an index indicating an intra prediction mode to be performed for each second block may be determined based on at least one of the first intra prediction mode information and the second intra prediction mode information. As such, an intra prediction direction of a plurality of second blocks included in a first block may be adjusted based on an intra prediction direction related to an intra prediction mode of a current first block. Referring to FIG. 28A, intra prediction directions 2811, 2813, 2815, and 2817 of the second blocks 2810, 2812, 2814, and 2816 included in current first block 2800 may be determined based on an intra prediction direction 2802 of the current first block 2800. Referring to Table 1, when second intra prediction mode information about the upper-left second block 2810 is 00, intra prediction may be performed according to a prediction direction related to an index (K) equal to an index (K) of the intra prediction direction 2802 of the current first block 2800. Furthermore, when second intra prediction mode information about the upper-right second block 2812 is 11, intra prediction may be performed according to a prediction direction related to an index (e.g., K−A) having a size smaller than the index (K) of the intra prediction direction 2802 of the current first block 2800. When second intra prediction mode information about the lower-left second block 2814 is 01, intra prediction may be performed according to a prediction direction related to an index (e.g., K+A) having a size greater than the index (K) of the intra prediction direction 2802 of the current first block 2800. When second intra prediction mode information about the lower-right second block 2816 is 10, intra prediction may be performed according to a prediction direction related to an index (e.g., K+A+B) having a size greater than the index (K) of the intra prediction direction 2802 of the current first block 2800.

Accordingly, the intra prediction direction 2802 used in the current first block 2800 and the intra prediction directions individually determined in the second blocks 2810, 2812, 2814, and 2816 included in the current first block 2800 may be used. According to various embodiments as described above, rather than performing intra prediction on a data block called the current first block 2800, intra prediction are performed in various manners based on subdivided second blocks 2810, 2812, 2814, and 2816, so that accurate image reconstruction may be performed.

According to an embodiment, a second prediction mode of each of the second blocks may be determined by using an index of a second prediction mode indicating second intra prediction mode information obtained from a bitstream for each of the second blocks.

Figure 28B:
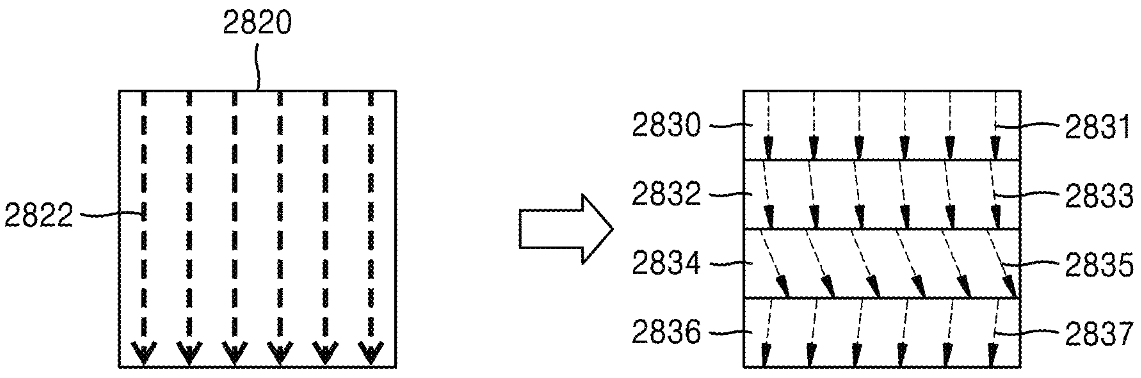
FIG. 28B illustrates an example of a process of determining a prediction mode based on a non-square block that splits an image.

FIG. 28B illustrates an example of a process of determining a prediction mode based on a non-square block that splits an image.

According to an embodiment, an image may be decoded by using a square data unit and a non-square data unit. Referring to FIG. 28B, a plurality of types of intra prediction may be performed based on second intra prediction mode information obtained for each of a plurality of second blocks 2830, 2832, 2834, and 2836 included in a current first block 2820, and second intra prediction mode information obtained from a bitstream may be information related to first intra prediction mode information.

According to an embodiment, the second intra prediction mode information obtained in relation to the second blocks 2830, 2832, 2834, and 2836 may be obtained from a bitstream generated in relation to the intra prediction method of the current first block 2820. According to an embodiment, an index indicating an intra prediction mode may be used, and whether to perform directional intra prediction or non-directional intra prediction may be determined based on the index. For example, as an intra prediction method of the current first block 2820, second prediction modes of the second blocks 2830, 2832, 2834, and 2836 may be determined based on an index (or first intra prediction mode information) indicating a directional intra prediction method referring to samples adjacent to an upper direction 2822 of the current first block 2820 and second intra prediction mode information obtained in relation to the second blocks 2830, 2832, 2834, and 2836. Here, the second blocks 2830, 2832, 2834, and 2836 included in the current first block 2820 may have non-square shapes. Moreover, a non-square first block, which does not have a square shape same as the shape of the current first block 2820 shown in FIG. 28B, may be included in a current frame. Second blocks included in the non-square first block may also be square or non-square data blocks. That is, for shapes of a first block and second blocks that may be used in various embodiments, the first block and the second blocks may have various shapes that satisfy an inclusion relationship between the first block and the second blocks, such as a square or non-square shape, etc.

According to an embodiment, the second intra prediction mode information obtained in relation to the second blocks 2830, 2832, 2834, and 2836 may be obtained from a bitstream generated in relation to the intra prediction method of the current first block 2820. According to an embodiment, an index indicating an intra prediction mode may be used, and whether to perform directional intra prediction or non-directional intra prediction may be determined based on the index. For example, as the intra prediction method of the current first block 2820, the second prediction modes of the second blocks 2830, 2832, 2834, and 2836 may be determined based on the index (or first intra prediction mode information) indicating the directional intra prediction method referring to the samples adjacent to the upper direction 2822 of the current first block 2820 and second intra prediction mode information obtained in relation to the non-square second blocks 2830, 2832, 2834, and 2836. A method of determining second prediction modes of the non-square second blocks 2830, 2832, 2834, and 2836 may be similar to the method described with reference to FIG. 28A, and thus detailed descriptions thereof will not be provided herein.

Figure 28C:
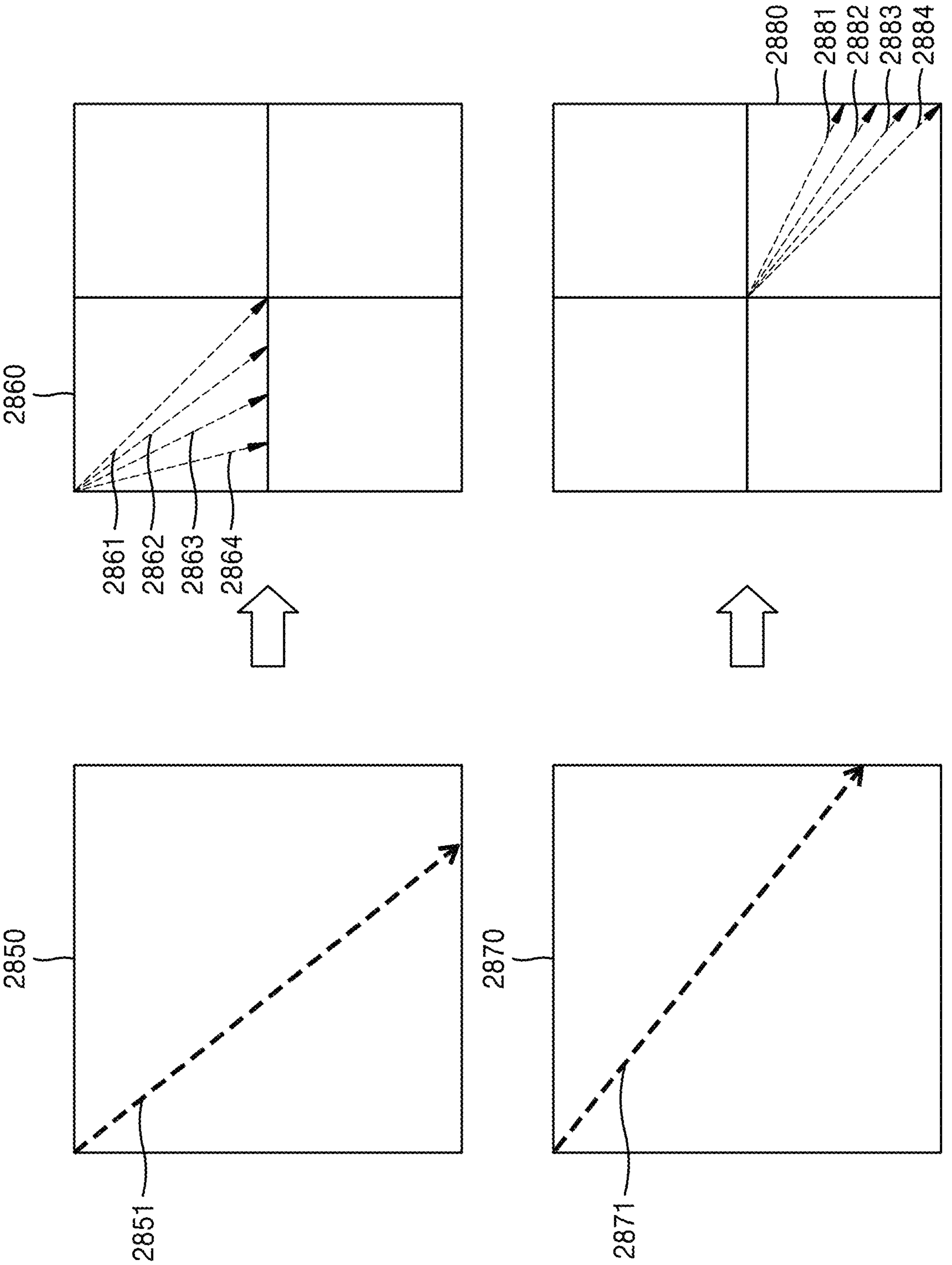
FIG. 28C illustrates a detailed example of a process of determining an intra prediction mode of a second block included in a first block.

FIG. 28C illustrates a detailed example of a process of determining an intra prediction mode of a second block included in a first block.

According to an embodiment, an intra prediction mode for each second block may be determined based on second intra prediction mode information obtained from a bitstream and a method of an intra prediction mode determined in relation to a first block 2850. According to an embodiment, the intra prediction mode determined in the first block 2850 is a directional intra prediction mode, and an intra prediction mode referring to a reference sample adjacent to at least one of a left boundary and an upper boundary of the first block 2850 may be used. An intra prediction mode of a second block 2860 may be determined based on the intra prediction mode, and in this case, the intra prediction mode of the first block 2850 may serve as a reference. Hereinafter, for convenience of description, the intra prediction mode of the first block 2850, which is used to determine the intra prediction mode of the second block 2860, will be referred to as a reference intra prediction mode.

According to an embodiment, the number and directions of directional intra prediction modes that may be used in the second block 2860 may be determined based on the reference intra prediction mode. In detail, as shown in Table 1 above, when second intra prediction mode information of the second block 2860 is 00, intra prediction may be performed with reference to a reference sample located in the same direction as the reference intra prediction mode. According to an embodiment, an index related to an intra prediction mode indicated by the second intra prediction mode information may vary depending on a direction of the reference intra prediction mode. That is, based on a result of comparing an index (K) determined according to the reference intra prediction mode with a preset threshold (L), second prediction modes indicated by the second intra prediction mode information may be differently determined. Table 2 below includes second prediction modes that may be determined according to the result of the comparison of K and L, according to an embodiment.

TABLE 2

| Result of comparing preset threshold (L) and index (K) of first intra prediction mode | Second intra prediction mode information | Index of intra prediction mode of second block |
|---|---|---|
| When K is equal to or greater than L | 00 | K |
| | 01 | K + A |
| | 10 | K + A + B |
| | 11 | K − A |
| When K is less than L | 00 | K |
| | 01 | K + A |
| | 10 | K + A |
| | 11 | K − A − B |

That is, even though the second intra prediction mode information is the same, indexes that may be determined by the second prediction modes may be variously determined according to a prediction direction of a reference sample used in a first prediction mode. Accordingly, during a prediction process, more various second prediction modes may be used in any one direction based on an index (K) indicating the first prediction mode.

Referring to FIG. 28C, when an index (K) of a first prediction mode of the current first block 2850 is equal to or greater than the preset threshold (L), according to an embodiment, based on the index (K) of the first prediction mode as the index indicated by the second intra prediction mode information, one of intra prediction modes that are related to a prediction direction 2861 related to an index (K−A) less than K, prediction directions 2863 and 2864 related to indexes (K+A and K+A+B) greater than K, and a prediction direction 2862 same as a prediction direction 2851 of the first prediction mode may be determined as a second prediction mode of the second block 2860. According to another embodiment, when an index (K) of a first prediction mode of a current first block 2870 is less than the preset threshold (L), according to an embodiment, based on the index (K) of the first prediction mode as the index indicated by the second intra prediction mode information, one of intra prediction modes that are related to prediction directions 2881 and 2882 related to indexes (K−A and K−A−B) less than K, a prediction direction 2884 related to an index (K+A) greater than K, and a prediction direction 2883 same as a prediction direction 2871 of the first prediction mode may be determined as a second prediction mode of a second block 2880. However, the above-described embodiments are merely examples to describe that types of prediction directions of the second prediction modes may be variously determined according to the prediction direction related to the first prediction mode. Thus, types of the first prediction mode and the second prediction modes are not limited to the above-described embodiments, and various directions and numbers of prediction modes may be used.

According to an embodiment, in determining of an index indicating an intra prediction mode of a second block based on second intra prediction mode information, a difference between indexes that may be determined according to a second intra prediction mode may be uniform. That is, in Table 1 or 2, a difference between index values that may be determined by a second prediction mode of the second block based on the index (K) indicating the first intra prediction mode may be uniform (A=B).

According to another embodiment, in Table 1 or 2, a difference between index values that may be determined by the second prediction mode of the second block based on the index (K) indicating the first intra prediction mode may not be uniform (A>B or A<B).

According to an embodiment, when an index of the second prediction mode is determined for each second block, a difference between indexes less than an index (K) of a first prediction mode of a first block may be different from a difference between indexes greater than the index (K) of the first prediction mode. That is, the second prediction mode may be determined by using K−nB (n>1) which is a value of the indexes less than the index (K) of the first prediction mode, and the second prediction mode may be determined by using K+nA (n>1) which is a value of the indexes greater than the index (K) of the first prediction mode. Also, according to an embodiment, in order to determine the index of the second prediction mode for each second block, the difference between the indexes less than the index (K) of the first prediction mode may be determined to be uniform or nonuniform, and the difference between the indexes greater than the index (K) of the first prediction mode may be determined to be uniform or nonuniform.

According to another embodiment, the processor 1720 of the video decoding apparatus 1700 may be configured to determine at least one first block that splits a current frame, which is one of at least one frame included in an image, when intra prediction is performed in the current first block, determine a first prediction mode indicating an intra prediction method to be performed in the current first block based on first intra prediction mode information obtained from a bitstream, determine a plurality of second blocks included in the current first block, determine a reference prediction direction used in a current second block based on a prediction direction determined according to the first intra prediction mode information and a prediction direction determined according to second intra prediction mode information related to a previous second block, determine a prediction mode using one of a plurality of prediction directions including the reference prediction direction, as a second prediction mode of the current second block, based on at least one of the first prediction mode and second intra prediction mode information obtained in relation to the current second block, and perform intra prediction based on the first prediction mode and the second prediction mode, so that the image may be decoded.

Figure 29A:
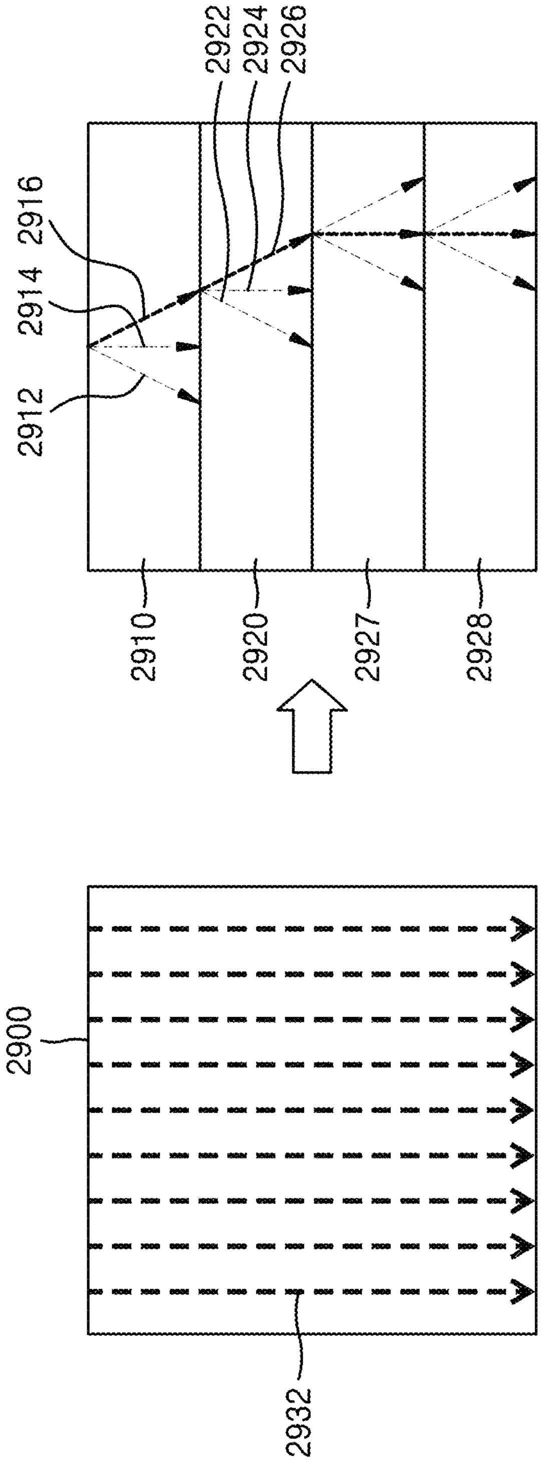
FIG. 29A illustrates an example of a process of determining a prediction direction that may be used during an intra prediction process of a current second block based on a prediction direction according to a first prediction mode.

FIG. 29A illustrates an example of a process of determining a prediction direction that may be used during an intra prediction process of a current second block based on a prediction direction according to a first prediction mode.

Referring to FIG. 29A, a prediction direction 2902 of an intra prediction mode to be performed in a current first block 2900 may be determined by using first intra prediction mode information obtained from a bitstream related to the current first block 2900. A plurality of second blocks included in the current first block 2900 may be determined. Second prediction modes of the second blocks included in the current first block 2900 may be determined, and the second prediction modes of the second blocks may be a plurality of types of second prediction modes. The second prediction modes of the second blocks may be determined according to a processing order of the second blocks.

Referring to FIG. 29A, second intra prediction mode information may be obtained from a bitstream related to a second block 2910 which is one of the second blocks included in the current first block 2900. Based on the second intra prediction mode information of the second block 2910, a second prediction mode using one of a plurality of directions 2912, 2914, and 2916 as a prediction direction may be determined. The prediction direction 2914 that is the same as the prediction direction 2902 of the current first block 2900 is a reference prediction direction and may be included as one of prediction directions that may be used as an intra prediction mode of the second block 2910. Accordingly, the second prediction mode may be determined by determining, as a prediction direction of the second block 2910, one of the prediction directions including the reference prediction direction, which is the prediction direction 2902 of the first block 2900, based on the second intra prediction mode information of the second block 2910. According to an embodiment, the prediction direction 2902 of the current first block 2900, which serves as a reference to determine prediction directions of a plurality of second blocks 2910, 2920, 2927, and 2928 included in the current first block 2900, may be used as the reference prediction direction. A process of determining one of a plurality of prediction directions as a prediction direction of a second prediction mode of a second block by using a reference prediction direction may be similar to the above-described method using an index corresponding to the prediction direction, and thus detailed descriptions thereof will not be provided herein.

Figure 29B:
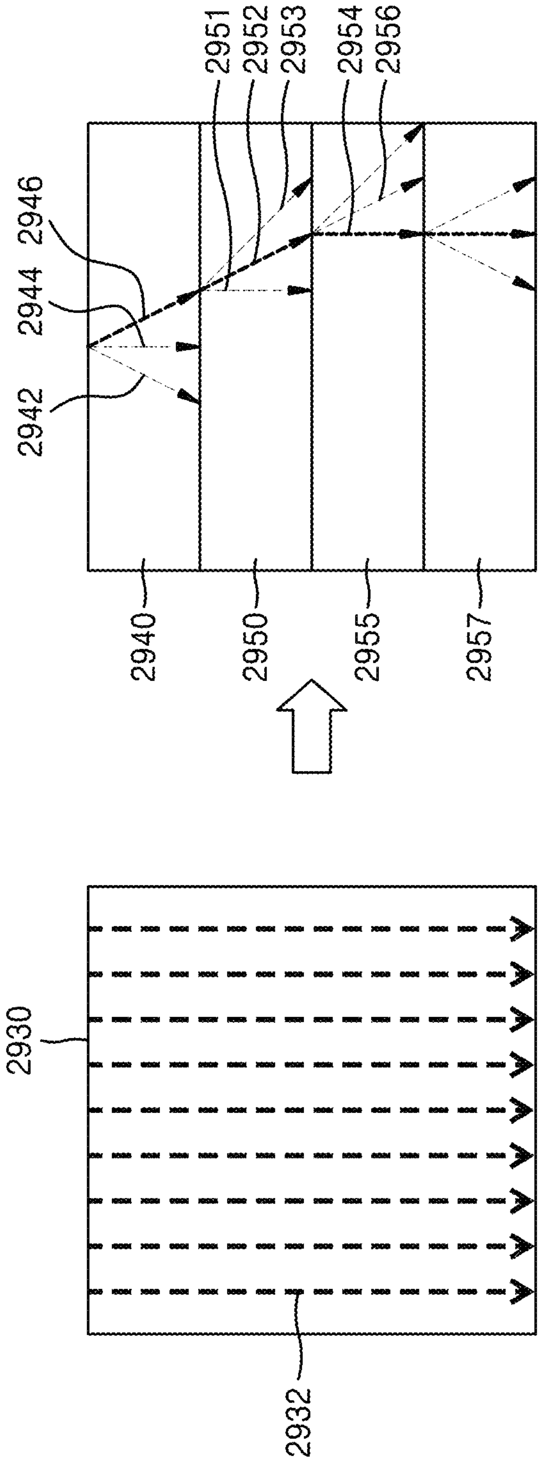
FIG. 29B illustrates an example of a process of determining a prediction direction that may be used during an intra prediction process of a current second block by using a prediction direction according to a first prediction mode and a prediction direction of a previous second block.

FIG. 29B illustrates an example of a process of determining a prediction direction that may be used during an intra prediction process of a current second block by using a prediction direction according to a first prediction mode and a prediction direction of a previous second block.

According to an embodiment, prediction direction 2932 of an intra prediction mode to be performed in a current first block 2930 may be determined by using first intra prediction mode information obtained from a bitstream related to the current first block 2930.

Referring to FIG. 29B, second intra prediction mode information may be obtained from a bitstream related to a second block 2940 which is one of the second blocks included in the current first block 2930. Based on the second intra prediction mode information of the second block 2940, a second prediction mode using one of a plurality of directions 2942, 2944, and 2946 as a prediction direction may be determined. The prediction direction 2944 that is the same as the prediction direction 2932 of the current first block 2930 is a reference prediction direction and may be included as one of prediction directions that may be used as an intra prediction mode of the second block 2940. Accordingly, the second prediction mode may be determined by determining, as a prediction direction of the second block 2940, one of the prediction directions including the reference prediction direction, which is the prediction direction 2932 of the first block 2930, based on the second intra prediction mode information of the second block 2940. According to an embodiment, a second prediction mode referring to a reference sample located in the prediction direction 2946, other than the reference prediction direction 2944, may be determined based on the second intra prediction mode information.

According to an embodiment, in order to determine prediction directions of a plurality of second blocks 2940, 2950, 2955, and 2957 included in the current first block 2930 the prediction direction 2932 of the current first block 2930 is not unifiedly used as the reference prediction direction, but a prediction direction of another second block previously processed may be used as the reference prediction direction. A prediction direction 2946 of a previous second block 2940 may be determined and may be used to determine a prediction direction of a current second block 2950 to be processed subsequently. According to an embodiment, the prediction direction of the current second block 2950 may be determined with reference to an index of an intra prediction mode using the prediction direction 2946 of the previous second block 2940, and in this case, the prediction direction 2946 of the previous second block 2940 may be a reference prediction direction used in the current second block 2950.

Referring to FIG. 29B, the second prediction mode may be determined by determining one of a plurality of prediction directions 2951, 2952, and 2953 including the same prediction direction as the prediction direction 2946 of the previous second block 2940 of the current second block 2950, as a prediction direction to be used for intra prediction. That is, different reference prediction directions may be used to determine a second prediction mode of each of the previous second block 2940 and the current second block 2950. Accordingly, even though pieces of second intra prediction mode information having the same value are obtained from bitstreams of the previous second block 2940 and the current second block 2950, various combinations of prediction directions may be used during a process of determining the second prediction mode by using different reference prediction directions between the previous second block 2940 and the current second block 2950. Referring to FIG. 29B, a combination of the prediction directions 2942, 2944, and 2946 that may be used in the previous second block 2940 and a combination of the prediction directions 2951, 2952, and 2953 that may be used in the second block 2950 are different from each other. According to an embodiment, the second prediction mode may be determined by selecting one of the prediction directions 2951, 2952, and 2953 that may be used in the current second block 2950 based on the second intra prediction mode information and the reference prediction direction 2952.

According to an embodiment, in order to determine a combination of prediction directions that may be used in a second block 2955 processed after the current second block 2950, a process similar to a process of determining the combination of the prediction directions of the current second block 2950 based on the prediction direction 2946 of the current second block 2940 may be performed. As such, a reference prediction direction 2956 of the second block 2955 processed after the current second block 2950 may be determined based on the prediction direction 2952 of the current second block 2950, and a combination of the prediction directions that may be used may be determined based on the reference prediction direction 2956. Moreover, a second prediction mode for performing intra prediction by using a prediction direction 2954 from among a plurality of prediction directions including the reference prediction direction 2956 may be determined based on second intra prediction mode information of the second block 2955 processed after the current second block 2950.

Figure 29C:
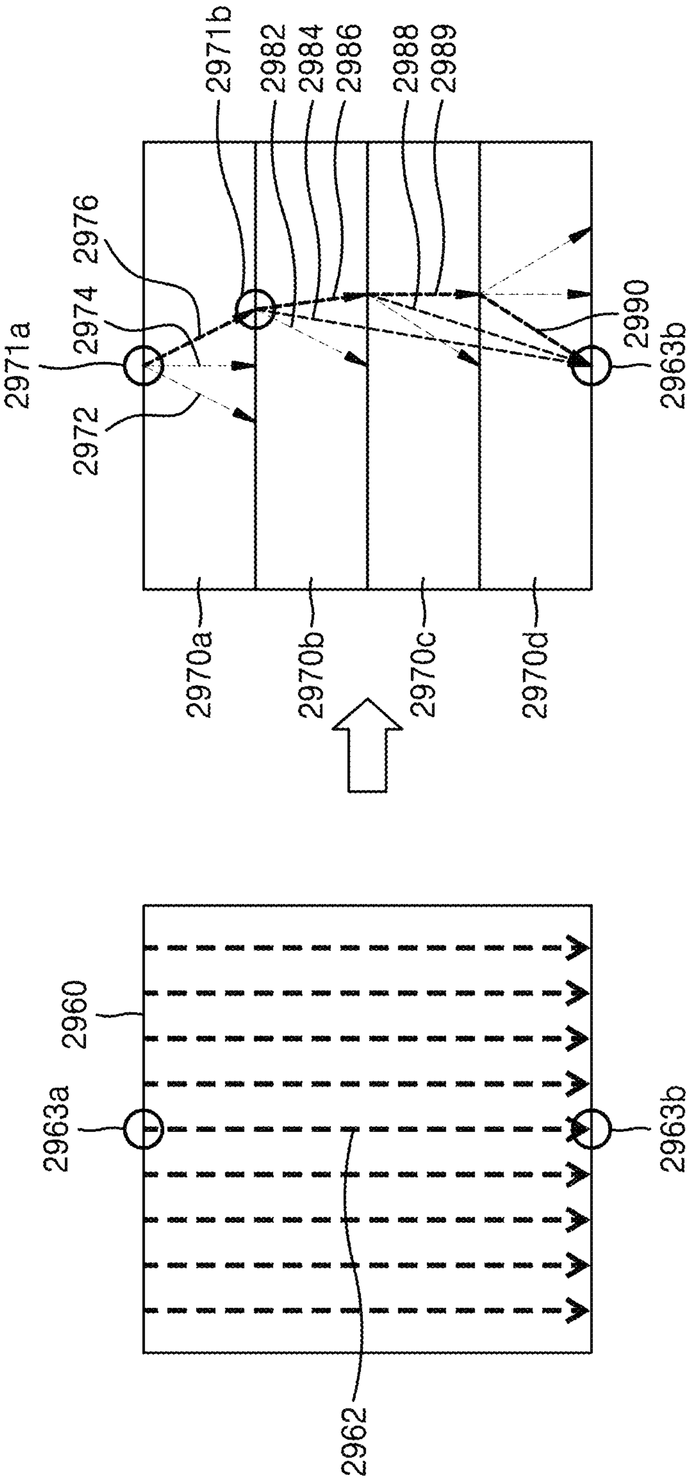
FIG. 29C illustrates a process of determining a reference prediction direction that may be used for each second block by using a prediction direction of a first block.

FIG. 29C illustrates a process of determining a reference prediction direction that may be used for each second block by using a prediction direction of a first block.

According to an embodiment, a prediction direction 2962 of an intra prediction mode to be performed in a current first block 2960 may be determined by using first intra prediction mode information obtained from a bitstream related to the current first block 2960. Moreover, a reference prediction direction of a plurality of second blocks included in the current first block 2960 may be determined by using the prediction direction 2962 of the current first block 2960.

Referring to FIG. 29C, second intra prediction mode information may be obtained from a bitstream related to a second block 2970*a* that is one of the second blocks included in the current first block 2960. Based on the second intra prediction mode information of the second block 2970*a*, a second prediction mode using one of a plurality of directions 2972, 2974, and 2976 as a prediction direction may be determined. The prediction direction 2974 that is the same as the prediction direction 2962 of the current first block 2960 is a reference prediction direction and may be included as one of prediction directions that may be used as an intra prediction mode of the second block 2970*a*. Accordingly, the second prediction mode may be determined by determining, as a prediction direction of the second block 2970*a*, one of the prediction directions including the reference prediction direction, which is the prediction direction 2962 of the first block 2960, based on the second intra prediction mode information of the second block 2970*a*.

According to an embodiment, a reference prediction direction used for each of the second blocks may be determined differently. Hereinafter, for convenience of description of an embodiment related to FIG. 29C, a plurality of second blocks 2970*a*, 2970*b*, 2970*c*, and 2970*d* included in the current first block 2960 will be referred to as A block, B block, C block, and D block, respectively. According to an embodiment, second prediction modes may be determined in order of the A block, the B block, the C block, and the D block.

According to an embodiment, in the A block 2970*a*, the second prediction mode may be determined based on the reference prediction direction 2974 which is one of the prediction directions 2972, 2974, and 2976 that may be used to perform intra prediction. A reference prediction direction of the A block 2970*a* of which a prediction direction is first determined among the second blocks may be the same as the prediction direction 2962 of the current first block 2960. According to an embodiment, the second prediction mode for performing intra prediction may be determined by selecting one direction 2976 from among the prediction directions 2972, 2974, and 2976, based on second intra prediction mode information obtained in relation to the A block 2970*a*.

According to an embodiment, in the B block 2970*b*, the second prediction mode may be determined by using a plurality of prediction directions 2982, 2984, and 2986 including a reference prediction direction. In order to determine the prediction direction 2962 of the current first block 2960 and the reference prediction direction of the B block 2970*b*, at least one of a prediction start point 2963*a* and a prediction end point 2963*b*, which are determined according to the prediction direction 2962 of the current first block 2960, a size of the B block 2970*b*, and a location of the B block 2970*b* in the current first block 2960 may be taken into consideration. According to an embodiment, the same point as the prediction start point 2963*a* of the first block 2960 may be determined as a prediction start point 2971*a* of the A block 2970*a*, and a prediction end point 2971*b* of the A block 2970*a* may be determined based on a prediction direction and the prediction start point 2971*a* of the A block 2970*a*. According to an embodiment, a prediction start point and a prediction end point may be respectively defined as points at which prediction starts and ends according to a prediction direction, during a process of performing directional intra prediction within a block.

According to an embodiment, the prediction end point 2971*b* determined based on the prediction direction 2976 of the A block 2970*a* may be used as a prediction start point in the B block 2970*b*, and a reference prediction direction 2984 in the B block 2970*b* may be determined based on the prediction start point of the B block 2970*b* and the prediction end point 2963*b* of the first block 2960. The reference prediction direction 2984 of the B block 2970*b* may be determined based on a location of the prediction start point of the B block 2970*b* in the current first block 2960 and the prediction end point 2963*b* of the first block 2960. That is, a direction connecting from the prediction start point of the B block 2970*b* in the current first block 2960 to the prediction end point 2963*b* of the current first block 2960 may be determined as the reference prediction direction 2984 of the B block 2970*b*. Accordingly, second prediction modes of the second blocks in consideration of the prediction direction 2962 of the current first block 2960 may be determined. According to an embodiment, one of prediction directions including a reference prediction direction 2989 of the C block 2970*c*, which may be determined in a method similar to the above-described method, may be determined as a prediction direction 2988 of the C block 2970*c*, and thus a second prediction mode of the C block 2970*c* may be determined. Also, one of prediction directions including a reference prediction direction 2990 of the D block 2970*d*, which may be determined in a method similar to the above-described method, may be determined as a prediction direction of the D block 2970*d*, and thus a second prediction mode of the D block 2970*d* may be determined. Referring to FIG. 29C, the reference prediction direction 2990 may be determined as the prediction direction of the D block 2970*d* based on obtained second intra prediction mode information.

Accordingly, during a process of determining reference prediction directions of the second blocks 2970*a*, 2970*b*, 2970*c*, and 2970*d* by using a prediction end point of a first block and a prediction start point of each of the second blocks 2970*a*, 2970*b*, 2970*c*, and 2970*d*, a process of obtaining second intra prediction mode information related to the second block 2970*d*, which is last processed from among the second blocks 2970*a*, 2970*b*, 2970*c*, and 2970*d*, from a bitstream may be omitted. Accordingly, instead of determining the prediction direction of the second block 2970*d* based on the second intra prediction mode information, a prediction mode in which intra prediction is performed according to the reference prediction direction 2990 of the second block 2970*d* may be determined as the second prediction mode. Accordingly, a bandwidth of a bitstream may be effectively used.

However, shapes and prediction directions of a first block and second blocks shown in FIGS. 29A, 29B, and 29C are merely examples to describe that second prediction modes of the second blocks may be determined based on a prediction direction of the first block, and thus the embodiment is not limited to the illustrated shapes and directions.

According to another embodiment, the processor 1720 of the video decoding apparatus 1700 may be configured to determine at least one first block that splits a current frame, which is one of at least one frame included in an image, when intra prediction is performed in the current first block, determine a first prediction mode indicating an intra prediction method to be performed in the current first block based on first intra prediction mode information obtained from a bitstream, determine a plurality of second blocks included in the current first block, determine whether the first prediction mode is a directional intra prediction mode, when the first prediction mode is the directional intra prediction mode, determine a second prediction mode indicating a directional intra prediction mode to be performed in the second blocks based on at least one of the first prediction mode and second intra prediction mode information obtained from a bitstream for each second block, and when the first prediction mode is not the directional intra prediction mode, determine a second prediction mode indicating a non-directional intra prediction mode to be performed in the second blocks based on the second intra prediction mode information obtained from the bitstream for each second block, and perform intra prediction based on the first prediction mode and the second prediction mode, so that the image may be decoded.

Figure 30:
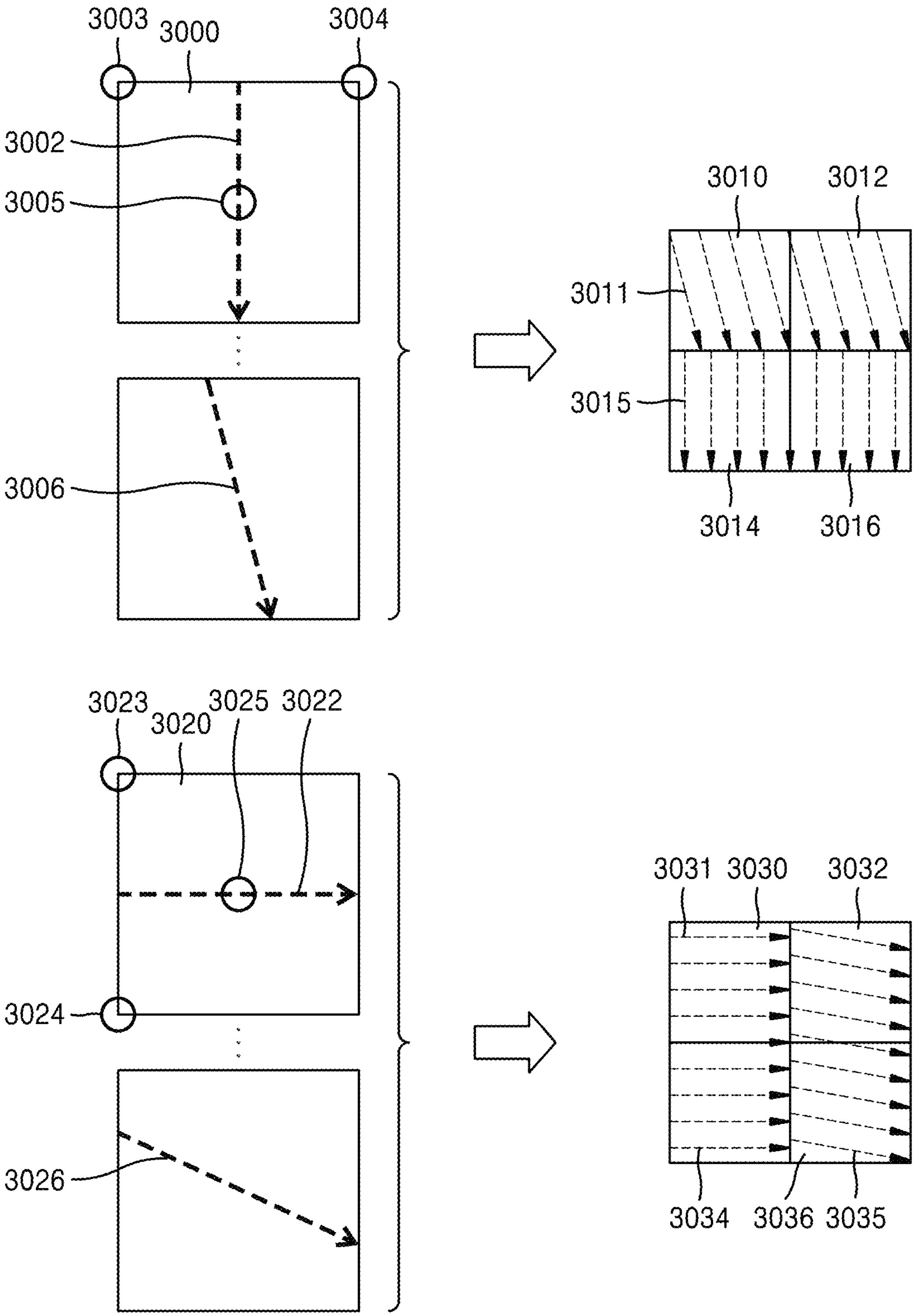
FIG. 30 illustrates an example of a process of determining a second prediction mode based on rows or columns of second blocks split from a first block.

FIG. 30 illustrates an example of a process of determining a second prediction mode based on rows or columns of second blocks split from a first block.

Referring to FIG. 30, according to an embodiment, second prediction modes of a plurality of second blocks 3010, 3012, 3014, and 3016 included in a first block 3000 may be determined based on a prediction direction of the first block 3000, and in this case, the second prediction modes of the second blocks 3010, 3012, 3014, and 3016 may be determined with respect to locations of the second blocks 3010, 3012, 3014, and 3016 within the first block 3000. According to an embodiment, a prediction direction 3002, 3006, or the like in which prediction is performed may be determined according to a first prediction mode of the first block 3000. The second blocks 3010, 3012, 3014, and 3016 included in the first block 3000 may be determined in a form of splitting a height and a width of the first block 3000.

According to an embodiment, the same second prediction mode may be determined for each second block located in the same row or each second block located in the same column from among the second blocks 3010, 3012, 3014, and 3016 included in the first block 3000. Referring to FIG. 30, within the first block 3000, prediction directions 3011 of second blocks 3010 and 3012 located in the first row may be determined to be the same, and prediction directions 3015 of second blocks 3014 and 3016 located in the second row may be determined to be the same. According to another embodiment, within a first block 3020, prediction directions 3031 of second blocks 3030 and 3034 located in the first column may be determined to be the same, and prediction directions 3035 of second blocks 3032 and 3036 located in the second column may be determined to be the same. A process of determining a second prediction mode for each second block may be performed according to various embodiments.

According to an embodiment, second prediction modes of second blocks located in the same row or column may be determined to be the same based on whether a prediction direction corresponding to a first prediction mode of a first block is similar to a vertical direction or is similar to a horizontal direction. According to an embodiment, when the prediction direction of the first block is a prediction direction for referring to adjacent reference samples from an upper left point 3003 to an upper right point 3004 of a boundary of the first block based on a center 3005 of the first block, the prediction direction of the first block may be determined to be similar to the vertical direction. According to an embodiment, when the prediction direction of the first block is a prediction direction for referring to adjacent reference samples from an upper left point 3023 to a lower left point 3024 of a boundary of the first block based on a center 3025 of the first block, the prediction direction of the first block may be determined to be similar to the horizontal direction.

According to an embodiment, when the prediction direction corresponding to the first prediction mode of the first block is a direction similar to the vertical direction, the second prediction modes of the second blocks located in the same row may be determined to be the same. According to an embodiment, when the prediction direction corresponding to the first prediction mode of the first block is a direction similar to the horizontal direction, the second prediction modes of the second blocks located in the same column may be determined to be the same. According to an embodiment, the second prediction modes of the second blocks located in the same row or column may be determined based on second intra prediction mode information of the second blocks located in the same row or column. The second prediction modes of all of the second blocks located in same row or column may be determined based on second intra prediction mode information of one of the second blocks located in the same row or column. According to another embodiment, the second prediction modes of all of the second blocks located in the same row or column may be determined based on a preset processing for second intra prediction mode information of at least one of the second blocks located in the same row or column, for example, an arithmetic processing (an average value, a weighted average, etc.) of an index value of an intra prediction mode related to the second intra prediction mode information of at least one of the second blocks.

Figure 31:
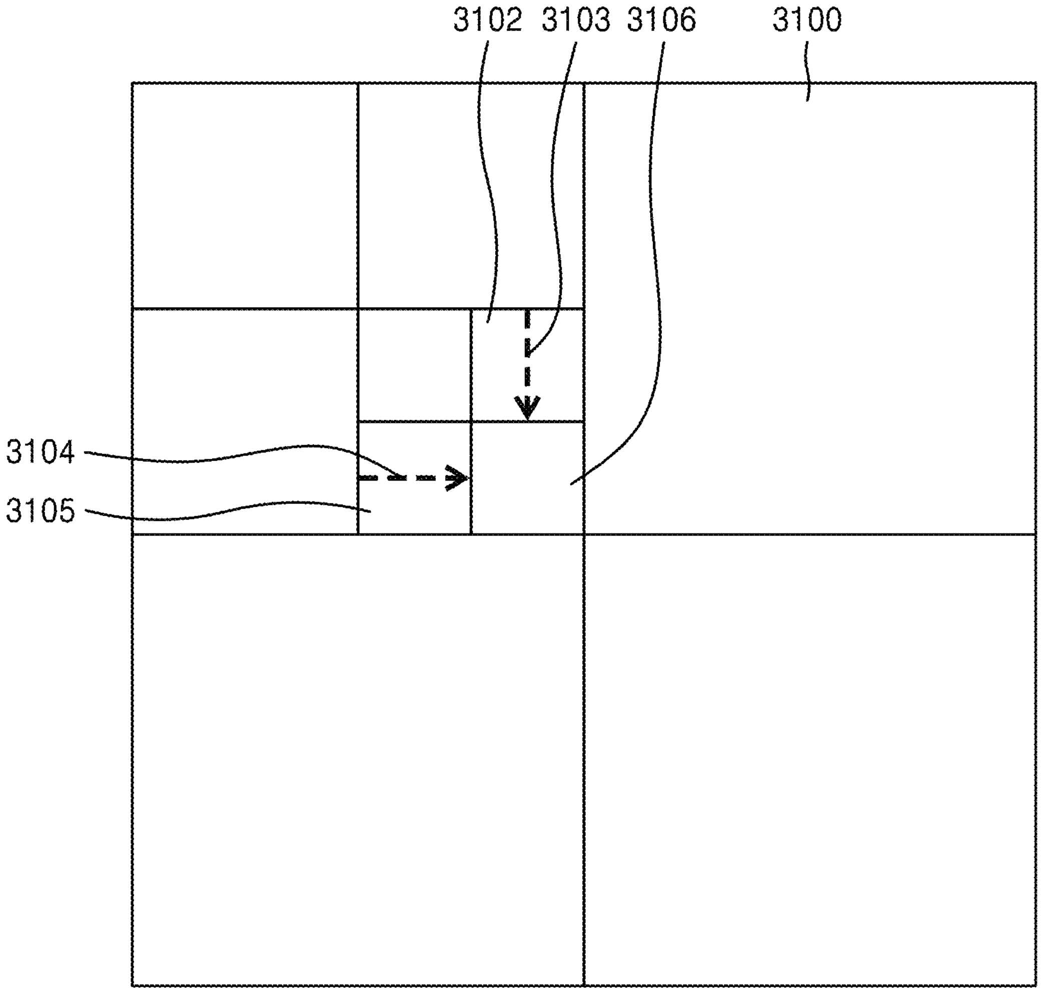
FIG. 31 illustrates an example of a process of using a prediction mode of an adjacent block, to determine a prediction mode of a current first block or a current second block.

FIG. 31 illustrates an example of a process of using a prediction mode of an adjacent block, to determine a prediction mode of a current first block or a current second block.

According to an embodiment, first intra prediction mode information or second intra prediction mode information may be used to determine a first prediction mode of a first block or a second prediction mode of a second block, the first block and the second block being included in a current frame 3100. The first intra prediction mode information or the second intra prediction mode information may directly indicate an index of an intra prediction mode of the first block or the second block. However, according to an embodiment, an intra prediction mode of a current first block or a current second block may be determined based on an intra prediction mode of an adjacent block, and in this case, the first intra prediction mode information or the second intra prediction mode information may include information indicating which intra prediction mode of adjacent blocks of the first block or the second block is to be used.

According to an embodiment, when the first intra prediction mode information or the second intra prediction mode information has a value of 11, the first prediction mode or the second prediction mode may be determined as an intra prediction mode of an adjacent first block or an adjacent second block adjacent to the left side of the current first block or the current second block. According to an embodiment, when the first intra prediction mode information or the second intra prediction mode information has a value of 00, the first prediction mode or the second prediction mode may be determined as an intra prediction mode of an adjacent first block or an adjacent second block adjacent to the upper side of the current first block or the current second block. According to an embodiment, when the first intra prediction mode information or the second intra prediction mode information has a value of 01, the first prediction mode or the second prediction mode may be determined as a prediction mode different from an intra prediction mode of an adjacent first block or adjacent second blocks adjacent to the left side or the upper side of the current first block or the current second block. Hereinafter, for convenience of description of a process of determining intra prediction modes of the current first block and the current second block by using an intra prediction mode of an adjacent block, the current first block or the current second block may be referred to as a current block, and the first intra prediction mode information or the second intra prediction mode information may be referred to as intra prediction mode information.

Referring to FIG. 31, in order to determine an intra prediction mode of a current block 3106, an intra prediction mode of an adjacent block 3102 or 3104 adjacent to the current block 3106 may be referred to. For example, when intra prediction mode information of the current block 3106 is 00, an intra prediction mode using a prediction direction 3103 of an adjacent block 3102 adjacent to the upper side may be determined as a prediction mode of the current block 3106. When the intra prediction mode information of the current block 3106 is 11, an intra prediction mode using a prediction direction 3105 of an adjacent block 3104 adjacent to the left side may be determined as a prediction mode of the current block 3106.

According to another embodiment, when the intra prediction mode information of the current block 3106 is 01 or 10, an intra prediction mode determined by combining the prediction direction 3103 of the adjacent block 3102 adjacent to the upper side and the prediction direction 3105 of the adjacent block 3104 adjacent to the left side may be determined as a prediction mode of the current block 3106. For example, the prediction mode of the current block 3106 may be determined as an intra prediction mode for an index close to an average value of an index of an intra prediction mode related to the prediction direction 3103 of the adjacent block 3102 adjacent to the upper side and an index of an intra prediction mode related to the prediction direction 3105 of the adjacent block 3104 adjacent to the left side. According to an embodiment, the intra prediction mode of the adjacent block 3102 or 3104 may be a directional intra prediction mode or a non-directional intra prediction mode.

According to an embodiment, in order to determine the intra prediction modes of the current first block and the current second block, the first prediction mode may be determined by using the intra prediction mode of the adjacent first block adjacent to the current first block, and the second prediction mode may be determined by using the intra prediction mode of the adjacent second block adjacent to the current second block. According to another embodiment, in order to determine the intra prediction modes of the current first block and the current second block, the first prediction mode may be determined by using the intra prediction mode of the adjacent first block adjacent to the current first block, and the second prediction mode may be determined based on an index of an intra prediction mode indicated by second intra prediction mode information of the current second block. According to another embodiment, in order to determine the intra prediction modes of the current first block and the current second block, the first prediction mode may be determined based on an index of an intra prediction mode indicated by first intra prediction mode information of the current first block, and the second prediction mode may be determined by using the intra prediction mode of the adjacent second block adjacent to the current second block.

The above-described embodiments are merely examples to describe features referring to intra prediction modes of adjacent blocks adjacent to the current first block and the current second block, and thus the embodiment is not limited to values of the first intra prediction mode and the second intra prediction mode described in the above-described embodiments. In various embodiments using intra prediction mode information of an adjacent block, a method similar to a method of determining a prediction mode using an mpm index in various intra prediction methods may be used.

According to another embodiment, when a right adjacent block adjacent to the right side of a current block is previously encoded or previously reconstructed so that information about the right adjacent block is available, a prediction mode of the current first block or the current second block may be determined by using information about an intra prediction mode of the right adjacent block instead of information about an intra prediction mode of a left adjacent block.

According to another embodiment, when the right adjacent block adjacent to the right side of the current block is previously encoded or previously reconstructed so that the information about the right adjacent block is available and information about the left adjacent block is also available, instead of using information about an intra prediction mode only in one direction from left to right or from right to left, the prediction mode of the current first block or the current second block may be determined by changing the order and using information about an intra prediction mode of an adjacent block of the current block.

According to another embodiment, the processor 1720 of the video decoding apparatus 1700 may be configured to determine at least one first block that splits a current frame, which is one of at least one frame included in an image, when intra prediction is performed in the current first block, determine a first prediction mode indicating an intra prediction method to be performed in the current first block based on first intra prediction mode information obtained from a bitstream, determine whether to perform prediction by determining a second prediction mode, and when prediction is performed by determining the second prediction mode, determine a plurality of second blocks included in the current first block, determine a second prediction mode indicating an intra prediction method to be performed in the second blocks based on at least one of the first prediction mode and second intra prediction mode information obtained from a bitstream for each second block, and perform intra prediction based on the first prediction mode and the second prediction mode, so that the image may be decoded, or when prediction is not performed by determining the second prediction mode, perform intra prediction based on the first prediction mode, so that the image may be decoded.

Hereinafter, as one of the intra prediction methods, an encoding process of a line-based intra prediction method will be described below.

According to an embodiment, the processor 1920 of the video encoding apparatus 1900 may be configured to determine at least one first block that splits a current frame, which is one of at least one frame included in an image, when intra prediction is performed in the current first block, determine a first prediction mode indicating an intra prediction method to be performed in the current first block, determine a plurality of second blocks included in the current first block, determine a second prediction mode indicating an intra prediction method to be performed in the second blocks, and perform intra prediction based on the first prediction mode and the second prediction mode, so that the image may be encoded.

FIG. 28A illustrates an example of a process of determining an intra prediction mode of a plurality of second blocks, which are sub-blocks of a first block, based on an intra prediction mode of the first block.

According to an embodiment, during an encoding process, when intra prediction is performed in a current first block, a first prediction mode indicating an intra prediction method to be performed in the current first block may be determined. Referring to FIG. 28A, whether intra prediction is to be performed in a current first block 2800, which is one of first blocks that split a current frame, may be determined, and which method is to be used to perform intra prediction may be determined. According to an embodiment, an intra prediction mode that may be performed in a first block may be a directional intra prediction method or a non-directional intra prediction method. The encoding process performed in relation to FIG. 28A may be similar to the decoding process performed in relation to FIG. 28A described above, and thus detailed descriptions thereof will not be provided herein.

FIG. 28B illustrates an example of a process of determining a prediction mode based on a non-square block that splits an image.

According to an embodiment, an image may be encoded by using a square data unit and a non-square data unit. Referring to FIG. 28B, a plurality of types of intra prediction may be performed in a current first block 2800 including second blocks 2830, 2832, 2834, and 2836.

According to an embodiment, second intra prediction mode information generated in relation to the second blocks 2810, 2812, 2814, and 2816 may be related to an intra prediction method of the current first block 2800. According to an embodiment, second blocks 2830, 2832, 2834, and 2836 included in a current first block 2820 may have non-square shapes. Moreover, a non-square first block, which does not have a square shape same as the shape of the current first block 2820 shown in FIG. 28B, may be included in a current frame. Second blocks included in the non-square first block may also be square or non-square data blocks. That is, for shapes of a first block and second blocks that may be used in various embodiments, the first block and the second blocks may have various shapes that satisfy an inclusion relationship between the first block and the second blocks, such as a square or non-square shape, etc.

According to an embodiment, second intra prediction mode information generated in relation to the second blocks 2830, 2832, 2834, and 2836 may be related to an intra prediction method of the current first block 2820. According to an embodiment, a method of determining second prediction modes of non-square second blocks 2830, 2832, 2834, and 2836 may be similar to the method described with reference to FIG. 28A, and thus detailed descriptions thereof will not be provided herein.

FIG. 28C illustrates a detailed example of a process of determining an intra prediction mode of a second block included in a first block.

According to an embodiment, an intra prediction mode for each second block may be determined. According to an embodiment, an intra prediction mode determined in a first block 2850 is a directional intra prediction mode, and an intra prediction mode referring to a reference sample adjacent to at least one of a left boundary and an upper boundary of the first block 2850 may be used. An intra prediction mode of a second block 2860 may be determined based on the intra prediction mode, and in this case, the intra prediction mode of the first block 2850 may serve as a reference. Hereinafter, for convenience of description, the intra prediction mode of the first block 2850, which is used to determine the intra prediction mode of the second block 2860, will be referred to as a reference intra prediction mode.

According to an embodiment, the number and directions of directional intra prediction modes that may be used in the second block 2860 may be determined based on the reference intra prediction mode. In detail, as shown in Table 1 above, when intra prediction is performed with reference to a reference sample located in the same direction as the reference intra prediction mode, second intra prediction mode information of the second block 2860 may be generated as 00. According to an embodiment, an index related to an intra prediction mode indicated by the second intra prediction mode information may vary depending on a direction of the reference intra prediction mode. That is, based on a result of comparing an index (K) determined according to the reference intra prediction mode with a preset threshold (L), a second prediction mode indicated by the second intra prediction mode information may be differently determined. According to Table 2 above, the second prediction mode may be determined according to the result of the comparison of K and L, and a bitstream including the second intra prediction mode information indicating the second prediction mode may be generated. The image encoding process performed in relation to FIG. 28C may be a similar method in which the image decoding process performed in relation to FIG. 28C described above is performed in a reverse order, and thus detailed descriptions thereof will not be provided herein.

According to another embodiment, the processor 1920 of the video encoding apparatus 1900 may be configured to determine at least one first block that splits a current frame, which is one of at least one frame included in an image, when intra prediction is performed in the current first block, determine a first prediction mode indicating an intra prediction method to be performed in the current first block, determine a plurality of second blocks included in the current first block, determine a reference prediction direction that is used in a current second block based on a prediction direction of the current first block and a prediction direction related to a previous second block, determine a prediction mode using one of a plurality of prediction directions including the reference prediction direction as a second prediction mode of the current second block, and perform intra prediction based on the first prediction mode and the second prediction mode, so that the image may be encoded.

FIG. 29A illustrates an example of a process of determining a prediction direction that may be used during an intra prediction process of a current second block based on a prediction direction according to a first prediction mode. FIG. 29B illustrates an example of a process of determining a prediction direction that may be used during an intra prediction process of a current second block by using a prediction direction according to a first prediction mode and a prediction direction of a previous second block. FIG. 29C illustrates a process of determining a reference prediction direction that may be used for each second block by using a prediction direction of a first block.

According to an embodiment, a reference prediction direction used in the current second block may be determined based on a prediction direction of a current first block and a prediction direction of a previous second block. According to an embodiment, on order in which a plurality of second blocks included in the current first block are processed may be predetermined, and the order may vary depending on shapes of the second blocks included in the current first block. For example, when the second blocks are in forms of splitting the current first block into the same number of rows and columns, the second blocks may be processed according to a Z-scan order. When the second blocks are in forms of splitting the current first block in a row or column direction, the second blocks may be processed in a direction perpendicular to a direction of splitting the current first block. According to an embodiment, a second prediction mode of the current second block may be determined by using a prediction direction related to a previous second block that has been already processed based on a determined processing order of the second blocks. According to an embodiment, a prediction mode using one of a plurality of prediction directions including a reference prediction direction may be determined as a second prediction mode of the current second block. According to an embodiment, an image may be encoded by performing intra prediction based the first prediction mode and the second prediction mode.

The encoding process that may be performed in relation to FIGS. 29A, 29B, and 29C may be a similar method in which the decoding process performed in relation to FIGS. 29A, 29B, and 29C described above is performed in a reverse order, and thus detailed descriptions thereof will not be provided herein.

According to another embodiment, the processor 1920 of the video encoding apparatus 1900 may be configured to determine at least one first block that splits a current frame, which is one of at least one frame included in an image, when intra prediction is performed in the current first block, determine a first prediction mode indicating an intra prediction method to be performed in the current first block, determine a plurality of second blocks included in the current first block, determine whether a first prediction mode is a directional intra prediction mode, when the first prediction mode is the directional intra prediction mode, determine a second prediction mode indicating a directional intra prediction mode to be performed in the second blocks, and when the first prediction mode is not the directional intra prediction mode, determine a non-directional intra prediction mode to be performed in the second blocks, and perform intra prediction based on the first prediction mode and the second prediction mode, so that the image may be encoded.

FIG. 30 illustrates an example of a process of determining a second prediction mode based on rows or columns of second blocks split from a first block.

Referring to FIG. 30, according to an embodiment, second prediction modes of a plurality of second blocks 3010, 3012, 3014, and 3016 included in a first block 3000 may be determined based on a prediction direction of the first block 3000, and in this case, the second prediction modes of the second blocks 3010, 3012, 3014, and 3016 may be determined with respect to locations of the second blocks 3010, 3012, 3014, and 3016 within the first block 3000. According to an embodiment, a prediction direction 3002, 3006, or the like in which prediction is performed may be determined according to a first prediction mode of the first block 3000. The second blocks 3010, 3012, 3014, and 3016 included in the first block 3000 may be determined in a form of splitting a height and a width of the first block 3000. The image encoding process that may be performed in relation to FIG. 30 may be a similar method in which the decoding process performed in relation to FIG. 30 described above is performed in a reverse order, and thus detailed descriptions thereof will not be provided herein.

FIG. 31 illustrates an example of a process of using a prediction mode of an adjacent block, to determine a prediction mode of a current first block or a current second block.

According to an embodiment, an intra prediction mode of the current first block or the current second block may be determined based on an intra prediction mode of an adjacent block. The encoding process that may be performed in relation to FIG. 31 may be a similar method in which the decoding process performed in relation to FIG. 31 described above is performed in a reverse order, and thus detailed descriptions thereof will not be provided herein.

According to another embodiment, the processor 1920 of the video encoding apparatus 1900 may be configured to determine at least one first block that splits a current frame, which is one of at least one frame included in an image, when intra prediction is performed in the current first block, determine a first prediction mode indicating an intra prediction method to be performed in the current first block, determine whether to perform prediction by performing a second prediction mode, and when prediction is performed by determining the second prediction mode, determine a plurality of second blocks included in the current first block, determine a second prediction mode indicating a second prediction method indicating an intra prediction method to be performed in the second blocks, and perform intra prediction based on the first prediction mode and the second prediction mode, so that the image may be encoded, and when prediction is not performed by determining the second prediction mode, perform intra prediction based on the first prediction mode, so that the image may be encoded.

The disclosure has been particularly shown and described with reference to embodiments thereof. In this regard, it will be understood by one of ordinary skill in the art that various changes in form and details may be made therein without departing from the scope of the disclosure. Therefore, the embodiments should be considered in a descriptive sense only and not for purposes of limitation. The scope of the disclosure is defined not by the detailed descriptions of the disclosure but by the following claims, and all differences within the scope will be construed as being included in the disclosure.

Meanwhile, the aforedescribed embodiments of the disclosure may be written as a program executable on a computer, and may be implemented in general-use digital computers that execute the program by using a computer-readable recording medium. Examples of the computer-readable recording medium include magnetic storage media (e.g., ROM, floppy disks, hard disks, etc.), optical recording media (e.g., CD-ROMs, or DVDs), or the like.

The invention claimed is:

1. A video decoding method comprising:

when a quad split of a first block is not allowed, obtaining split direction information indicating whether the first block is split horizontally or vertically, and split type information indicating whether the first block is split using ternary split or binary split;

when the split direction information indicates that the first block is split vertically and the split type information indicates that the first block is split using binary split, obtaining a second block and a third block by vertically splitting the first block;

splitting the second block horizontally into a fourth block and a fifth block and splitting the third block horizontally into a sixth block and a seventh block;

when an intra prediction mode of the seventh block is a DC mode and lengths of a width of the seventh block is greater than lengths of a height of the seventh block, determining an average of upper reference samples of the seventh block as a DC value; and performing intra prediction on the seventh block, based on the DC value, wherein the fourth block, the fifth block, the sixth block, and the seventh block are decoded according to a decoding order of the fourth block, the fifth block, the sixth block, and the seventh block, and wherein the second block is adjacent to a left side of the third block, the fourth block is adjacent to an upper side of the fifth block, and the sixth block is adjacent to an upper side of the seventh block, wherein the number of the upper reference samples of the seventh block is equal to the width of the seventh block.

2. A video encoding method comprising:

when a quad split of a first block is not allowed, generating split direction information indicating whether the first block is split horizontally or vertically, and split type information indicating whether the first block is split using ternary split or binary split;

when it is determined that the first block is split vertically using binary split, obtaining a second block and a third block by vertically splitting the first block;

splitting the second block horizontally into a fourth block and a fifth block and splitting the third block horizontally into a sixth block and a seventh block;

when an intra prediction mode of the seventh block is a DC mode and lengths of a width of the seventh block is greater than lengths of a height of the seventh block, determining an average of upper reference samples of the seventh block as a DC value; and performing intra prediction on the seventh block, based on the DC value, wherein the fourth block, the fifth block, the sixth block, and the seventh block are encoded according to an encoding order of the fourth block, the fifth block, the sixth block, and the seventh block, and wherein the second block is adjacent to a left side of the third block, the fourth block is adjacent to an upper side of the fifth block, and the sixth block is adjacent to an upper side of the seventh block, wherein the number of the upper reference samples of the seventh block is equal to the width of the seventh block.

3. A method for transmitting a bitstream, the method comprising:

generating the bitstream by the video encoding method of claim 2; and transmitting the bitstream to a receiver.

* * * * *